US012659194B2

(12) United States Patent (10) Patent No.: US 12,659,194 B2
Liu et al. (45) Date of Patent: Jun. 16, 2026

(54) SIGNAL PROCESSING METHOD AND APPARATUS

(71) Applicant: HUAWEI TECHNOLOGIES CO., LTD., Shenzhen (CN)

(72) Inventors: Chenchen Liu, Shenzhen (CN); Bo Gong, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 18/332,493

(22) Filed: Jun. 9, 2023

(65) Prior Publication Data

US 2023/0318880 A1 Oct. 5, 2023

Related U.S. Application Data

(63) Continuation of application No. PCT/CN2021/137192, filed on Dec. 10, 2021.

(30) Foreign Application Priority Data

Dec. 11, 2020 (CN) .......................... 202011453555.3

(51) Int. Cl.
*H04W 4/00* (2018.01)
*H04L 5/00* (2006.01)
*H04L 25/02* (2006.01)

(52) U.S. Cl.
CPC ........ *H04L 25/0242* (2013.01); *H04L 5/0048* (2013.01); *H04L 5/0007* (2013.01)

(58) Field of Classification Search
CPC . H04L 25/0242; H04L 5/0048; H04L 5/0007; H04L 27/26035; H04L 27/2634;
(Continued)

(56) References Cited

U.S. PATENT DOCUMENTS 10,397,035 B2 * 8/2019 Lee .................... H04L 27/26136
10,848,233 B2 * 11/2020 Vermani ............. H04B 7/0691
(Continued)

FOREIGN PATENT DOCUMENTS

CN 107005523 A 8/2017
CN 107210987 A 9/2017
(Continued)

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, total 3534 pages, IEEE—Institute of Electrical and Electronics Engineers, New York, New York (Dec. 7, 2016).
(Continued)

*Primary Examiner* — Phuongchau Ba Nguyen
(74) *Attorney, Agent, or Firm* — Leydig, Voit & Mayer, Ltd.

(57) ABSTRACT

This application discloses a signal processing method and an apparatus. The method includes: A transmit device generates a PPDU, where the PPDU includes a preamble, the preamble includes an LTF, the LTF includes a plurality of LTF symbols, and the plurality of LTF symbols may be used to carry a sequence obtained according to a first matrix; and then sends the PPDU. Correspondingly, a receive device receives the PPDU, and then processes, according to the first matrix, signals received on the plurality of LTF symbols. The first matrix is a $P_{n \times n}$ matrix, or the first matrix is obtained according to a $P_{n \times n}$ matrix, where
(Continued)

$$P_{n \times n} \times P_{n \times n}^{T} = n \times I,$$

I is an identity matrix, the $P_{n \times n}$ matrix includes n rows and n columns, the $$P_{n \times n}^{T}$$

matrix is a transpose matrix of the $P_{n \times n}$ matrix, and n is an integer greater than 8.

18 Claims, 7 Drawing Sheets

(58) Field of Classification Search
CPC .............. H04L 27/26134; H04L 5/001; H04L 25/0224; H04L 27/261; H04W 84/12; H04W 28/04; H04W 72/04; H04W 72/042; H04W 88/08; H04W 28/08; H04W 28/084; H04W 36/22; H04W 72/12
See application file for complete search history.

(56) References Cited

U.S. PATENT DOCUMENTS

| | | | | |
|---|---|---|---|---|
| 11,871,446 B2 * | 1/2024 | Chen | .................. | H04L 27/2602 |
| 2016/0165482 A1 | 6/2016 | Yang et al. | | |
| 2020/0044798 A1 * | 2/2020 | Park | ..................... | H04L 5/0023 |
| 2021/0218609 A1 * | 7/2021 | Yun | .................. | H04L 27/26025 |
| 2021/0344541 A1 * | 11/2021 | Shellhammer | ...... | H04L 27/2605 |
| 2022/0158881 A1 * | 5/2022 | Lim | ..................... | H04L 5/0044 |
| 2022/0182109 A1 * | 6/2022 | Lopez | ................... | H04B 7/046 |
| 2023/0171129 A1 * | 6/2023 | Liu | ..................... | H04L 25/0204 |
| | | | | 370/329 |

FOREIGN PATENT DOCUMENTS

| | | | |
|---|---|---|---|
| CN | 113557673 A | 10/2021 | |
| EP | 3370378 A1 | 9/2018 | |
| JP | 2017539168 A | 12/2017 | |
| JP | 2022524346 A | 5/2022 | |
| KR | 20170094182 A | 8/2017 | |
| KR | 20210137108 A | 11/2021 | |
| WO | 2019231293 A1 | 12/2019 | |
| WO | 2020071999 A1 | 4/2020 | |
| WO | 2020182290 A1 | 9/2020 | |
| WO | 2022012297 A1 | 1/2022 | |

OTHER PUBLICATIONS

"Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications: High-speed Physical Layer in the 5 GHZ Band," IEEE Std 802.11a-1999, total 90 pages, IEEE—Institute of Electrical and Electronics Engineers, New York, New York (Sep. 16, 1999).
"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," IEEE Std 802.11b-1999, total 97 pages, IEEE—Institute of Electrical and Electronics Engineers, New York, New York (Sep. 16, 1999).
"IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 4: Further Higher Data Rate Extension in the 2.4 GHz Band," IEEE Std 802.11g-2003, total 77 pages, IEEE—Institute of Electrical and Electronics Engineers, New York, New York (Jun. 12, 2003).
"IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput," IEEE Std 802.11n-2009, total 536 pages, IEEE—Institute of Electrical and Electronics Engineers, New York, New York (Sep. 11, 2009).
"IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," IEEE Std 802.11ac-2013, total 425 pages, IEEE—Institute of Electrical and Electronics Engineers, New York, New York (Dec. 11, 2013).
"IEEE P802.11ax™/D8.0, Draft Standard for Information technology Telecommunications and information exchange between systems Local and metropolitan area networks Specific requirements, Part 11: Wireless LAN Medium Access Control (MAC) and Physical Layer (PHY) Specifications, Amendment 1: Enhancements for High Efficiency WLAN," total 820 pages, IEEE—Institute of Electrical and Electronics Engineers, New York, New York (Oct. 2020).
"IEEE P802.11be™/D0.1, Draft Standard for Information technology Telecommunications and information exchange between systems Local and metropolitan area networks Specific requirements, Part 11: Wireless LAN Medium Access Control (MAC) and Physical Layer (PHY) Specifications, Amendment 8: Enhancements for extremely high throughput (EHT)," total 299 pages, IEEE—Institute of Electrical and Electronics Engineers, New York, New York (Sep. 2020).
Lopez et al., "Remarks on P matrices for EHT," Ericsson, doc: IEEE 802.11-19/1555r0, XP068153691, Total 15 pages (Sep. 13, 2019).

* cited by examiner

AP: Access point
STA: station

AP: Access point     MAC: media access control
STA: station         PHY: Physical layer L-STF: legacy short training field
L-LTF: legacy long training field
L-SIG: legacy signal field
VHT-SIG A: very high throughput signal field A
VHT-STF: very high throughput short training field VHT-LTF: very high throughput long training field
VHT-SIG B: very high throughput signal field B
Service field: service field
VHT data: VHT data
Padding and tail: padding and tail

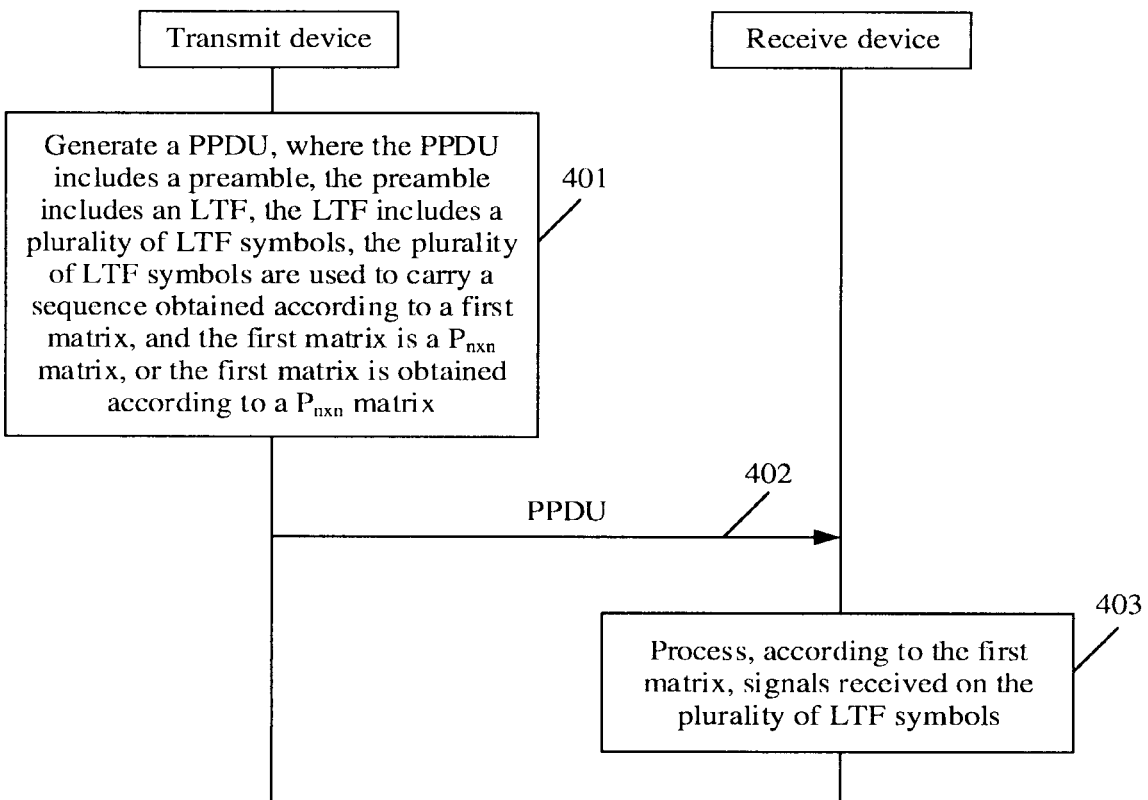

Transmit device

Receive device

Generate a PPDU, where the PPDU includes a preamble, the preamble includes an LTF, the LTF includes a plurality of LTF symbols, the plurality of LTF symbols are used to carry a sequence obtained according to a first matrix, and the first matrix is a $P_{nxn}$ matrix, or the first matrix is obtained according to a $P_{nxn}$ matrix     401

PPDU     402

Process, according to the first matrix, signals received on the plurality of LTF symbols     403

FIG. 4a

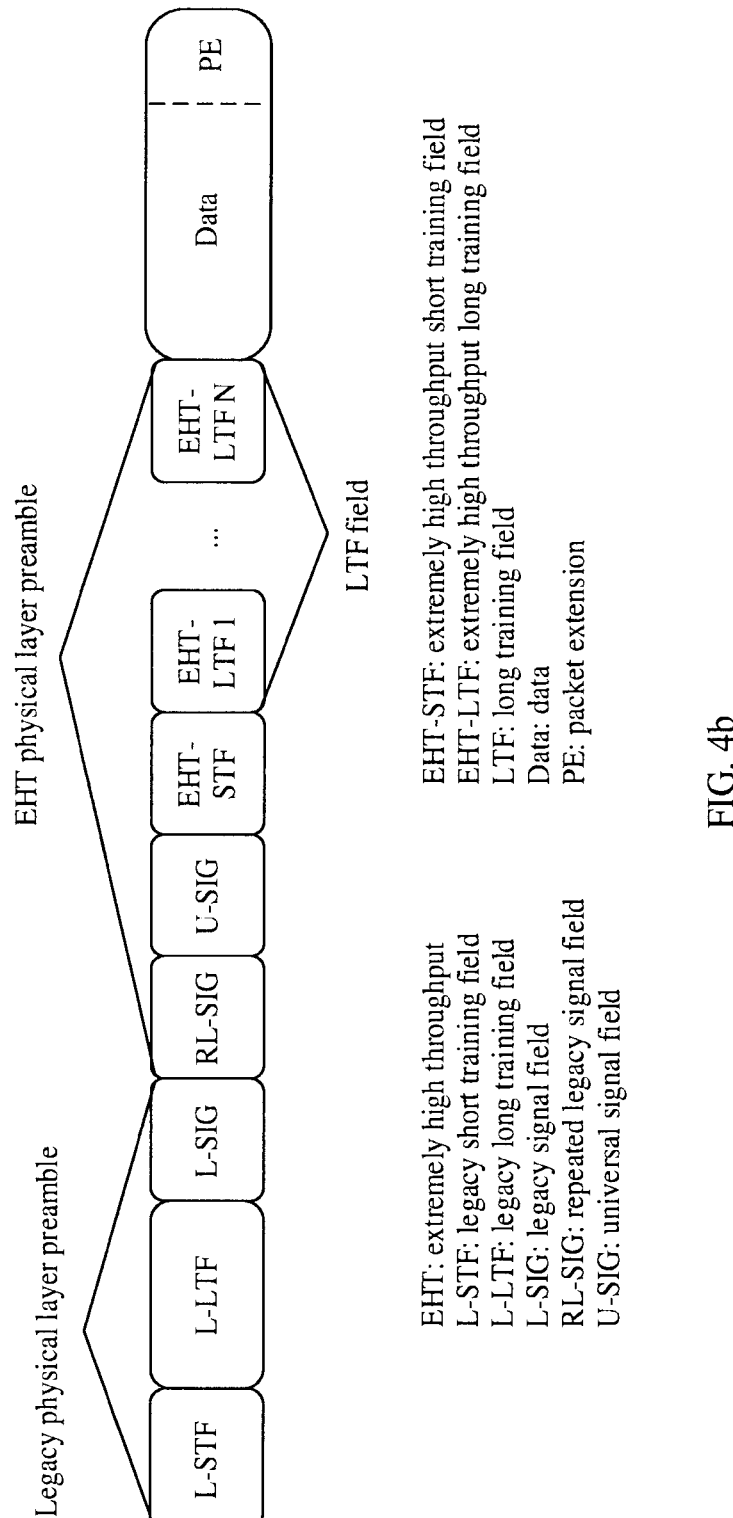

EHT physical layer preamble

Legacy physical layer preamble

LTF field

L-STF    L-LTF    L-SIG    RL-SIG    U-SIG    EHT-STF    EHT-LTF1    …    EHT-LTF N    Data    PE EHT: extremely high throughput
L-STF: legacy short training field
L-LTF: legacy long training field
L-SIG: legacy signal field
RL-SIG: repeated legacy signal field
U-SIG: universal signal field EHT-STF: extremely high throughput short training field
EHT-LTF: extremely high throughput long training field
LTF: long training field
Data: data
PE: packet extension

Transceiver

620

Processor

640

630

First vector x

Second vector y

Memory

703

First vector x

Second vector y

Memory

701

Logic circuit

Chip

702

Interface

SIGNAL PROCESSING METHOD AND APPARATUS

CROSS-REFERENCE TO RELATED APPLICATIONS

This application is a continuation of International Application No. PCT/CN2021/137192, filed on Dec. 10, 2021, which claims priority to Chinese Patent Application No. 202011453555.3, filed on Dec. 11, 2020. The disclosures of the aforementioned applications are hereby incorporated by reference in their entireties.

TECHNICAL FIELD

Embodiments of this application relate to the field of communication technologies, and in particular, to a signal processing method and an apparatus.

BACKGROUND

A physical (PHY) layer protocol data unit (PHY protocol data unit, PPDU) is defined in a wireless local area network (WLAN) standard that uses an OFDM technology as a core technology. The PPDU may include a preamble, and the preamble may include a long training field (LTF). The LTF may be used to help a receiving end perform channel estimation and the like, to obtain received data information.

However, how the receiving end performs channel estimation and the like based on the LTF urgently needs to be resolved.

SUMMARY

This application provides a signal processing method and an apparatus. Signals received on a plurality of LTF symbols and more than eight spatial streams can be processed according to a $P_{n \times n}$ matrix.

According to a first aspect, an embodiment of this application provides a signal processing method. The method includes: receiving a physical (PHY) layer protocol data unit (PHY protocol data unit, PPDU), where the PPDU includes a preamble, the preamble includes a long training field (LTF), and the LTF includes a plurality of LTF symbols; and processing, according to a first matrix $$A_{LTF}^k,$$

signals received on the plurality of LTF symbols, where the first matrix $$A_{LTF}^k$$

is a $P_{n \times n}$ matrix, or the first matrix $$A_{LTF}^k$$

is obtained according to a $P_{n \times n}$ matrix, where $$P_{n \times n} \times P_{n \times n}^T = n \times I,$$

I is an identity matrix, the $P_{n \times n}$ matrix includes n rows and n columns, the $$P_{n \times n}^T$$

matrix is a transpose matrix of the $P_{n \times n}$ matrix, n is an integer greater than 8, and k indicates a $k^{th}$ subcarrier in each of the plurality of LTF symbols.

The method provided in this embodiment of this application may be applied to a communication apparatus. For example, the communication apparatus may be a receive device, and the receive device is a device configured to receive the PPDU.

According to the method provided in this embodiment of this application, the receive device may implement channel estimation of more than eight streams. For example, the receive device may support MIMO channel estimation of up to 16 streams. In addition, the $P_{n \times n}$ matrix provided in this application can further adapt to requirements of different quantities of streams. Therefore, the receive device can implement MIMO channel estimation (or phase tracking, or the like) of 12 streams (or fewer than 12 streams), 16 streams (or fewer than 16 streams), and the like. In addition, the $P_{n \times n}$ matrix provided in this application can further implement MIMO channel estimation of four streams, eight streams, or the like. For another example, the receive device may support MIMO channel estimation of up to 32 streams (or 24 streams). This is not limited in this embodiment of this application.

MIMO channel estimation of a plurality of different quantities of streams can be implemented by using one $P_{n \times n}$ matrix, and redundancy of MIMO channel estimation is effectively reduced. In other words, the receive device may simultaneously process, according to a $P_{n \times n}$ matrix, signals received on a plurality of LTF symbols and more than eight spatial streams.

According to a second aspect, an embodiment of this application provides a signal processing method. The method includes: generating a physical layer protocol data unit PPDU, where the PPDU includes a preamble, the preamble includes a long training field LTF, the LTF includes a plurality of LTF symbols, the plurality of LTF symbols are used to carry a sequence obtained according to a first matrix $$A_{LTF}^k,$$

the first matrix $$A_{LTF}^k$$

is a $P_{n \times n}$ matrix, or the first matrix $$A_{LTF}^k$$

is obtained according to a $P_{n \times n}$ matrix, where $$P_{n \times n} \times P_{n \times n}^T = n \times I,$$

3

I is an identity matrix, the $P_{n \times n}$ matrix includes n rows and n columns, the $$P_{n \times n}^T$$

matrix is a transpose matrix of the $P_{n \times n}$ matrix, n is an integer greater than 8, and k indicates a $k^{th}$ subcarrier in each of the plurality of LTF symbols; and sending the PPDU.

With reference to the first aspect or the second aspect, in a possible implementation, $$P_{n \times n} = \begin{bmatrix} S_{(n-1) \times (n-1)} & a \\ a^T & 1 \end{bmatrix};$$

$$P_{n \times n} = \begin{bmatrix} a & S_{(n-1) \times (n-1)} \\ 1 & a^T \end{bmatrix};$$

$$P_{n \times n} = \begin{bmatrix} S_{(n-1) \times (n-1)} & -a \\ a^T & 1 \end{bmatrix};$$ or $$P_{n \times n} = \begin{bmatrix} -a & S_{(n-1) \times (n-1)} \\ 1 & a^T \end{bmatrix},$$

where
the $S_{(n-1) \times (n-1)}$ matrix is a submatrix of the $P_{n \times n}$ matrix, the $S_{(n-1) \times (n-1)}$ matrix includes n−1 rows and n−1 columns, $\alpha$ is a column vector including n−1 elements, each element is 1, $\alpha^T$ is a transpose vector of $\alpha$, and −$\alpha$ indicates a vector obtained through negation of all elements in $\alpha$.

In this embodiment of this application, it can be ensured that the $P_{n \times n}$ matrix is an orthogonal matrix, and the submatrix $S_{(n-1) \times (n-1)}$ is a circulant matrix or a Hankel matrix. This can reduce space occupied by the $P_{n \times n}$ matrix, save storage space, and effectively reduce implementation complexity of the communication apparatus.

With reference to the first aspect or the second aspect, in a possible implementation, the $S_{(n-1) \times (n-1)}$ matrix is a circulant matrix or a Hankel matrix.

In this embodiment of this application, the submatrix $S_{(n-1) \times (n-1)}$ of the $P_{n \times n}$ matrix is set to a circulant matrix or a Hankel matrix, and the communication apparatus can restore the submatrix only by storing a vector of a first row or a first column of the submatrix $S_{(n-1) \times (n-1)}$. This can effectively save storage space of the communication apparatus, and reduce implementation complexity.

With reference to the first aspect or the second aspect, in a possible implementation, a first row of the $S_{(n-1) \times (n-1)}$ matrix is equal to a first vector x, and x=[1 1 1 −1 1 1 −1 −1 1 −1 −1 −1]; a first row of the $S_{(n-1) \times (n-1)}$ matrix is obtained by performing one or more of three operations: cyclic shift, reversing, and overall negation on a first vector x, and x=[1 1 1 −1 1 −1 −1 1 −1 −1 −1]; a first row of the $S_{(n-1) \times (n-1)}$ matrix is equal to a second vector y, and y=[1 1 1 −1 −1 −1 −1 1 −1 1 1 −1]; or a first row of the $S_{(n-1) \times (n-1)}$ matrix is obtained by performing one or more of three operations: cyclic shift, reversing, and overall negation on a second vector y, and y=[1 1 1 −1 −1 −1 −1 1 −1 1 −1 −1 1 1 −1].

After obtaining the first row of the submatrix $S_{(n-1) \times (n-1)}$ of the $P_{n \times n}$ matrix based on the first vector or the second vector, the communication apparatus may obtain $S_{(n-1) \times (n-1)}$. Therefore, the communication apparatus only needs to store a row of the submatrix $S_{(n-1) \times (n-1)}$ of the $P_{n \times n}$ matrix, to restore the submatrix. Alternatively, when a relationship between a row of the submatrix and the first vector or the second vector is determined, the communication apparatus can restore the submatrix only by storing the first vector or the second vector. This can reduce space occupied by the $P_{n \times n}$ matrix, save storage space, and effectively reduce implementation complexity of the communication apparatus (for example, the submatrix $S_{(n-1) \times (n-1)}$ of the $P_{n \times n}$ matrix can be restored based on an operation such as cyclic shift).

With reference to the first aspect or the second aspect, in a possible implementation, when n=16, $$P_{16 \times 16} = \begin{bmatrix} P_{8 \times 8} & P_{8 \times 8} \\ P_{8 \times 8} & -P_{8 \times 8} \end{bmatrix};$$

$$P_{16 \times 16} = \begin{bmatrix} -P_{8 \times 8} & P_{8 \times 8} \\ P_{8 \times 8} & P_{8 \times 8} \end{bmatrix};$$

$$P_{16 \times 16} = \begin{bmatrix} P_{8 \times 8} & -P_{8 \times 8} \\ P_{8 \times 8} & P_{8 \times 8} \end{bmatrix};$$ or $$P_{16 \times 16} = \begin{bmatrix} P_{8 \times 8} & P_{8 \times 8} \\ -P_{8 \times 8} & P_{8 \times 8} \end{bmatrix},$$ where $$P_{8 \times 8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix}$$

In this embodiment of this application, the $P_{8 \times 8}$ matrix is extended, to generate the $P_{16 \times 16}$ matrix. This can ensure that the communication apparatus supports transmission of data of 16 streams, and avoid excessive complex operations.

With reference to the first aspect or the second aspect, in a possible implementation, the first matrix $$A_{LTF}^k$$

meets the following conditions:

$$A_{LTF}^k = \begin{cases} R_{n \times n} & \text{if the } k^{th} \text{ subcarrier is a pilot subcarrier} \\ P_{n \times n} & \text{if the } k^{th} \text{ subcarrier is a non−pilot} \\ & \text{subcarrier or a data subcarrier} \end{cases}$$

The $R_{n \times n}$ matrix includes n rows and n columns, and each row of the $R_{n \times n}$ matrix is equal to a first row of the $P_{n \times n}$ matrix.

With reference to the first aspect or the second aspect, in a possible implementation, when the $k^{th}$ subcarrier is a non-pilot subcarrier, the first matrix is equal to an overall negation matrix of the $P_{n \times n}$ matrix: the first matrix is equal to a transpose matrix of the $P_{n \times n}$ matrix: the first matrix is equal to a transpose matrix of an overall negation matrix of the $P_{n \times n}$ matrix: or the first matrix is equal to an overall negation matrix of a transpose matrix of the $P_{n \times n}$ matrix.

With reference to the first aspect or the second aspect, in a possible implementation, the $R_{n \times n}$ matrix is used for phase tracking and/or frequency offset estimation, and the $P_{n \times n}$ matrix is used for channel estimation.

In this embodiment of this application, for specific descriptions of the $P_{n \times n}$ matrix, an $E_{n \times n}$ matrix, the first matrix, or the like, refer to examples shown in the following. Details are not described herein.

According to a third aspect, an embodiment of this application provides a communication apparatus, configured to perform the method in any one of the first aspect or the possible implementations of the first aspect. The communication apparatus includes corresponding units configured to perform the method in any one of the first aspect or the possible implementations of the first aspect.

For example, the communication apparatus may be a transmit device, a chip in a transmit device, or the like.

According to a fourth aspect, an embodiment of this application provides a communication apparatus, configured to perform the method in any one of the second aspect or the possible implementations of the second aspect. The communication apparatus includes corresponding units configured to perform the method in any one of the second aspect or the possible implementations of the second aspect.

For example, the communication apparatus may be a receive device, a chip in a receive device, or the like.

In the third aspect or the fourth aspect, the communication apparatus may include a transceiver unit and a processing unit. For specific descriptions of the transceiver unit and the processing unit, refer to apparatus embodiments shown in the following.

According to a fifth aspect, an embodiment of this application provides a communication apparatus. The communication apparatus includes a processor, configured to perform the method in any one of the first aspect or the possible implementations of the first aspect. Alternatively, the processor is configured to execute a program stored in a memory. When the program is executed, the method in any one of the first aspect or the possible implementations of the first aspect is performed.

When the method is performed, a process of receiving information (for example, a PPDU) in the method may be understood as a process of receiving the input information by the processor. When the processor receives the input information, the transceiver receives the information, and inputs the information to the processor. Still further, after the transceiver receives the information, other processing may need to be performed on the information before the information is input into the processor.

Based on the principle, for example, receiving the PPDU mentioned in the method may be understood as receiving the input PPDU by the processor.

Unless otherwise specified, operations such as transmission, sending, and receiving related to the processor may be more generally understood as operations such as output, receiving, and input of the processor if the operations do not conflict with actual functions or internal logic of the operations in related descriptions.

In an implementation process, the processor may be a processor specially configured to perform these methods, or a processor, for example, a general-purpose processor, that executes computer instructions in the memory to perform these methods. The memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application. It may be understood that descriptions of the processor and the memory are also applicable to the sixth aspect shown in the following. For ease of description, details are not described again in the sixth aspect.

In a possible implementation, the memory is located outside the communication apparatus.

In a possible implementation, the memory is located inside the communication apparatus.

In this embodiment of this application, the processor and the memory may alternatively be integrated into one component. In other words, the processor and the memory may alternatively be integrated together. It may be understood that the memory in this embodiment of this application may be configured to store one or more of a first vector x, a second vector y, a third vector x', a fourth vector y', or the like.

In a possible implementation, the communication apparatus further includes a transceiver. The transceiver is configured to receive or send a signal. For example, the transceiver may further be configured to receive a PPDU or the like.

In this embodiment of this application, the communication apparatus may be a transmit device, a chip in a transmit device, or the like.

According to a sixth aspect, an embodiment of this application provides a communication apparatus. The communication apparatus includes a processor, configured to perform the method in any one of the second aspect or the possible implementations of the second aspect. Alternatively, the processor is configured to execute a program stored in a memory. When the program is executed, the method in any one of the second aspect or the possible implementations of the second aspect is performed.

In a possible implementation, the memory is located outside the communication apparatus.

In a possible implementation, the memory is located inside the communication apparatus.

In this embodiment of this application, the processor and the memory may alternatively be integrated into one component. In other words, the processor and the memory may alternatively be integrated together. It may be understood that the memory in this embodiment of this application may be configured to store one or more of a first vector x, a second vector y, a third vector x', a fourth vector y', or the like.

In a possible implementation, the communication apparatus further includes a transceiver. The transceiver is configured to receive or send a signal. For example, the transceiver may be configured to send a PPDU.

In this embodiment of this application, the communication apparatus may be a receive device, a chip in a receive device, or the like.

According to a seventh aspect, an embodiment of this application provides a communication apparatus. The communication apparatus includes a logic circuit and an interface, and the logic circuit is coupled to the interface. The interface is configured to input a PPDU, and the logic circuit is configured to process, according to a first matrix $$A_{LTF}^k,$$

signals received on a plurality of LTF symbols.

Optionally, the communication apparatus further includes a memory. The memory is configured to store one or more of a first vector x, a second vector y, a third vector x', a fourth vector y', or the like.

It may be understood that for descriptions of the LTF symbol, the first matrix, a $P_{n \times n}$ matrix, an $R_{n \times n}$ matrix, and the like, refer to descriptions in the first aspect or the second aspect, or various embodiments shown in the following. Details are not described herein again.

According to an eighth aspect, an embodiment of this application provides a communication apparatus. The communication apparatus includes a logic circuit and an interface, and the logic circuit is coupled to the interface. The logic circuit is configured to generate a PPDU. The interface is configured to output the PPDU.

It may be understood that for descriptions of an LTF symbol, a first matrix, a $P_{n \times n}$ matrix, an $R_{n \times n}$ matrix, and the like, refer to descriptions in the first aspect or the second aspect, or various embodiments shown in the following. Details are not described herein again.

According to a ninth aspect, an embodiment of this application provides a computer-readable storage medium. The computer-readable storage medium is configured to store a computer program, and when the computer program is run on a computer, the method in any one of the first aspect or the possible implementations of the first aspect is performed.

According to a tenth aspect, an embodiment of this application provides a computer-readable storage medium. The computer-readable storage medium is configured to store a computer program, and when the computer program is run on a computer, the method in any one of the second aspect or the possible implementations of the second aspect is performed.

According to an eleventh aspect, an embodiment of this application provides a computer program product. The computer program product includes a computer program or computer code, and when the computer program product runs on a computer, the method in any one of the first aspect or the possible implementations of the first aspect is performed.

According to a twelfth aspect, an embodiment of this application provides a computer program product. The computer program product includes a computer program or computer code, and when the computer program product runs on a computer, the method in any one of the second aspect or the possible implementations of the second aspect is performed.

According to a thirteenth aspect, an embodiment of this application provides a computer program. When the computer program is run on a computer, the method in any one of the first aspect or the possible implementations of the first aspect is performed.

According to a fourteenth aspect, an embodiment of this application provides a computer program. When the computer program is run on a computer, the method in any one of the second aspect or the possible implementations of the second aspect is performed.

According to a fifteenth aspect, an embodiment of this application provides a wireless communication system. The wireless communication system includes a transmit device and a receive device. The transmit device is configured to perform the method in any one of the first aspect or the possible implementations of the first aspect. The receive device is configured to perform the method in any one of the second aspect or the possible implementations of the second aspect.

DESCRIPTION OF DRAWINGS

FIG. 4a is a schematic flowchart of a signal processing method according to an embodiment of this application:

FIG. 4b is a schematic diagram of a structure of another PPDU according to an embodiment of this application.

DESCRIPTION OF EMBODIMENTS

Figure 1:
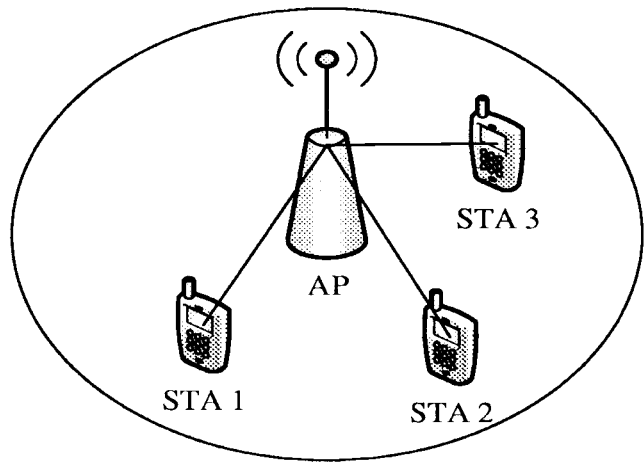
FIG. 1 is a schematic diagram of a communication system according to an embodiment of this application.

To make objectives, technical solutions, and advantages of this application clearer, the following further describes this application with reference to the accompanying drawings.

In the specification, claims, and the accompanying drawings of this application, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

An "embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It may be explicitly and implicitly understood by a person skilled in the art that the embodiments described in the specification may be combined with another embodiment.

In this application, "at least one piece (item)" means one or more, "a plurality of" means two or more, and "at least two pieces (items)" means two, three, or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items (pieces)" or a similar expression thereof means any combination of these items. For example, at least one (piece) of a, b, or c may represent: a, b, c, a and b, a and c, b and c, or a, b, and c.

A method provided in this application may be applied to various communication systems, for example, an Internet of things (Internet of things, IoT) system, a narrow band Internet of things (narrow band Internet of things, NB-IoT) system, a long term evolution (long term evolution, LTE) system, a 5th generation (5th generation, 5G) communication system, and a new communication system (for example, 6G) emerging in future communication development. The method provided in this application may further be applied to a wireless local area network (WLAN) system, for example, wireless fidelity (Wi-Fi).

The method provided in this application may be implemented by a communication apparatus in a wireless communication system. For example, the communication apparatus may be an access point (AP) device or a station (STA) device. For another example, the communication apparatus may alternatively be a wireless communication device that supports concurrent transmission on a plurality of links. For example, the communication apparatus may be referred to as a multi-link device (MLD) or a multi-band device.

The method provided in this application may be applied to a scenario in which one node performs data transmission with one or more nodes, or may be applied to single-user uplink/downlink transmission or multi-user uplink/downlink transmission, or may be applied to a device-to-device (D2D) transmission. Details are not described herein. The node may be an AP or a STA. For ease of description, the following uses communication between the AP and the STA as an example for description.

For example, a communication system to which the method provided in this application may be applied may include an access point (AP) device and a station (STA) device. The access point device may also be understood as an access point entity, and the station device may also be understood as a station entity. For example, this application is applicable to a scenario in which an AP communicates with a STA in a WLAN. Optionally, the AP may communicate with a single STA, or the AP simultaneously communicates with a plurality of STAs. Specifically, communication between the AP and the plurality of STAs may further be classified into downlink transmission in which the AP simultaneously sends signals to the plurality of STAs, and uplink transmission in which the plurality of STAs send signals to the AP. The AP and the STA may support a WLAN communication protocol. The communication protocol may include the IEEE 802.11be (which is also referred to as Wi-Fi 7 or the EHT protocol) protocol, and may further include protocols such as the IEEE 802.11ax protocol and the IEEE 802.11ac protocol. It is clear that with continuous evolution and development of communication technologies, the communication protocol may further include a next-generation protocol of IEEE 802.11be, and the like.

FIG. 1 is a schematic diagram of an architecture of a communication system according to an embodiment of this application. The communication system may include one or more APs and one or more STAs. FIG. 1 shows one access point device, for example, an AP, and three station devices, for example, a STA 1, a STA 2, and a STA 3. It may be understood that FIG. 1 shows only one AP and three STAs as an example. However, there may be more or less APs or STAs. This is not limited in this application.

The access point (for example, the AP in FIG. 1) is an apparatus with a wireless communication function, supports communication according to a WLAN protocol, and has a function of communicating with another device (for example, a station or another access point) in a WLAN. It is clear that the access point may further have a function of communicating with another device. Alternatively, the access point is equivalent to a bridge that connects a wired network and a wireless network. A main function of the access point is to connect various wireless network clients together and then connect the wireless network to the Ethernet. In a WLAN system, an access point may be referred to as an access point station (AP STA). The apparatus with a wireless communication function may be an entire device, or may be a chip or a processing system installed in an entire device. The device in which the chip or the processing system is installed may implement a method and a function in embodiments of this application under control of the chip or the processing system. The AP in this embodiment of this application is an apparatus that provides a service for the STA, and may support the 802.11 series protocols. For example, the access point may be an access point for a terminal device (for example, a mobile phone) to access a wired (or wireless) network, and is mainly deployed in a home, a building, and a park. A typical coverage radius is tens of meters to 100-odd meters. It is clear that the access point may alternatively be deployed outdoors. For another example, the AP may be a communication entity, for example, a communication server, a router, a switch, or a bridge, or the AP may include various forms of macro base stations, micro base stations, relay stations, and the like. It is clear that the AP may alternatively be a chip or a processing system in these devices in various forms, to implement the method and function in embodiments of this application. The access point in this application may be a high-efficiency (HE) AP, an extremely high throughput (EHT) AP, or an access point applicable to a future Wi-Fi standard.

The station (for example, the STA 1, the STA 2, or the like in FIG. 1) is an apparatus with a wireless communication function, supports communication according to a WLAN protocol, and has a function of communicating with another station or access point in a WLAN. In the WLAN system, a station may be referred to as a non-access point station (non-AP STA). For example, the STA is any user communication device that allows a user to communicate with an AP and then communicate with a WLAN. The apparatus with a wireless communication function may be an entire device, or may be a chip or a processing system installed in an entire device. The device in which the chip or the processing system is installed may implement a method and a function in embodiments of this application under control of the chip or the processing system. For example, the station may be a wireless communication chip, a wireless sensor, or a wireless communication terminal, and may also be referred to as a user. For another example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function.

The WLAN system can provide high-speed and low-latency transmission. With continuous evolution of WLAN application scenarios, the WLAN system is to be applied to more scenarios or industries, for example, the Internet of things industry, the Internet of vehicles industry, the banking industry, enterprise offices, exhibition halls of stadiums, concert halls, hotel rooms, dormitories, wards, classrooms, supermarkets, squares, streets, production workshops and warehousing. It is clear that a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the Internet of things, an entertainment terminal (for example, an AR, a VR, or another wearable device), a smart device (for example, a printer, a projector, a loudspeaker, or a stereo) in smart office, an Internet of vehicles device in the Internet of vehicles, an infrastructure (for example, a vending machine, a self-service navigation station of a supermarket, a self-service cash register device, or a self-service ordering machine) in daily life scenarios, a device in a large sports and music venue, and the like. For example, the access point and the station may be devices applied to the Internet of vehicles, Internet of things nodes or sensors in the Internet of things (IoT), smart cameras, smart remote controls, and smart water meters in a smart home, and sensors in a smart city. Specific forms of the STA and the AP are not limited in this embodiment of this application. This is merely an example for description herein.

Although this application is mainly described by using a network in which IEEE 802.11 is deployed as an example, a person skilled in the art easily understands that various aspects of this application can be expanded to other networks that use various standards or protocols, for example, Bluetooth, a high performance radio LAN (HIPERLAN) (a wireless standard that is similar to the IEEE 802.11 standard, and is mainly used in Europe), a wide area network (WAN), a wireless local area network (WLAN), a personal area network (PAN), or another known or later developed network.

Figure 2:
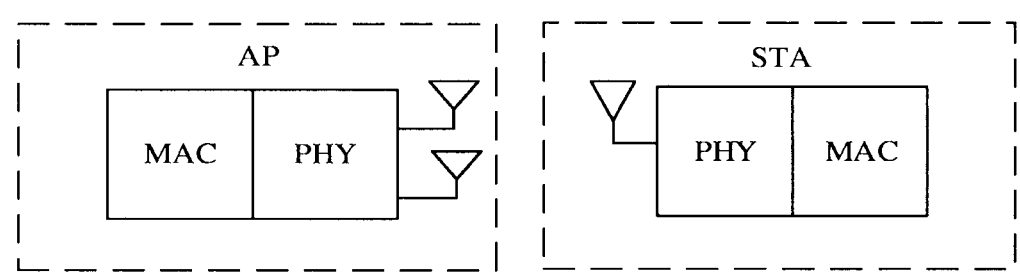
FIG. 2 is a schematic diagram of a structure of an access point (AP) device or a station (STA) device according to an embodiment of this application.

For example, FIG. 2 is a schematic diagram of a structure of an access point and a structure of a station according to an embodiment of this application. The AP may have a plurality of antennas, or may have a single antenna. As shown in FIG. 2, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 standard focuses on the PHY and the MAC. As shown in FIG. 2, FIG. 2 further shows a schematic diagram of a structure of a STA having a single antenna. In an actual scenario, the STA may alternatively have a plurality of antennas, and may be a device having more than two antennas. The STA may include a PHY processing circuit and a MAC processing circuit. The physical layer processing circuit may be configured to process a physical layer signal, and the MAC layer processing circuit may be configured to process a MAC layer signal.

In this application, a transmit device may be an access point device or a station device. Alternatively, a receive device may be an access point device or a station device. For example, the transmit device may be an access point device, and the receive device may also be an access point device. For another example, the transmit device is a station device, and the receive device may also be a station device. For another example, the transmit device is an access point device, and the receive device is a station device. For another example, the transmit device is a station device, and the receive device is an access point device. It may be understood that the transmit device and the receive device shown herein may also be collectively referred to as a communication apparatus.

It may be understood that a signal processing method provided in this application is described by using an example in which the transmit device sends a PPDU to the receive device in this application. However, the method shown in this application is further applicable to various types of PPDUs. For example, the PPDU may include a multi-user physical layer protocol data unit (multi-user PHY protocol data unit, MU PPDU), a single-user physical layer protocol data unit (single-user PHY protocol data unit, SU PPDU), a trigger-based physical layer protocol data unit (trigger based PHY protocol data unit, TB PPDU), or the like.

The following describes terms related to this application.
1. Orthogonal Frequency Division Multiplexing (OFDM)

Orthogonal frequency division multiplexing is a multi-carrier transmission technology. The technology may use a plurality of adjacent orthogonal subcarriers, and each subcarrier may be modulated by using a modulation technology. Therefore, the orthogonal frequency division multiplexing technology can implement high-rate transmission and can effectively resist frequency selective fading. For example, a VHT-LTF 1 to a VHT-LTF N in FIG. 3a may also be understood as OFDM symbols. In other words, a VHT-LTF in a physical (PHY) layer protocol data unit (PHY protocol data unit, PPDU) shown in FIG. 3a may also be understood as including N OFDM symbols.
2. Physical (PHY) Layer Protocol Data Unit (PHY Protocol Data Unit, PPDU)

Figure 3A:
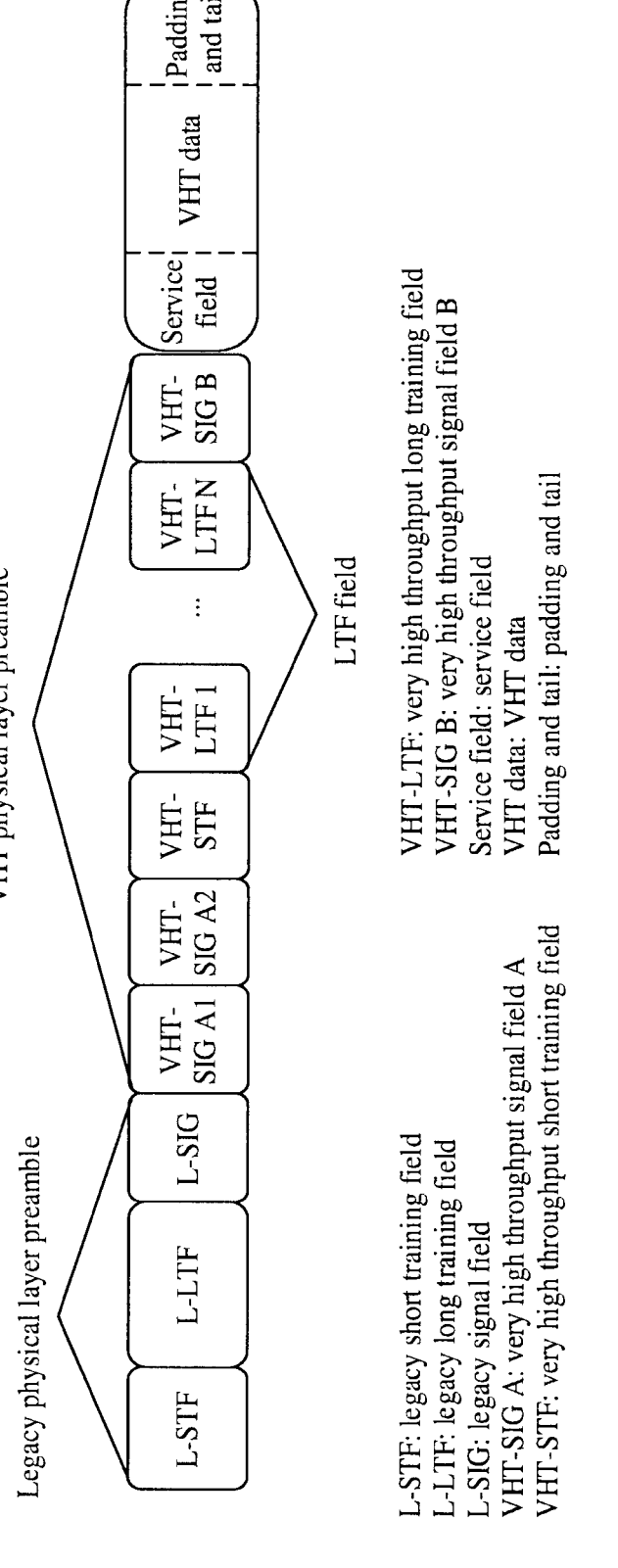
FIG. 3a is a schematic diagram of a structure of a PPDU according to an embodiment of this application.

For example, FIG. 3a is a schematic diagram of a frame structure of a very high throughput (VHT) PPDU (which may also be referred to as an 802.11ac PPDU). As shown in FIG. 3a, the VHT PPDU includes data (VHT data), a legacy physical layer preamble (legacy preamble), and a very high throughput preamble (VHT preamble). The legacy physical layer preamble includes a legacy short training field (legacy short training field, L-STF), a legacy long training field (L-LTF), and a legacy signal field (L-SIG). The very high throughput preamble includes a very high throughput signal field A (VHT-SIG A), a very high throughput short training field (VHT-STF), a very high throughput long training field (VHT-LTF), and a very high throughput signal field B (VHT-SIG B). The VHT-SIG A (which may also be referred to as a VHTSIGA) may include two OFDM symbols, and duration of each symbol is 4 μs. The VHT-LTF may include N VHT-LTF symbols, and the VHT-LTF may be used to help the receive device correctly estimate a channel, to help the receive device correctly decode received data information.

As shown in FIG. 3a, the PPDU may further include a service field, a VHT data field, and padding and tail (padding&tail) fields.
3. Pilot Subcarrier and Data Subcarrier In the WLAN communication protocol, each OFDM symbol may include a pilot subcarrier and a data subcarrier. The pilot subcarrier is a subcarrier on which a preset sequence is placed or carried in an OFDM symbol, and the data subcarrier is a subcarrier on which data is placed or carried. In the communication system, the pilot subcarrier may be used to help detect and correct a subcarrier phase offset, to improve accuracy of data subcarrier resolution. For example, each VHT-LTF symbol (which may also be referred to as an LTF symbol) included in the LTF shown in FIG. 3a, namely, each VHT-LTF symbol in the VHT-LTF 1 to the VHT-LTF N, may include a pilot subcarrier and a data subcarrier.

The 802.11 ac protocol supports simultaneous transmission of data of a maximum of eight streams, including a single-user multiple-input multiple-output (MIMO) technology and a multi-user MIMO technology. When a quantity of spatial streams is $N_{STS}$, a quantity $N_{LTF}$ of OFDM symbols included in the LTF shown in FIG. 3a may meet the following relationship:

$$N_{LTF} = \begin{cases} N_{STS} & \text{if } N_{STS} = 1, 2, 4, 6, 8 \\ N_{STS} + 1 & \text{if } N_{STS} = 3, 5, 7 \end{cases} \quad (1)$$

$N_{STS}$ indicates a maximum quantity of spatial streams supported by the communication apparatus (the quantity of spatial streams may also be referred to as a quantity of streams for short), and $N_{LTF}$ indicates a quantity of OFDM symbols included in the LTF (namely, a quantity of LTF symbols included in the LTF). For example, the VHT-LTF 1 to the VHT-LTF N shown in FIG. 3a are quantities of OFDM symbols included in the LTF, and N is a positive integer. In addition, each LTF symbol included in the LTF may include a data subcarrier and a pilot subcarrier. For example, the VHT-LTF 1 shown in FIG. 3a may include a plurality of data subcarriers and a plurality of pilot subcarriers, the VHT-LTF 2 may also include a plurality of data subcarriers and a plurality of pilot subcarriers, the VHT-LTF 3 may also include a plurality of data subcarriers and a plurality of pilot subcarriers, and the like. For example, the LTF includes N LTF symbols, and each of the N LTF symbols may include a plurality of data subcarriers and a plurality of pilot subcarriers. It may be understood that a quantity of data subcarriers and a quantity of pilot subcarriers included in each LTF symbol are not limited in this application. For specific quantities of data subcarriers and pilot subcarriers, refer to a related standard or protocol. Details are not described herein. For example, data subcarriers included in each of the N LTF symbols included in the LTF may be the same, and pilot subcarriers included in each LTF symbol may also be the same.

The LTF may be used to help the receiving end simultaneously estimate channels of a plurality of spatial streams. To accurately estimate the channel of the spatial stream and keep the LTF symbols of each stream orthogonal, a P matrix is proposed in the 802.11ac protocol. For example, $N_{STS}$=4, and a corresponding P matrix is:

$$P_{4*4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \qquad (2)$$

Figure 3B:
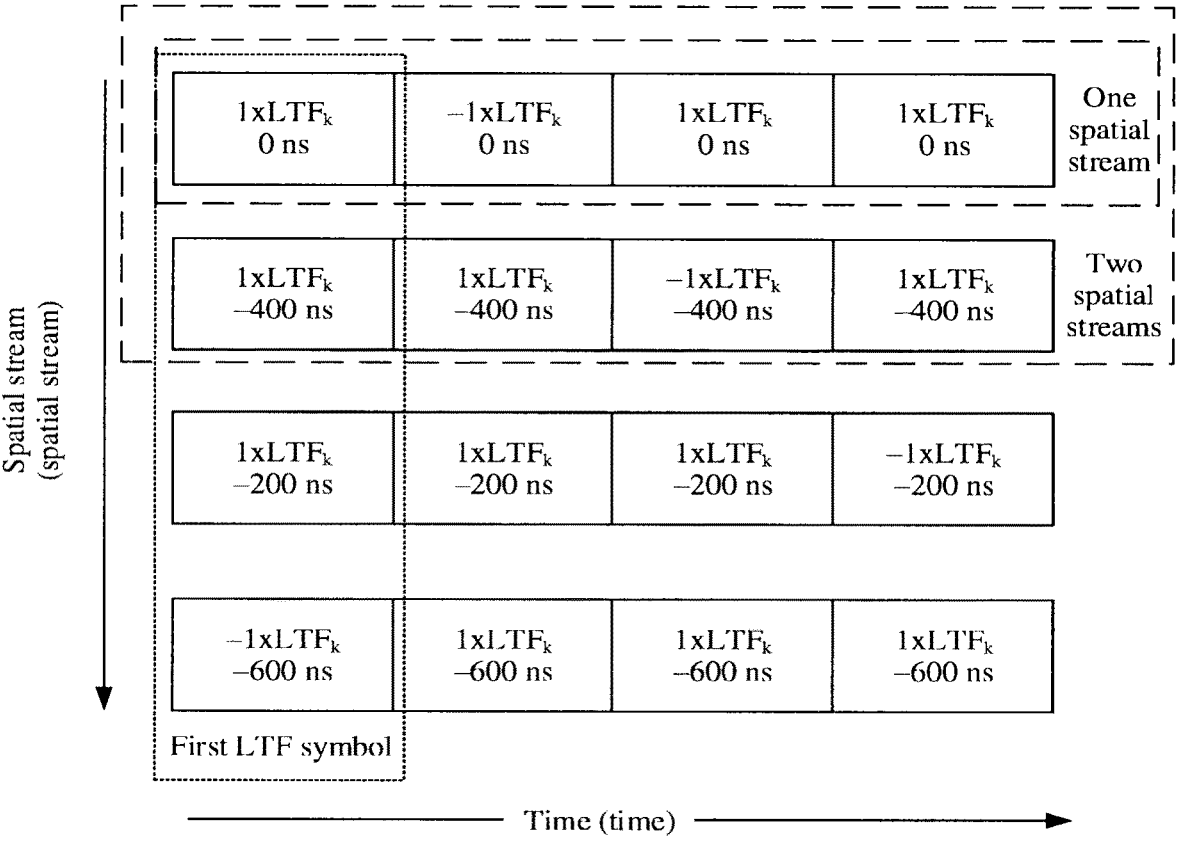
FIG. 3b is a schematic diagram of a relationship between a spatial stream and an LTF symbol according to an embodiment of this application.

In this case, a relationship between a spatial stream of the VHT-LTF and time may be shown in FIG. 3b. A structure of the VHT-LTF when $N_{STS}$=1, $N_{STS}$=2, or $N_{STS}$=3 may be part of content in a structure shown in FIG. 3b. Time marked in FIG. 3b, for example, 0 ns, −400 ns, −200 ns, or −600 ns, may be understood as a cyclic shift delay (cyclic shift diversity, CSD) corresponding to each spatial stream.

For example, when sending the PPDU, the transmit device may multiply a $j^{th}$ LTF symbol corresponding to an $i^{th}$ spatial stream by an element in an $i^{th}$ row and a $j^{th}$ column in a $P_{4×4}$ matrix. Herein, i may be a positive integer greater than or equal to 1 and less than or equal to 4, and j may be a positive integer greater than or equal to 1 and less than or equal to 4. It may be understood that FIG. 3b shows four LTF symbols, and FIG. 3b only marks a first LTF symbol as an example. It may be understood that i shown in this application may vary with a quantity of spatial streams, and j may also vary with the quantity of spatial streams. For example, when the quantity of spatial streams is eight, i may be an integer greater than or equal to 1 and less than or equal to 8, and j is an integer greater than or equal to 1 and less than or equal to 8.

Therefore, after a $k^{th}$ subcarrier corresponding to each LTF symbol passes through a channel $H_k$, a frequency domain signal $Y_k$ received by the receive device may be represented as:

$$Y_k = H_k \times P_{4×4} \times LTF_k \qquad (3)$$

The $P_{4×4}$ matrix is an orthogonal matrix, that is, $$P_{4×4} \times P_{4×4}^T = 4I,$$

I is an identity matrix, and $$P_{4×4}^T$$

is a conjugate transpose matrix of the $P_{4×4}$ matrix. Therefore, the receive device may estimate, according to the $P_{4×4}$ matrix, an $LTF_k$ sequence, and the received frequency domain signal $Y_k$, the MIMO channel $H_k$ corresponding to the $k^{th}$ subcarrier.

In other words, when the transmit device sends the PPDU, the signal sent on the data subcarrier in each LTF symbol may be obtained by multiplying the P matrix by the LTF sequence. When receiving the signal, the receive device may perform channel estimation according to the P matrix, the signal received on the data subcarrier in each LTF symbol, and the LTF sequence, to obtain a channel response $H_k$.

In addition, when the transmit device sends the PPDU, the signal sent on the pilot subcarrier in each LTF symbol may be obtained by multiplying an R matrix by the LTF sequence. When receiving the signal, the receive device may perform phase tracking, frequency offset estimation, and the like according to the R matrix, the signal received on the pilot subcarrier in each LTF symbol, and the LTF sequence.

In other words, when the transmit device sends the PPDU, the data subcarrier in the $j^{th}$ LTF symbol corresponding to the $i^{th}$ spatial stream (namely, the $j^{th}$ LTF symbol in the LTF in the PPDU) may be multiplied by the element in the $i^{th}$ row and the $j^{th}$ column of the P matrix, and the pilot subcarrier in the $j^{th}$ LTF symbol corresponding to the $i^{th}$ spatial stream is multiplied by an element in an $i^{th}$ row and a $j^{th}$ column of the R matrix. For example, the $i^{th}$ row of the R matrix may be equal to a first row of the P matrix. A relationship between the R matrix and the P matrix may be shown as follows:

$$R(i,j)=P(l, j) \qquad (4)$$

It can be seen that each row of the R matrix may be the same, and each row of the R matrix may be equal to the first row of the P matrix.

It may be understood that the LTF sequence shown above may be defined by a related standard, a protocol, or the like. This is not limited in this application. For example, the LTF sequence may be {1, 1, −1, −1, 1, 1, −1, 1, −1, 1,1, 1, 1, 1, −1, −1, 1, 1, −1, 1, −1, 1, 1, 1, 1}. For example, the LTF sequence may be {1, −1, −1, 1, 1, −1, 1, −1, 1, −1, −1, −1, −1, −1, 1, 1, −1, −1, 1, −1, 1, −1, 1, 1, 1, 1}.

The foregoing P matrix is shown by using an example in which a quantity of spatial streams is four. For example, when $N_{STS}$=2, a corresponding P matrix is:

$$P_{2*2} = \begin{bmatrix} 1 & -1 \\ 1 & 1 \end{bmatrix} \qquad (5)$$

For example, when $N_{STS}=6$, a corresponding P matrix is:

$$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad (6)$$

$w = \exp(-j2\pi/6)$.

For example, when $N_{STS}=8$, a corresponding P matrix is:

$$P_{8*8} = \begin{bmatrix} P_{4*4} & P_{4*4} \\ P_{4*4} & -P_{4*4} \end{bmatrix} \quad (7)$$

For example, a specific expression of Formula (7) may be:

$$P_{8\times8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix} \quad (8)$$

It can be seen from the foregoing descriptions that a maximum quantity of streams supported in the 802.11ax protocol is eight. However, in the next-generation EHT standard, a maximum quantity of spatial streams allowed is 16. Consequently, the P matrix cannot be directly applied to a scenario in which a quantity of streams is greater than 8.

In view of this, this application provides a signal processing method and an apparatus. The method provided in this application is applicable to a scenario in which a quantity of streams is greater than 8. For example, the method provided in this application may support channel estimation of 16 streams, for example, MIMO channel estimation of 16 streams. For another example, the method provided in this application may further support channel estimation of 32 streams or 24 streams. In addition, a $P_{n\times n}$ matrix provided in this application can further reduce space in which a communication apparatus stores the $P_{n\times n}$ matrix.

It may be understood that for descriptions of the communication apparatus and a communication system in the signal processing method provided in this application, refer to the foregoing descriptions. Details are not described herein again. It may be understood that the following describes the method provided in embodiments of this application by using an example in which the communication apparatus includes a transmit device and a receive device. The transmit device shown in the following may be understood as a device for sending a PPDU, and the receive device may be understood as a device for receiving a PPDU.

FIG. 4a is a schematic flowchart of a signal processing method according to an embodiment of this application. As shown in FIG. 4a, the method includes the following steps.

401: A transmit device generates a PPDU, where the PPDU includes a preamble, the preamble includes an LTF, the LTF includes a plurality of LTF symbols, the plurality of LTF symbols are used to carry a sequence obtained according to a first matrix, the first matrix is a $P_{n\times n}$ matrix, or the first matrix is obtained according to a $P_{n\times n}$ matrix, where $$P_{n\times n} \times P_{n\times n}^T = n \times I,$$

I is an identity matrix, the $P_{n\times n}$ matrix includes n rows and n columns, the $$P_{n\times n}^T$$

matrix is a transpose matrix of the $P_{n\times n}$ matrix, n is an integer greater than 8, and k indicates a $k^{th}$ subcarrier in each of the plurality of LTF symbols.

n may indicate a quantity of rows and a quantity of columns of the $P_{n\times n}$ matrix (which may also be referred to as a P matrix for short), and a maximum quantity of spatial streams supported when the transmit device sends a signal. In other words, when the transmit device sends the PPDU, the maximum quantity of spatial streams supported by the transmit device may be greater than 8.

For example, when n=12, the $P_{n\times n}$ matrix may include 12 rows and 12 columns. Therefore, the first matrix includes 12 rows and 12 columns. In addition, the maximum quantity of spatial streams supported by the transmit device may be 12, and the transmit device may further multiply an $n^{th}$ LTF symbol corresponding to an $m^{th}$ spatial stream by an $m^{th}$ row and an $n^{th}$ column in the first matrix (as shown in FIG. 3b). Correspondingly, a receive device may simultaneously estimate channels of spatial streams whose quantity is less than or equal to 12. For example, the receive device may further simultaneously estimate channels of eight spatial streams, or the receive device may further simultaneously estimate channels of four spatial streams. In other words, the receive device may perform channel estimation, phase tracking, frequency offset estimation, or the like according to some or all content of the first matrix. For example, when n=16, the first matrix may include 16 rows and 16 columns. In addition, the maximum quantity of spatial streams supported by the transmit device may be 16. Correspondingly, the receive device may simultaneously estimate channels of 16 spatial streams, or the receive device may further simultaneously estimate channels of spatial streams whose quantity is less than 16. For example, the receive device may further estimate channels of 2 to 15 spatial streams, for example, channels of two spatial streams, channels of three spatial streams, channels of four spatial streams, channels of six spatial streams, channels of eight spatial streams, channels of 12 spatial streams, or channels of 15 spatial streams, according to the $P_{n\times n}$ matrix provided in this embodiment of this application. This is not limited in this embodiment of this application.

For example, the maximum quantity of spatial streams supported by the transmit device may alternatively be 32 (or 24) or the like. In addition, the receive device may simultaneously estimate channels of spatial streams whose quantity is less than or equal to 32 (or 24).

The quantity of LTF symbols shown in this application may be greater than or equal to the quantity of spatial streams. For example, the quantity of LTF symbols is equal to the quantity n of spatial streams. For another example, the quantity of LTF symbols is equal to the quantity n+1 of spatial streams.

For example, the plurality of LTF symbols include data subcarriers. In this case, the first matrix may be equal to the $P_{n\times n}$ matrix. Alternatively, the first matrix is a transpose matrix (for example, $$P_{n\times n}^T)$$

of the $P_{n\times n}$ matrix. Alternatively, the first matrix is equal to an overall negation matrix (for example, $-P_{n\times n}$) of the $P_{n\times n}$ matrix. Alternatively, the first matrix is a transpose matrix (for example, $(-P_{n\times n})^T$) of an overall negation matrix of the $P_{n\times n}$ matrix. Alternatively, the first matrix is an overall negation matrix (for example, $$-P_{n\times n}^T)$$

of a transpose matrix of the $P_{n\times n}$ matrix. In other words, a data subcarrier in each of the plurality of LTF symbols in the LTF sent by the transmit device may be obtained according to the first matrix. It may be understood that the relationship between the first matrix and the P matrix shown herein is merely an example. However, any first matrix obtained based on the P matrix falls within the protection scope of this application.

For example, the plurality of LTF symbols include pilot subcarriers. In this case, the first matrix may be equal to an $R_{n\times n}$ matrix, and the $R_{n\times n}$ matrix may be obtained based on a $T^{th}$ row (or referred to as a row) of the $P_{n\times n}$ matrix. Herein, T is an integer greater than or equal to 1 and less than n. For example, the $R_{n\times n}$ matrix may be obtained based on a first row of the $P_{n\times n}$ matrix. For example, each row in the $R_{n\times n}$ matrix may alternatively be a first row of the $$P_{n\times n}^T$$

matrix. Alternatively, each row in the $R_{n\times n}$ matrix may be a first row of an overall negation matrix of the $P_{n\times n}$ matrix. Alternatively, each row in the $R_{n\times n}$ matrix may be a transpose matrix of an overall negation matrix of the $P_{n\times n}$ matrix.

For an example of the first matrix, refer to Formula (84) to Formula (89) shown in the following. For a relationship between the $R_{n\times n}$ matrix and the $P_{n\times n}$ matrix, refer to Formula (10) or the like shown in the following.

Therefore, that the plurality of LTF symbols included in the LTF are used to carry the sequence obtained according to the first matrix includes: data subcarriers in the plurality of LTF symbols are used to carry a sequence obtained according to the $P_{n\times n}$ matrix (which may also be referred to as a P matrix) and an LTF sequence, and pilot subcarriers in the plurality of LTF symbols are used to carry a sequence obtained according to the $R_{n\times n}$ matrix (which may also be referred to as an R matrix) and the LTF sequence. Further, the receive device receives the PPDU. A part that corresponds to the data subcarrier and that is in the plurality of LTF symbols included in the LTF in the PPDU may be obtained by multiplying the $P_{n\times n}$ matrix by the LTF sequence and performing inverse Fourier transform. A part that corresponds to the pilot subcarrier and that is in the plurality of LTF symbols may be obtained by multiplying the $R_{n\times n}$ matrix by the LTF sequence and performing inverse Fourier transform.

It may be understood that for the LTF sequence, the data subcarrier, the pilot subcarrier, a relationship between the P matrix and the data subcarrier, and a relationship between the R matrix and the pilot subcarrier, refer to the foregoing descriptions, for example, FIG. 3a or FIG. 3b. Details are not described herein again.

For example, FIG. 4b is a schematic diagram of a structure of another PPDU according to an embodiment of this application. As shown in FIG. 4b, the PPDU includes data (data), a legacy physical layer preamble, an extremely high throughput (EHT) preamble (EHT preamble), and packet extension (PE). The EHT preamble includes a repeated legacy signal field (RL-SIG), a universal signal field (U-SIG), an extremely high throughput short training field (EHT-STF), and an LTF. The LTF includes N EHT-LTFs (which may also be referred to as LTF symbols), and the N EHT-LTF symbols include an EHT-LTF 1 to an EHT-LTF N.

It may be understood that the PPDU generated by the transmit device may be shown in FIG. 4b, and the LTF symbol may include an EHT-LTF symbol.

402: The transmit device sends the PPDU. Correspondingly, the receive device receives the PPDU.

403: The receive device processes, according to the first matrix, signals received on the plurality of LTF symbols.

For example, the receive device may perform channel estimation according to the first matrix and the signal received on the data subcarrier in the plurality of LTF symbols. For example, the receive device may perform channel estimation according to the first matrix, the LTF sequence, and the signal received on the data subcarrier in the plurality of LTF symbols. For example, the receive device may alternatively perform phase tracking and/or frequency offset estimation according to the first matrix and the signal received on the pilot subcarrier in the plurality of LTF symbols. For example, the receive device may alternatively perform phase tracking and frequency offset estimation according to the first matrix, the LTF sequence, and the signal received on the pilot subcarrier in the plurality of LTF symbols.

A relationship between the first matrix $$A_{LTF}^k$$

and the $P_{n\times n}$ matrix or the $R_{n\times n}$ matrix may be shown in Formula (9). For example, for the $k^{th}$ subcarrier in each LTF symbol, when generating the LTF, the transmit device may generate the LTF according to a mapping matrix shown in the following.

$$A_{LTF}^k = \begin{cases} R_{n\times n} \text{ if the } k^{th} \text{ subcarrier is a pilot subcarrier} & (9) \\ P_{n\times n} \text{ if the } k^{th} \text{ subcarrier is a non-pilot subcarrier} \\ \qquad \text{ or a data subcarrier} \\ \text{(which may also be referred to as another case)} \end{cases}$$

It may be understood that the another case in Formula (9) may indicate a case in which the $k^{th}$ subcarrier is a non-pilot subcarrier. For example, if the $k^{th}$ subcarrier is a data subcarrier, the first matrix $$A_{LTF}^k = P_{n\times n}.$$

For example, the relationship between the $R_{n \times n}$ matrix and the $P_{n \times n}$ matrix may be shown as follows:

$$[R]_{m,n} = [P]_{1,n} \tag{10}$$

$[R]_{m,n}$ indicates an $m^{th}$ row of the $R_{n \times n}$ matrix, $[P]_{1,n}$ indicates the first row of the $P_{n \times n}$ matrix, and both m and n are integers greater than or equal to 1 and less than or equal to 16.

It may be understood that each row of the $R_{n \times n}$ matrix shown in this embodiment of this application may further be equal to a first row of an overall negation matrix of the $P_{n \times n}$ matrix, a first row of a transpose matrix of the $P_{n \times n}$ matrix, a first row of a transpose matrix of an overall negation matrix of the $P_{n \times n}$ matrix, or the like.

According to the method provided in this embodiment of this application, the receive device may implement channel estimation of more than eight streams. For example, the receive device may support MIMO channel estimation of up to 16 streams. In addition, the P matrix provided in this application can further adapt to requirements of different quantities of streams. Therefore, the receive device can implement MIMO channel estimation of 12 streams, 16 streams, and the like. MIMO channel estimation of a plurality of different quantities of streams can be implemented by using one $P_{n \times n}$ matrix, and redundancy of MIMO channel estimation is effectively reduced.

Usually, for a matrix with 16 rows and 16 columns, a communication apparatus usually needs to store values of 256 elements. Therefore, when generating the LTF, the communication apparatus (for example, the transmit device) may sequentially read the elements of the matrix. However, in the $P_{n \times n}$ matrix provided in this embodiment of this application, an $S_{(n-1) \times (n-1)}$ submatrix and the $P_{n \times n}$ matrix can be restored by storing only a vector (or the first vector x, the second vector y, or the like) of the first row or the first column of the $S_{(n-1) \times (n-1)}$ submatrix. Therefore, the complete $P_{n \times n}$ matrix does not need to be stored. In this way, storage space occupied by the matrix can be effectively reduced, and implementation complexity can be reduced. Alternatively, the $P_{n \times n}$ matrix provided in this application may include an element 1 and an element −1, and can further simplify calculation complexity. Alternatively, n elements in the $T^{th}$ row of the $P_{n \times n}$ matrix provided in this application are different, to effectively resolve spectral bump (spectral line).

The following describes the $P_{n \times n}$ matrix provided in this embodiment of this application based on a feature of the $P_{n \times n}$ matrix. It may be understood that one or more of a plurality of features shown in the following may be the feature of the $P_{n \times n}$ matrix. For example, one of the following features 1 to 7 may be the feature of the $P_{n \times n}$ matrix. Alternatively, a combination of any two of the following features 1 to 7 is features of the $P_{n \times n}$ matrix. Alternatively, a combination of any three or the like of the following features 1 to 7 is features of the $P_{n \times n}$ matrix. Alternatively, the following features 1 to 7 may all be features of the $P_{n \times n}$ matrix.

Feature 1:

The $P_{n \times n}$ matrix includes an element 1 and an element −1.

In this embodiment of this application, the $P_{n \times n}$ matrix may be a matrix including an element 1 and an element −1. This resolves complex implementation caused by storing another more complex element (for example, a complex number) by the communication apparatus. In other words, the $P_{n \times n}$ matrix provided in this embodiment of this application may effectively simplify calculation complexity.

Feature 2:

n elements in the $T^{th}$ row of the $P_{n \times n}$ matrix are different, and T is an integer greater than or equal to 1 and less than n.

In this embodiment of this application, for example, n elements in the first row of the $P_{n \times n}$ matrix are different. Alternatively, n elements in a second row of the $P_{n \times n}$ matrix are different. Alternatively, n elements in the $T^{th}$ row of the $P_{n \times n}$ matrix are different. Therefore, the n elements in each row of the $R_{n \times n}$ matrix obtained according to the $P_{n \times n}$ matrix may also be different. This effectively resolves spectral bump.

With reference to the feature 1 and the feature 2, the elements of the $P_{n \times n}$ matrix provided in this embodiment of this application are simple, and n elements in each row of the $P_{n \times n}$ matrix are different. This resolves a complex operation of the communication apparatus, and effectively resolves spectral bump.

Feature 3:

The submatrix $S_{(n-1) \times (n-1)}$ of the $P_{n \times n}$ matrix is a circulant matrix or a Hankel matrix.

The circulant matrix may be a special form of a Toeplitz (Toeplitz) matrix (which may also be referred to as a diagonal-constant matrix). Each element of a column vector of the circulant matrix may be a result obtained by sequentially shifting each element of a previous column vector to the right by one bit.

The Hankel matrix is a square matrix in which elements on each skew-diagonal are equal.

In this embodiment of this application, the submatrix $S_{(n-1) \times (n-1)}$ of the $P_{n \times n}$ matrix is set to a circulant matrix or a Hankel matrix, and the communication apparatus can restore the submatrix only by storing a first row or a first column of the submatrix $S_{(n-1) \times (n-1)}$. This can effectively save storage space of the communication apparatus, and reduce implementation complexity.

It may be understood that for an example in which the submatrix $S_{(n-1) \times (n-1)}$ is a Hankel matrix, refer to Formula (51) and Formula (52) shown in the following.

Feature 4:

The first row of the submatrix $S_{(n-1) \times (n-1)}$ of the $P_{n \times n}$ matrix is equal to the first vector x, or is obtained based on the first vector x, and x=[1 1 1 −1 1 1 −1 1 −1 −1 −1] (in this case, n=12). Alternatively, the first row of the submatrix $S_{(n-1) \times (n-1)}$ of the $P_{n \times n}$ matrix is equal to the second vector y, or is obtained based on the second vector y, and y=[1 1 1 −1 −1 −1 −1 1 −1 1 −1 −1 1 1 −1] (in this case, n=16).

In this embodiment of this application, another row of the submatrix $S_{(n-1) \times (n-1)}$ may also be obtained based on the first vector x or the second vector y. For ease of description, the following describes each matrix provided in embodiments of this application by using an example in which the first row of the submatrix $S_{(n-1) \times (n-1)}$ is equal to the first vector x (or the second vector y) or obtained based on the first vector x (or the second vector y). However, this should not be construed as a limitation on embodiments of this application.

For example, the first row of the submatrix $S_{(n-1) \times (n-1)}$ may be obtained by performing one or more of three operations: cyclic shift, reversing, or overall negation on the first vector x.

For example, the first row of the submatrix $S_{(n-1) \times (n-1)}$ may be obtained by performing one or more of three operations: cyclic shift, reversing, or overall negation on the second vector y.

For example, the first row of the submatrix $S_{(n-1) \times (n-1)}$ is equal to an overall negation vector of the first vector, for example, the first row of the submatrix $S_{(n-1)\times(n-1)}$ is equal to $[-1\ -1\ -1\ 1\ -1\ 1\ 1\ -1\ 1\ 1\ 1]$ (which may also be denoted as $-x$).

For another example, the first row of the submatrix $S_{(n-1)\times(n-1)}$ is equal to a reversing vector of the first vector, for example, the first row of the submatrix $S_{(n-1)\times(n-1)}$ is equal to $[-1\ -1\ -1\ 1\ -1\ -1\ 1\ -1\ 1\ 1\ 1]$ (which may also be denoted as a reversing vector of x).

For another example, the first row of the submatrix $S_{(n-1)\times(n-1)}$ is equal to a cyclic shift vector of the first vector, for example, the first row of the submatrix $S_{(n-1)\times(n-1)}$ is equal to $[-1\ 1\ 1\ 1\ -1\ -1\ 1\ -1\ -1]$. In other words, the first row of the submatrix $S_{(n-1)\times(n-1)}$ is obtained by shifting the first vector x to the right by one bit. For another example, the first row of the submatrix $S_{(n-1)\times(n-1)}$ is equal to $[1\ 1\ -1\ 1\ -1\ -1\ 1\ -1\ -1\ -1\ 1]$. In other words, the first row of the submatrix $S_{(n-1)\times(n-1)}$ is obtained by shifting the first vector x to the left by one bit.

For example, the first row of the submatrix $S_{(n-1)\times(n-1)}$ is equal to an overall negation vector of the second vector, for example, the first row of the submatrix $S_{(n-1)\times(n-1)}$ is equal to $[-1\ -1\ -1\ 1\ 1\ 1\ 1\ -1\ 1\ -1\ 1\ 1\ -1\ -1\ 1]$ (which may also be denoted as $-y$).

For another example, the first row of the submatrix $S_{(n-1)\times(n-1)}$ is equal to a reversing vector of the second vector, for example, the first row of the submatrix $S_{(n-1)\times(n-1)}$ is equal to $[-1\ 1\ 1\ -1\ -1\ 1\ -1\ 1\ -1\ -1\ -1\ -1\ 1\ 1\ 1]$ (which may also be denoted as a reversing vector of y).

For another example, the first row of the submatrix $S_{(n-1)\times(n-1)}$ is equal to a cyclic shift vector of the second vector, for example, the first row of the submatrix $S_{(n-1)\times(n-1)}$ is equal to $[-1\ 1\ 1\ 1\ -1\ -1\ -1\ -1\ 1\ -1\ -1\ -1\ 1\ 1]$. In other words, the first row of the submatrix $S_{(n-1)\times(n-1)}$ is obtained by shifting the second vector y to the right by one bit. For another example, the first row of the submatrix $S_{(n-1)\times(n-1)}$ is equal to $[1\ 1\ -1\ -1\ -1\ -1\ 1\ -1\ 1\ -1\ -1\ 1\ 1\ -1\ 1]$. In other words, the first row of the submatrix $S_{(n-1)\times(n-1)}$ is obtained by shifting the second vector y to the left by one bit.

For example, when the first row of the submatrix $S_{(n-1)\times(n-1)}$ is obtained based on the first vector x, a second row of an S matrix $P_{(n-1)\times(n-1)}$ may also be obtained based on cyclic shift of the first vector x, and a third row of the S matrix $P_{(n-1)\times(n-1)}$ may also be obtained based on cyclic shift of the first vector x. Alternatively, after the first row of the submatrix $S_{(n-1)\times(n-1)}$ is determined based on the first vector x, the second row to an $(n-1)^{th}$ row of the submatrix $S_{(n-1)\times(n-1)}$ may also be obtained based on cyclic shift of the first row.

For example, the first row of the submatrix $S_{(n-1)\times(n-1)}$ is equal to $[1\ 1\ 1\ -1\ 1\ -1\ -1\ 1\ -1\ -1\ -1]$, the second row of the submatrix $S_{(n-1)\times(n-1)}$ is equal to $[-1\ 1\ 1\ 1\ -1\ 1\ -1\ -1\ 1\ 1\ -1\ -1]$ (namely, shifting 11 elements of x to the right by one bit), and the third row of the submatrix $S_{(n-1)\times(n-1)}$ is equal to $[-1\ -1\ 1\ 1\ 1\ -1\ 1\ -1\ -1\ 1\ -1]$ (namely, shifting 11 elements of x the right by two bits). The rest can be deduced by analogy, and the submatrix $S_{(n-1)\times(n-1)}$ may be obtained.

For another example, the first row of the submatrix $S_{(n-1)\times(n-1)}$ is equal to $[1\ 1\ 1\ -1\ 1\ -1\ -1\ 1\ -1\ -1\ -1]$, the second row of the submatrix $S_{(n-1)\times(n-1)}$ is equal to $[1\ 1\ -1\ 1\ -1\ -1\ 1\ -1\ -1\ -1\ 1]$ (namely, shifting 11 elements of x to the left by one bit), and the third row of the submatrix $S_{(n-1)\times(n-1)}$ is equal to $[1\ -1\ 1\ -1\ -1\ 1\ -1\ -1\ -1\ 1\ 1]$ (namely, shifting 11 elements of x the left by two bits). The rest can be deduced by analogy, and the submatrix $S_{(n-1)\times(n-1)}$ may be obtained. For another example, the first row of the submatrix $S_{(n-1)\times(n-1)}$ is equal to $[-1\ -1\ -1\ 1\ -1\ 1\ 1\ -1\ 1\ 1\ 1]$, the second row of the submatrix $S_{(n-1)\times(n-1)}$ is equal to $[1\ -1\ -1\ -1\ 1\ -1\ 1\ 1\ -1\ 1\ 1]$ (namely, shifting 11 elements of an overall negation vector of x to the right by one bit), and the third row of the submatrix $S_{(n-1)\times(n-1)}$ is equal to $[1\ 1\ -1\ -1\ 1\ 1\ -1\ 1\ 1\ -1\ 1]$. The rest can be deduced by analogy, and the submatrix $S_{(n-1)\times(n-1)}$ may be obtained.

For another example, the first row of the submatrix $S_{(n-1)\times(n-1)}$ is equal to $[-1\ -1\ -1\ 1\ 1\ -1\ 1\ 1\ -1\ 1\ 1\ 1]$, the second row of the submatrix $S_{(n-1)\times(n-1)}$ is equal to $[-1\ -1\ 1\ -1\ 1\ 1\ -1\ 1\ 1\ 1\ -1]$ (namely, shifting 11 elements of an overall negation vector of x to the left by one bit), and the third row of the submatrix $S_{(n-1)\times(n-1)}$ is equal to $[-1\ 1\ -1\ 1\ 1\ -1\ 1\ 1\ 1\ -1\ -1]$. The rest can be deduced by analogy, and the submatrix $S_{(n-1)\times(n-1)}$ may be obtained.

For another example, the first row of the submatrix $S_{(n-1)\times(n-1)}$ is equal to $[-1\ -1\ -1\ 1\ -1\ -1\ 1\ -1\ 1\ 1\ 1]$, the second row of the submatrix $S_{(n-1)\times(n-1)}$ is equal to $[1\ -1\ -1\ -1\ 1\ -1\ -1\ 1\ -1\ 1\ 1]$ (namely, shifting 11 elements of a reversing vector of x to the right by one bit), and the third row of the submatrix $S_{(n-1)\times(n-1)}$ is equal to $[1\ 1\ -1\ -1\ -1\ -1\ 1\ -1\ 1\ 1]$. The rest can be deduced by analogy, and the submatrix $S_{(n-1)\times(n-1)}$ may be obtained.

For another example, the first row of the submatrix $S_{(n-1)\times(n-1)}$ is equal to $[-1\ -1\ -1\ 1\ -1\ -1\ 1\ -1\ 1\ 1\ 1]$, the second row of the submatrix $S_{(n-1)\times(n-1)}$ is equal to $[-1\ -1\ 1\ -1\ -1\ 1\ -1\ 1\ 1\ 1\ -1]$ (namely, shifting 11 elements of a reversing vector of x to the left by one bit), and the third row of the submatrix $S_{(n-1)\times(n-1)}$ is equal to $[-1\ 1\ -1\ -1\ 1\ -1\ 1\ 1\ 1\ -1\ -1]$. The rest can be deduced by analogy, and the submatrix $S_{(n-1)\times(n-1)}$ may be obtained.

In other words, each element of a row vector of the submatrix $S_{(n-1)\times(n-1)}$ is a result obtained by sequentially shifting each element of a previous row vector to the right by one bit. Alternatively, each element of a row vector of the submatrix $S_{(n-1)\times(n-1)}$ is a result obtained by sequentially shifting each element of a previous row vector to the left by one bit.

For example, when the first row of the submatrix $S_{(n-1)\times(n-1)}$ is equal to the second vector y or obtained based on the second vector y, the second row to an $(n-1)^{th}$ row of the submatrix $S_{(n-1)\times(n-1)}$ may also be obtained based on cyclic shift of the first row.

It may be understood that, for descriptions of the submatrix $S_{(n-1)\times(n-1)}$ and the second vector y, refer to the foregoing examples of the submatrix $S_{(n-1)\times(n-1)}$ and the first vector x. Details are not described herein again.

In this embodiment of this application, after obtaining the first row of the submatrix $S_{(n-1)\times(n-1)}$ of the $P_{n\times n}$ matrix based on the first vector or the second vector, the communication apparatus may obtain $S_{(n-1)\times(n-1)}$. Therefore, the communication apparatus only needs to store a row of the submatrix $S_{(n-1)\times(n-1)}$ of the $P_{n\times n}$ matrix, to restore the submatrix. Alternatively, when a relationship between a row of the submatrix and the first vector or the second vector is determined, the communication apparatus can restore the submatrix only by storing the first vector or the second vector. Therefore, the complete $P_{n\times n}$ matrix does not need to be stored. Further, this can reduce space occupied by the $P_{n\times n}$ matrix, save storage space, and effectively reduce implementation complexity of the communication apparatus (for example, the submatrix $S_{(n-1)\times(n-1)}$ of the $P_{n\times n}$ matrix can be restored based on an operation such as cyclic shift).

Feature 5:

The first column of the submatrix $S_{(n-1)\times(n-1)}$ of the $P_{n\times n}$ matrix is equal to a third vector x', or is obtained based on a third vector x' (in this case, n=12). Alternatively, the first column of the submatrix $S_{(n-1)\times(n-1)}$ of the $P_{n\times n}$ matrix is equal to a fourth vector y', or is obtained based on a fourth vector y' (in this case, n=16).

The third vector x' may be shown as follows:

$$x' = \begin{bmatrix} 1 \\ -1 \\ -1 \\ -1 \\ 1 \\ -1 \\ -1 \\ 1 \\ -1 \\ 1 \\ 1 \end{bmatrix} \quad (11)$$

The fourth vector y' may be shown as follows:

$$y' = \begin{bmatrix} 1 \\ -1 \\ 1 \\ 1 \\ -1 \\ -1 \\ 1 \\ -1 \\ 1 \\ -1 \\ -1 \\ -1 \\ -1 \\ 1 \\ 1 \end{bmatrix} \quad (12)$$

For example, the first column of the submatrix $S_{(n-1)\times(n-1)}$ may be obtained by performing one or more of three operations: cyclic shift, reversing, or overall negation on the third vector.

For example, the first column of the submatrix $S_{(n-1)\times(n-1)}$ may be obtained by performing one or more of three operations: cyclic shift, reversing, or overall negation on the fourth vector y'.

For example, the first column of the submatrix $S_{(n-1)\times(n-1)}$ is equal to a reversing vector of the third vector, for example, the first column of the submatrix $S_{(n-1)\times(n-1)}$ is equal to [1 1 −1 1 −1 −1 1 1 −1 −1 −1 1]$^T$.

For another example, the first column of the submatrix $S_{(n-1)\times(n-1)}$ is equal to an overall negation vector of the third vector, for example, the first column of the submatrix $S_{(n-1)\times(n-1)}$ is equal to [−1 1 1 1 −1 1 1 −1 1 −1 −1]$^T$.

For another example, the first column of the submatrix $S_{(n-1)\times(n-1)}$ is equal to a transpose vector of a cyclic shift vector of the third vector, for example, the first column of the submatrix $S_{(n-1)\times(n-1)}$ is equal to [−1 −1 −1 1 −1 −1 1 −1 1 1 1]$^T$. In other words, the first column of the submatrix $S_{(n-1)\times(n-1)}$ is obtained by cyclically shifting the third vector x' upwards by one bit. For another example, the first column of the submatrix $S_{(n-1)\times(n-1)}$ is equal to [1 1 −1 −1 −1 1 −1 −1 1 1 −1 1]$^T$. In other words, the first column of the submatrix $S_{(n-1)\times(n-1)}$ is obtained by cyclically shifting the third vector x' downwards by one bit.

It may be understood that, after the first column of the submatrix $S_{(n-1)\times(n-1)}$ is determined based on the third vector x', a second column to an $(n-1)^{th}$ column of the submatrix $S_{(n-1)\times(n-1)}$ may also be obtained based on cyclic shift of the first column.

For example, the first column of the submatrix $S_{(n-1)\times(n-1)}$ is equal to an overall negation vector of the fourth vector, for example, the first column of the submatrix $S_{(n-1)\times(n-1)}$ is equal to [−1 1 −1 −1 1 1 −1 1 1 1 1 −1 −1 −1]$^T$.

For another example, the first column of the submatrix $S_{(n-1)\times(n-1)}$ is equal to a reversing vector of a transpose vector of the fourth vector, for example, the first column of the submatrix $S_{(n-1)\times(n-1)}$ is equal to [1 1 −1 −1 −1 −1 1 −1 1 −1 −1 1 1 −1 1]$^T$.

For another example, the first column of the submatrix $S_{(n-1)\times(n-1)}$ is equal to a transpose vector of a cyclic shift vector of the fourth vector, for example, the first column of the submatrix $S_{(n-1)\times(n-1)}$ is equal to [−1 1 1 −1 −1 1 −1 −1 −1 −1 1 1 1]$^T$. In other words, the first column of the submatrix $S_{(n-1)\times(n-1)}$ is obtained by cyclically shifting the fourth vector y' upwards by one bit. For another example, the first column of the submatrix $S_{(n-1)\times(n-1)}$ is equal to [1 1 −1 1 1 −1 1 −1 1 −1 −1 −1 −1 1 1]$^T$. In other words, the first row of the submatrix $S_{(n-1)\times(n-1)}$ is obtained by cyclically shifting the fourth vector y' downwards by one bit.

It may be understood that, for descriptions of a relationship between the first column of the submatrix $S_{(n-1)\times(n-1)}$ and the third vector x' or the fourth vector y', refer to descriptions of the feature 4. Details are not described herein again.

For ease of description, the following describes the $P_{n\times n}$ matrix provided in embodiments of this application by using an example in which the first row of the submatrix $S_{(n-1)\times(n-1)}$ of the $P_{n\times n}$ matrix is equal to the first vector (or the second vector) or obtained based on the first vector (or the second vector). The following does not describe in detail an example in which the first column of the submatrix $S_{(n-1)\times(n-1)}$ of the $P_{n\times n}$ matrix is equal to the third vector (or the fourth vector) or obtained based on the third vector (or the fourth vector).

Feature 6:

$$P_{n\times n} = \begin{bmatrix} S_{(n-1)\times(n-1)} & a \\ a^T & 1 \end{bmatrix} \quad (13)$$

$$P_{n\times n} = \begin{bmatrix} a & S_{(n-1)\times(n-1)} \\ 1 & a^T \end{bmatrix} \quad (14)$$

$$P_{n\times n} = \begin{bmatrix} S_{(n-1)\times(n-1)} & -a \\ a^T & 1 \end{bmatrix} \quad (15)$$

$$P_{n\times n} = \begin{bmatrix} -a & S_{(n-1)\times(n-1)} \\ 1 & a^T \end{bmatrix} \quad (16)$$

The $S_{(n-1)\times(n-1)}$ matrix is a submatrix of the $P_{n\times n}$ matrix, the $S_{(n-1)\times(n-1)}$ matrix includes n−1 rows and n−1 columns, $\alpha$ is a column vector including n−1 elements, each element is 1, $\alpha^T$ is a transpose vector of $\alpha$, and $-\alpha$ indicates a vector obtained through negation of all elements in $\alpha$.

In this embodiment of this application, $S_{(n-1)\times(n-1)}$ may be a circulant matrix or a Hankel matrix.

In this embodiment of this application, it can be ensured that the $P_{n\times n}$ matrix is an orthogonal matrix, and the submatrix $S_{(n-1)\times(n-1)}$ is a circulant matrix or a Hankel matrix. The communication apparatus can restore the submatrix and the $P_{n\times n}$ matrix by storing a vector (or the first vector x, the second vector y, or the like) of the first row or the first column of the submatrix $S_{(n-1)\times(n-1)}$. Therefore, the complete $P_{n\times n}$ matrix does not need to be stored. In this way, storage space occupied by the $P_{n\times n}$ matrix can be effectively reduced, storage space can be saved, and implementation complexity of the communication apparatus can be effectively reduced.

Feature 7:

$$P_{16\times16} = \begin{bmatrix} P_{8\times8} & P_{8\times8} \\ P_{8\times8} & -P_{8\times8} \end{bmatrix} \tag{17}$$

$$P_{16\times16} = \begin{bmatrix} -P_{8\times8} & P_{8\times8} \\ P_{8\times8} & P_{8\times8} \end{bmatrix} \tag{18}$$

$$P_{16\times16} = \begin{bmatrix} P_{8\times8} & -P_{8\times8} \\ P_{8\times8} & P_{8\times8} \end{bmatrix} \tag{19}$$

$$P_{16\times16} = \begin{bmatrix} P_{8\times8} & P_{8\times8} \\ -P_{8\times8} & P_{8\times8} \end{bmatrix} \tag{20}$$

In other words, the $P_{16\times16}$ matrix (namely, the $P_{n\times n}$ matrix when n=16) may be obtained according to the $P_{8\times8}$ matrix. The $P_{8\times8}$ matrix is a corresponding P matrix when a maximum quantity of spatial streams supported by the communication apparatus is 8.

For example, $$P_{8\times8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix} \tag{21}$$

In this embodiment of this application, the $P_{8\times8}$ matrix is extended, to generate the $P_{16\times16}$ matrix. This can ensure that the communication apparatus supports transmission of data of 16 streams or fewer than 16 streams, and avoid excessive complex operations.

It may be understood that, in this embodiment of this application, a $P_{32\times32}$ matrix may be obtained according to the $P_{16\times16}$ matrix, and a $P_{24\times24}$ matrix may be obtained according to the $P_{12\times12}$ matrix. A specific obtaining method is similar to the manner of generating the $P_{16\times16}$ matrix by extending the $P_{8\times8}$ matrix. For brevity, the following does not describe in detail a method for obtaining the $P_{24\times24}$ matrix according to the $P_{12\times12}$ matrix and a method for obtaining the $P_{32\times32}$ matrix according to the $P_{16\times16}$ matrix.

The $P_{12\times12}$ matrix is extended, to generate the $P_{24\times24}$ matrix, or the $P_{16\times16}$ matrix is extended, to generate the $P_{32\times32}$ matrix. This can ensure that the communication apparatus supports transmission of data of 32 streams or fewer than 32 streams, and avoid excessive complex operations.

For example, the following first describes in detail the $P_{n\times n}$ matrix provided in embodiments of this application, then describes the $R_{n\times n}$ matrix provided in embodiments of this application, and finally describes the first matrix provided in embodiments of this application.

In a possible implementation, the $P_{12\times12}$ matrix may be shown as follows:

$$P_{12\times12} = \begin{bmatrix} 1 & 1 & 1 & -1 & 1 & -1 & -1 & 1 & -1 & -1 & -1 & 1 \\ -1 & 1 & 1 & 1 & -1 & 1 & -1 & -1 & 1 & -1 & -1 & 1 \\ -1 & -1 & 1 & 1 & 1 & -1 & 1 & -1 & -1 & 1 & -1 & 1 \\ -1 & -1 & -1 & 1 & 1 & 1 & -1 & 1 & -1 & -1 & 1 & 1 \\ 1 & -1 & -1 & -1 & 1 & 1 & 1 & -1 & 1 & -1 & -1 & 1 \\ -1 & 1 & -1 & -1 & -1 & 1 & 1 & 1 & -1 & 1 & -1 & 1 \\ -1 & -1 & 1 & -1 & -1 & -1 & 1 & 1 & 1 & -1 & 1 & 1 \\ 1 & -1 & -1 & 1 & -1 & -1 & -1 & 1 & 1 & 1 & -1 & 1 \\ -1 & 1 & -1 & -1 & 1 & -1 & -1 & -1 & 1 & 1 & 1 & 1 \\ 1 & -1 & 1 & -1 & -1 & 1 & -1 & -1 & -1 & 1 & 1 & 1 \\ 1 & 1 & -1 & 1 & -1 & -1 & 1 & -1 & -1 & -1 & 1 & 1 \\ 1 & 1 & 1 & 1 & 1 & 1 & 1 & 1 & 1 & 1 & 1 & 1 \end{bmatrix} \tag{22}$$

Alternatively, $$P_{12\times12} = \begin{bmatrix} 1 & 1 & 1 & -1 & 1 & -1 & -1 & 1 & -1 & -1 & -1 & 1 \\ 1 & 1 & -1 & 1 & -1 & -1 & 1 & -1 & -1 & -1 & 1 & 1 \\ 1 & -1 & 1 & 1 & 1 & -1 & 1 & -1 & -1 & 1 & 1 & 1 \\ -1 & -1 & -1 & 1 & 1 & 1 & -1 & 1 & -1 & -1 & 1 & 1 \\ 1 & -1 & -1 & -1 & 1 & 1 & 1 & -1 & 1 & -1 & -1 & 1 \\ -1 & 1 & -1 & -1 & -1 & 1 & 1 & 1 & -1 & 1 & -1 & 1 \\ -1 & -1 & 1 & -1 & -1 & -1 & 1 & 1 & 1 & -1 & 1 & 1 \\ 1 & -1 & -1 & 1 & -1 & -1 & -1 & 1 & 1 & 1 & -1 & 1 \\ -1 & 1 & -1 & -1 & 1 & -1 & -1 & -1 & 1 & 1 & 1 & 1 \\ 1 & -1 & 1 & -1 & -1 & 1 & -1 & -1 & -1 & 1 & 1 & 1 \\ 1 & 1 & -1 & 1 & -1 & -1 & 1 & -1 & -1 & -1 & 1 & 1 \\ 1 & 1 & 1 & 1 & 1 & 1 & 1 & 1 & 1 & 1 & 1 & 1 \end{bmatrix} \tag{23}$$

Formula (22) is shown by using an example in which a first row of a submatrix $S_{(n-1)\times(n-1)}$ is equal to [1 1 1 −1 1 −1 −1 1 −1 −1 −1] (namely, equal to the first vector). However, it should not be understood as a limitation on this embodiment of this application. It may be understood that each element of a row vector of the submatrix $S_{(n-1)\times(n-1)}$ shown in Formula (22) is a result obtained by sequentially shifting each element of a previous row vector to the right by one bit. Each element of a row vector of the submatrix $S_{(n-1)\times(n-1)}$ shown in Formula (23) is a result obtained by sequentially shifting each element of a previous row vector to the left by one bit. It may be understood that Formula (22) and Formula (23) shown herein may also be understood as the $P_{n\times n}$ matrix obtained according to Formula (13). A result obtained by sequentially shifting each element of a row vector of $S_{(n-1)\times(n-1)}$ to the right by two (or three, four, or the like) bits, or a result obtained by sequentially shifting each element of a row vector of $S_{(n-1)\times(n-1)}$ to the left by two (or three, four, or the like) bits shall also fall within the protection scope of this application. Therefore, for brevity, the following only shows a result obtained by sequentially shifting each element of a row vector of the submatrix $S_{(n-1)\times(n-1)}$ to the right by one bit as an example. In addition, for brevity, matrices obtained based on any one or more of the three operations of cyclic shift, overall negation, and reversing in Formula (22) or Formula (23) are not enumerated herein.

It can be seen from Formula (22) and Formula (23) that the submatrix $S_{(n-1)\times(n-1)}$ of the $P_{n\times n}$ matrix shown in this embodiment of this application is a circulant matrix or a Hankel matrix, and the communication apparatus can obtain the complete $P_{n\times n}$ matrix only by storing the first row of the submatrix $S_{(n-1)\times(n-1)}$. This can effectively save storage space of the communication apparatus, and reduce complexity of restoring the $P_{n\times n}$ matrix. It may be understood that the descriptions are also applicable to $P_{n\times n}$ matrices shown in the following or the first matrix obtained according to the $P_{n \times n}$ matrix. To avoid repetition, details are not described again in the following.

In a possible implementation, the $P_{12 \times 12}$ matrix may be shown as follows:

$$P_{12\times12} = \begin{bmatrix}
1 & 1 & 1 & 1 & -1 & 1 & -1 & -1 & 1 & -1 & -1 & -1 \\
1 & -1 & 1 & 1 & 1 & -1 & 1 & -1 & -1 & 1 & -1 & -1 \\
1 & -1 & -1 & 1 & 1 & 1 & -1 & 1 & -1 & -1 & 1 & -1 \\
1 & -1 & -1 & -1 & 1 & 1 & 1 & -1 & 1 & -1 & -1 & 1 \\
1 & 1 & -1 & -1 & -1 & 1 & 1 & 1 & -1 & 1 & -1 & -1 \\
1 & -1 & 1 & -1 & -1 & -1 & 1 & 1 & 1 & -1 & 1 & -1 \\
1 & -1 & -1 & 1 & -1 & -1 & -1 & 1 & 1 & 1 & -1 & 1 \\
1 & 1 & -1 & -1 & 1 & -1 & -1 & -1 & 1 & 1 & 1 & -1 \\
1 & -1 & 1 & -1 & -1 & 1 & -1 & -1 & -1 & 1 & 1 & 1 \\
1 & 1 & -1 & 1 & -1 & -1 & 1 & -1 & -1 & -1 & 1 & 1 \\
1 & 1 & 1 & -1 & 1 & -1 & -1 & 1 & -1 & -1 & -1 & 1 \\
1 & 1 & 1 & 1 & 1 & 1 & 1 & 1 & 1 & 1 & 1 & 1
\end{bmatrix} \quad (24)$$

Formula (24) is shown by using an example in which the first row of the submatrix $S_{(n-1)\times(n-1)}$ is equal to [1 1 1 −1 1 −1 −1 1 −1 −1 −1], and the $P_{12\times12}$ matrix shown by using Formula (14) as an example. For brevity, matrices obtained based on any one or more of the three operations of cyclic shift, overall negation, and reversing in Formula (24) are not enumerated herein.

In a possible implementation, the $P_{12\times12}$ matrix may be shown as follows:

Alternatively, $$P_{12\times12} = \begin{bmatrix}
1 & 1 & 1 & -1 & 1 & -1 & -1 & 1 & -1 & -1 & -1 & -1 \\
-1 & 1 & 1 & 1 & -1 & 1 & -1 & -1 & 1 & -1 & -1 & -1 \\
-1 & -1 & 1 & 1 & 1 & -1 & 1 & -1 & -1 & 1 & -1 & -1 \\
-1 & -1 & -1 & 1 & 1 & 1 & -1 & 1 & -1 & -1 & 1 & -1 \\
1 & -1 & -1 & -1 & 1 & 1 & 1 & -1 & 1 & -1 & -1 & -1 \\
-1 & 1 & -1 & -1 & -1 & 1 & 1 & 1 & -1 & 1 & -1 & -1 \\
-1 & -1 & 1 & -1 & -1 & -1 & 1 & 1 & 1 & -1 & 1 & -1 \\
1 & -1 & -1 & 1 & -1 & -1 & -1 & 1 & 1 & 1 & -1 & -1 \\
-1 & 1 & -1 & -1 & 1 & -1 & -1 & -1 & 1 & 1 & 1 & -1 \\
1 & -1 & 1 & -1 & -1 & 1 & -1 & -1 & -1 & 1 & 1 & -1 \\
1 & 1 & -1 & 1 & -1 & -1 & 1 & -1 & -1 & -1 & 1 & -1 \\
1 & 1 & 1 & 1 & 1 & 1 & 1 & 1 & 1 & 1 & 1 & 1
\end{bmatrix} \quad (25)$$

Formula (25) is shown by using an example in which the first row of the submatrix $S_{(n-1)\times(n-1)}$ is equal to [1 1 1 −1 1 −1 −1 1 −1 −1 −1], and the $P_{12\times12}$ matrix shown by using Formula (15) as an example. For brevity, matrices obtained based on any one or more of the three operations of cyclic shift, overall negation, and reversing in Formula (24) are not enumerated herein.

In a possible implementation, the $P_{12\times12}$ matrix may be shown as follows:

$$P_{12\times12} = \begin{bmatrix}
-1 & 1 & 1 & 1 & -1 & 1 & -1 & -1 & 1 & -1 & -1 & -1 \\
-1 & -1 & 1 & 1 & 1 & -1 & 1 & -1 & -1 & 1 & -1 & -1 \\
-1 & -1 & -1 & 1 & 1 & 1 & -1 & 1 & -1 & -1 & 1 & -1 \\
-1 & -1 & -1 & -1 & 1 & 1 & 1 & -1 & 1 & -1 & -1 & 1 \\
1 & 1 & -1 & -1 & -1 & 1 & 1 & 1 & -1 & 1 & -1 & -1 \\
-1 & -1 & 1 & -1 & -1 & -1 & 1 & 1 & 1 & -1 & 1 & -1 \\
-1 & -1 & -1 & 1 & -1 & -1 & -1 & 1 & 1 & 1 & -1 & 1 \\
-1 & 1 & -1 & -1 & 1 & -1 & -1 & -1 & 1 & 1 & 1 & -1 \\
-1 & -1 & 1 & -1 & -1 & 1 & -1 & -1 & -1 & 1 & 1 & 1 \\
-1 & 1 & -1 & 1 & -1 & -1 & 1 & -1 & -1 & -1 & 1 & 1 \\
-1 & 1 & 1 & -1 & 1 & -1 & -1 & 1 & -1 & -1 & -1 & 1 \\
1 & 1 & 1 & 1 & 1 & 1 & 1 & 1 & 1 & 1 & 1 & 1
\end{bmatrix} \quad (26)$$

Formula (26) is shown by using an example in which the first row of the submatrix $S_{(n-1)\times(n-1)}$ is equal to [1 1 1 −1 1 −1 −1 1 −1 −1 −1], and the $P_{12\times12}$ matrix shown by using Formula (16) as an example. For brevity, matrices obtained based on any one or more of the three operations of cyclic shift, overall negation, and reversing in Formula (26) are not enumerated herein.

In a possible implementation, the $P_{12\times12}$ matrix may be shown as follows:

$$P_{12\times12} = \begin{bmatrix}
-1 & -1 & -1 & 1 & -1 & 1 & 1 & -1 & 1 & 1 & 1 & 1 \\
1 & -1 & -1 & -1 & 1 & -1 & 1 & 1 & -1 & 1 & 1 & 1 \\
1 & 1 & -1 & -1 & -1 & 1 & -1 & 1 & 1 & -1 & 1 & 1 \\
1 & 1 & 1 & -1 & -1 & -1 & 1 & -1 & 1 & 1 & -1 & 1 \\
-1 & 1 & 1 & 1 & -1 & -1 & -1 & 1 & -1 & 1 & 1 & 1 \\
1 & -1 & 1 & 1 & 1 & -1 & -1 & -1 & 1 & -1 & 1 & 1 \\
1 & 1 & -1 & 1 & 1 & 1 & -1 & -1 & -1 & 1 & -1 & 1 \\
-1 & 1 & 1 & -1 & 1 & 1 & 1 & -1 & -1 & -1 & 1 & 1 \\
1 & -1 & 1 & 1 & -1 & 1 & 1 & 1 & -1 & -1 & -1 & 1 \\
-1 & 1 & -1 & 1 & 1 & -1 & 1 & 1 & 1 & -1 & -1 & 1 \\
-1 & -1 & 1 & -1 & 1 & 1 & -1 & 1 & 1 & 1 & -1 & 1 \\
1 & 1 & 1 & 1 & 1 & 1 & 1 & 1 & 1 & 1 & 1 & 1
\end{bmatrix} \quad (27)$$

Formula (27) is shown by using an example in which the first row of the submatrix $S_{(n-1)\times(n-1)}$ is equal to [−1 −1 −1 1 −1 1 1 −1 1 1 1] (namely, an overall negation vector of the first vector), and the $P_{12\times12}$ matrix shown by using Formula (13) as an example. For brevity, matrices obtained based on any one or more of the three operations of cyclic shift, overall negation, and reversing in Formula (27) are not enumerated herein.

In a possible implementation, the $P_{12\times12}$ matrix may be shown as follows:

$$P_{12\times12} = \begin{bmatrix}
1 & -1 & -1 & -1 & 1 & -1 & 1 & 1 & -1 & 1 & 1 & 1 \\
1 & 1 & -1 & -1 & -1 & 1 & -1 & 1 & 1 & -1 & 1 & 1 \\
1 & 1 & 1 & -1 & -1 & -1 & 1 & -1 & 1 & 1 & -1 & 1 \\
1 & 1 & 1 & 1 & -1 & -1 & -1 & 1 & -1 & 1 & 1 & -1 \\
1 & -1 & 1 & 1 & 1 & -1 & -1 & -1 & 1 & -1 & 1 & 1 \\
1 & 1 & -1 & 1 & 1 & 1 & -1 & -1 & -1 & 1 & -1 & 1 \\
1 & 1 & 1 & -1 & 1 & 1 & 1 & -1 & -1 & -1 & 1 & -1 \\
1 & -1 & 1 & 1 & -1 & 1 & 1 & 1 & -1 & -1 & -1 & 1 \\
1 & 1 & -1 & 1 & 1 & -1 & 1 & 1 & 1 & -1 & -1 & -1 \\
1 & -1 & 1 & -1 & 1 & 1 & -1 & 1 & 1 & 1 & -1 & -1 \\
1 & -1 & -1 & 1 & -1 & 1 & 1 & -1 & 1 & 1 & 1 & -1 \\
1 & 1 & 1 & 1 & 1 & 1 & 1 & 1 & 1 & 1 & 1 & 1
\end{bmatrix} \quad (28)$$

Formula (28) is shown by using an example in which the first row of the submatrix $S_{(n-1)\times(n-1)}$ is equal to [−1 −1 −1 1 −1 1 1 −1 1 1 1], and the $P_{12\times12}$ matrix shown by using Formula (14) as an example. For brevity, matrices obtained based on any one or more of the three operations of cyclic shift, overall negation, and reversing in Formula (28) are not enumerated herein.

In a possible implementation, the $P_{12\times12}$ matrix may be shown as follows:

$$P_{12\times12} = \begin{bmatrix} -1 & -1 & -1 & 1 & -1 & 1 & 1 & -1 & 1 & 1 & 1 & -1 \\ 1 & -1 & -1 & -1 & 1 & -1 & 1 & 1 & -1 & 1 & 1 & -1 \\ 1 & 1 & -1 & -1 & -1 & 1 & -1 & 1 & 1 & -1 & 1 & -1 \\ 1 & 1 & 1 & -1 & -1 & -1 & 1 & -1 & 1 & 1 & -1 & -1 \\ -1 & 1 & 1 & 1 & -1 & -1 & -1 & 1 & -1 & 1 & 1 & -1 \\ 1 & -1 & 1 & 1 & 1 & -1 & -1 & -1 & 1 & -1 & 1 & -1 \\ 1 & 1 & -1 & 1 & 1 & 1 & -1 & -1 & -1 & 1 & -1 & -1 \\ -1 & 1 & 1 & -1 & 1 & 1 & 1 & -1 & -1 & -1 & 1 & -1 \\ 1 & -1 & 1 & 1 & -1 & 1 & 1 & 1 & -1 & -1 & -1 & -1 \\ -1 & 1 & -1 & 1 & 1 & -1 & 1 & 1 & 1 & -1 & -1 & -1 \\ -1 & -1 & 1 & -1 & 1 & 1 & -1 & 1 & 1 & 1 & -1 & -1 \\ 1 & 1 & 1 & 1 & 1 & 1 & 1 & 1 & 1 & 1 & 1 & 1 \end{bmatrix} \quad (29)$$

Formula (29) is shown by using an example in which the first row of the submatrix $S_{(n-1)\times(n-1)}$ is equal to $[-1\ -1\ -1\ 1\ -1\ 1\ 1\ -1\ 1\ 1\ 1]$, and the $P_{12\times12}$ matrix shown by using Formula (15) as an example. For brevity, matrices obtained based on any one or more of the three operations of cyclic shift, overall negation, and reversing in Formula (29) are not enumerated herein.

In a possible implementation, the $P_{12\times12}$ matrix may be shown as follows:

$$P_{12\times12} = \begin{bmatrix} -1 & -1 & -1 & -1 & 1 & -1 & 1 & 1 & -1 & 1 & 1 & 1 \\ -1 & 1 & -1 & -1 & -1 & 1 & -1 & 1 & 1 & -1 & 1 & 1 \\ -1 & 1 & 1 & -1 & -1 & -1 & 1 & -1 & 1 & 1 & -1 & 1 \\ -1 & 1 & 1 & 1 & -1 & -1 & -1 & 1 & -1 & 1 & 1 & -1 \\ -1 & -1 & 1 & 1 & 1 & -1 & -1 & -1 & 1 & -1 & 1 & 1 \\ -1 & 1 & -1 & 1 & 1 & 1 & -1 & -1 & -1 & 1 & -1 & 1 \\ -1 & 1 & 1 & -1 & 1 & 1 & 1 & -1 & -1 & -1 & 1 & -1 \\ -1 & -1 & 1 & 1 & -1 & 1 & 1 & 1 & -1 & -1 & -1 & 1 \\ -1 & 1 & -1 & 1 & 1 & -1 & 1 & 1 & 1 & -1 & -1 & -1 \\ -1 & -1 & 1 & -1 & 1 & 1 & -1 & 1 & 1 & 1 & -1 & -1 \\ -1 & -1 & -1 & 1 & -1 & 1 & 1 & -1 & 1 & 1 & 1 & -1 \\ 1 & 1 & 1 & 1 & 1 & 1 & 1 & 1 & 1 & 1 & 1 & 1 \end{bmatrix} \quad (30)$$

Formula (30) is shown by using an example in which the first row of the submatrix $S_{(n-1)\times(n-1)}$ is equal to $[-1\ -1\ -1\ 1\ -1\ 1\ 1\ -1\ 1\ 1\ 1]$, and the $P_{12\times12}$ matrix shown by using Formula (16) as an example. For brevity, matrices obtained based on any one or more of the three operations of cyclic shift, overall negation, and reversing in Formula (30) are not enumerated herein.

In a possible implementation, the $P_{12\times12}$ matrix may be shown as follows:

$$P_{12\times12} = \begin{bmatrix} -1 & -1 & -1 & 1 & -1 & -1 & 1 & -1 & 1 & 1 & 1 & 1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ -1 & 1 & 1 & 1 & -1 & -1 & -1 & 1 & -1 & -1 & 1 & 1 \\ 1 & -1 & 1 & 1 & 1 & -1 & -1 & -1 & 1 & -1 & -1 & 1 \\ -1 & 1 & -1 & 1 & 1 & 1 & -1 & -1 & -1 & 1 & -1 & 1 \\ -1 & -1 & 1 & -1 & 1 & 1 & 1 & -1 & -1 & -1 & 1 & 1 \\ 1 & -1 & 1 & -1 & -1 & 1 & 1 & 1 & -1 & -1 & -1 & 1 \\ -1 & 1 & -1 & -1 & 1 & -1 & 1 & 1 & 1 & -1 & -1 & 1 \\ -1 & -1 & 1 & -1 & -1 & 1 & -1 & 1 & 1 & 1 & -1 & 1 \\ 1 & 1 & 1 & 1 & 1 & 1 & 1 & 1 & 1 & 1 & 1 & 1 \end{bmatrix} \quad (31)$$

Formula (31) is shown by using an example in which the first row of the submatrix $S_{(n-1)\times(n-1)}$ is equal to $[-1\ -1\ -1\ 1\ -1\ -1\ 1\ -1\ 1\ 1\ 1\ 1]$ (namely, a reversing vector of the first vector), and the $P_{12\times12}$ matrix shown by using Formula (13) as an example. For brevity, matrices obtained based on any one or more of the three operations of cyclic shift, overall negation, and reversing in Formula (31) are not enumerated herein.

In a possible implementation, the $P_{12\times12}$ matrix may be shown as follows:

$$P_{12\times12} = \begin{bmatrix} 1 & -1 & -1 & -1 & -1 & 1 & -1 & -1 & 1 & -1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \\ 1 & -1 & -1 & 1 & 1 & 1 & -1 & -1 & -1 & 1 & -1 & 1 \\ 1 & 1 & -1 & -1 & 1 & 1 & 1 & -1 & -1 & -1 & 1 & -1 \\ 1 & -1 & 1 & -1 & -1 & 1 & 1 & 1 & -1 & -1 & 1 & 1 \\ 1 & 1 & -1 & 1 & -1 & -1 & 1 & 1 & 1 & -1 & -1 & -1 \\ 1 & -1 & 1 & -1 & 1 & -1 & -1 & 1 & 1 & 1 & -1 & -1 \\ 1 & -1 & -1 & 1 & -1 & 1 & -1 & -1 & 1 & 1 & 1 & -1 \\ 1 & 1 & 1 & 1 & 1 & 1 & 1 & 1 & 1 & 1 & 1 & 1 \end{bmatrix} \quad (32)$$

Formula (32) is shown by using an example in which the first row of the submatrix $S_{(n-1)\times(n-1)}$ is equal to $[-1\ -1\ -1\ 1\ -1\ -1\ 1\ -1\ 1\ 1\ 1]$, and the $P_{12\times12}$ matrix shown by using Formula (14) as an example. For brevity, matrices obtained based on any one or more of the three operations of cyclic shift, overall negation, and reversing in Formula (32) are not enumerated herein.

In a possible implementation, the $P_{12\times12}$ matrix may be shown as follows:

$$P_{12\times12} = \begin{bmatrix} -1 & -1 & -1 & 1 & -1 & -1 & 1 & -1 & 1 & 1 & 1 & -1 \\ 1 & -1 & -1 & -1 & 1 & -1 & -1 & 1 & -1 & 1 & 1 & -1 \\ 1 & 1 & -1 & -1 & -1 & 1 & -1 & -1 & 1 & -1 & 1 & -1 \\ 1 & 1 & 1 & -1 & -1 & -1 & 1 & -1 & -1 & 1 & -1 & -1 \\ -1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & -1 \\ -1 & 1 & -1 & 1 & 1 & 1 & -1 & -1 & -1 & 1 & -1 & -1 \\ -1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & -1 \\ -1 & 1 & -1 & -1 & 1 & -1 & 1 & 1 & 1 & -1 & -1 & -1 \\ -1 & -1 & 1 & -1 & -1 & 1 & -1 & 1 & 1 & 1 & -1 & -1 \\ 1 & 1 & 1 & 1 & 1 & 1 & 1 & 1 & 1 & 1 & 1 & 1 \end{bmatrix} \quad (33)$$

Formula (33) is shown by using an example in which the first row of the submatrix $S_{(n-1)\times(n-1)}$ is equal to $[-1\ -1\ -1\ 1\ -1\ -1\ 1\ -1\ 1\ 1\ 1]$, and the $P_{12\times12}$ matrix shown by using Formula (15) as an example. For brevity, matrices obtained based on any one or more of the three operations of cyclic shift, overall negation, and reversing in Formula (33) are not enumerated herein.

In a possible implementation, the $P_{12 \times 12}$ matrix may be shown as follows:

$$P_{12\times12} = \begin{bmatrix}
-1 & -1 & -1 & -1 & 1 & -1 & -1 & 1 & -1 & 1 & 1 & 1 \\
-1 & 1 & -1 & -1 & -1 & 1 & -1 & -1 & 1 & -1 & 1 & 1 \\
-1 & 1 & 1 & -1 & -1 & -1 & 1 & -1 & -1 & 1 & -1 & 1 \\
-1 & 1 & 1 & 1 & -1 & -1 & -1 & 1 & -1 & -1 & 1 & -1 \\
-1 & -1 & 1 & 1 & 1 & -1 & -1 & -1 & 1 & -1 & -1 & 1 \\
-1 & 1 & -1 & 1 & 1 & 1 & -1 & -1 & -1 & 1 & -1 & -1 \\
-1 & -1 & 1 & -1 & 1 & 1 & 1 & -1 & -1 & -1 & 1 & -1 \\
-1 & -1 & -1 & 1 & -1 & 1 & 1 & 1 & -1 & -1 & -1 & 1 \\
-1 & 1 & -1 & -1 & 1 & -1 & 1 & 1 & 1 & -1 & -1 & -1 \\
-1 & -1 & 1 & -1 & -1 & 1 & -1 & 1 & 1 & 1 & -1 & -1 \\
-1 & -1 & -1 & 1 & -1 & -1 & 1 & -1 & 1 & 1 & 1 & -1 \\
1 & 1 & 1 & 1 & 1 & 1 & 1 & 1 & 1 & 1 & 1 & 1
\end{bmatrix} \quad (34)$$

Formula (34) is shown by using an example in which the first row of the submatrix $S_{(n-1)\times(n-1)}$ is equal to $[-1\ -1\ -1\ 1\ -1\ -1\ 1\ -1\ 1\ 1\ 1]$, and the $P_{12\times12}$ matrix shown by using Formula (16) as an example. For brevity, matrices obtained based on any one or more of the three operations of cyclic shift, overall negation, and reversing in Formula (34) are not enumerated herein.

In a possible implementation, the $P_{16\times16}$ matrix may be shown as follows:

$$P_{16*16} = \begin{bmatrix}
1 & 1 & 1 & -1 & -1 & -1 & -1 & 1 & -1 & 1 & -1 & -1 & 1 & 1 & -1 & 1 \\
-1 & 1 & 1 & 1 & -1 & -1 & -1 & -1 & 1 & -1 & 1 & -1 & -1 & 1 & 1 & 1 \\
1 & -1 & 1 & 1 & 1 & -1 & -1 & -1 & -1 & 1 & -1 & 1 & -1 & -1 & 1 & 1 \\
1 & 1 & -1 & 1 & 1 & 1 & -1 & -1 & -1 & -1 & 1 & -1 & 1 & -1 & -1 & 1 \\
-1 & 1 & 1 & -1 & 1 & 1 & 1 & -1 & -1 & -1 & -1 & 1 & -1 & 1 & -1 & 1 \\
-1 & -1 & 1 & 1 & -1 & 1 & 1 & 1 & -1 & -1 & -1 & -1 & 1 & -1 & 1 & 1 \\
1 & -1 & -1 & 1 & 1 & -1 & 1 & 1 & 1 & -1 & -1 & -1 & -1 & 1 & -1 & 1 \\
-1 & 1 & -1 & -1 & 1 & 1 & -1 & 1 & 1 & 1 & -1 & -1 & -1 & -1 & 1 & 1 \\
1 & -1 & 1 & -1 & -1 & 1 & 1 & -1 & 1 & 1 & 1 & -1 & -1 & -1 & -1 & 1 \\
-1 & 1 & -1 & 1 & -1 & -1 & 1 & 1 & -1 & 1 & 1 & 1 & -1 & -1 & -1 & 1 \\
-1 & -1 & 1 & -1 & 1 & -1 & -1 & 1 & 1 & -1 & 1 & 1 & 1 & -1 & -1 & 1 \\
-1 & -1 & -1 & 1 & -1 & 1 & -1 & -1 & 1 & 1 & -1 & 1 & 1 & 1 & -1 & 1 \\
-1 & -1 & -1 & -1 & 1 & -1 & 1 & -1 & -1 & 1 & 1 & -1 & 1 & 1 & 1 & 1 \\
1 & -1 & -1 & -1 & -1 & 1 & -1 & 1 & -1 & -1 & 1 & 1 & -1 & 1 & 1 & 1 \\
1 & 1 & -1 & -1 & -1 & -1 & 1 & -1 & 1 & -1 & -1 & 1 & 1 & -1 & 1 & 1 \\
1 & 1 & 1 & 1 & 1 & 1 & 1 & 1 & 1 & 1 & 1 & 1 & 1 & 1 & 1 & 1
\end{bmatrix} \quad (35)$$

Formula (35) is shown by using an example in which the first row of the submatrix $S_{(n-1)\times(n-1)}$ is equal to $[1\ 1\ 1\ -1\ -1\ -1\ -1\ 1\ 1\ -1\ 1\ -1\ -1\ 1\ 1\ -1]$ (namely, the second vector), and the $P_{16\times16}$ matrix shown by using Formula (13) as an example. For brevity, matrices obtained based on any one or more of the three operations of cyclic shift, overall negation, and reversing in Formula (35) are not enumerated herein.

In a possible implementation, the $P_{16\times16}$ matrix may be shown as follows:

$$P_{16*16} = \begin{bmatrix}
1 & 1 & 1 & 1 & -1 & -1 & -1 & -1 & 1 & -1 & 1 & -1 & -1 & 1 & 1 & -1 \\
1 & -1 & 1 & 1 & 1 & -1 & -1 & -1 & -1 & 1 & -1 & 1 & -1 & -1 & 1 & 1 \\
1 & 1 & -1 & 1 & 1 & 1 & -1 & -1 & -1 & -1 & 1 & -1 & 1 & -1 & -1 & 1 \\
1 & 1 & 1 & -1 & 1 & 1 & 1 & -1 & -1 & -1 & -1 & 1 & -1 & 1 & -1 & -1 \\
1 & -1 & 1 & 1 & -1 & 1 & 1 & 1 & -1 & -1 & -1 & -1 & 1 & -1 & 1 & -1 \\
1 & -1 & -1 & 1 & 1 & -1 & 1 & 1 & 1 & -1 & -1 & -1 & -1 & 1 & -1 & 1 \\
1 & 1 & -1 & -1 & 1 & 1 & -1 & 1 & 1 & 1 & -1 & -1 & -1 & -1 & 1 & -1 \\
1 & -1 & 1 & -1 & -1 & 1 & 1 & -1 & 1 & 1 & 1 & -1 & -1 & -1 & -1 & 1 \\
1 & 1 & -1 & 1 & -1 & -1 & 1 & 1 & -1 & 1 & 1 & 1 & -1 & -1 & -1 & -1 \\
1 & -1 & 1 & -1 & 1 & -1 & -1 & 1 & 1 & -1 & 1 & 1 & 1 & -1 & -1 & -1 \\
1 & -1 & -1 & 1 & -1 & 1 & -1 & -1 & 1 & 1 & -1 & 1 & 1 & 1 & -1 & -1 \\
1 & -1 & -1 & -1 & 1 & -1 & 1 & -1 & -1 & 1 & 1 & -1 & 1 & 1 & 1 & -1 \\
1 & -1 & -1 & -1 & -1 & 1 & -1 & 1 & -1 & -1 & 1 & 1 & -1 & 1 & 1 & 1 \\
1 & 1 & -1 & -1 & -1 & -1 & 1 & -1 & 1 & -1 & -1 & 1 & 1 & -1 & 1 & 1 \\
1 & 1 & 1 & -1 & -1 & -1 & -1 & 1 & -1 & 1 & -1 & 1 & 1 & 1 & -1 & 1 \\
1 & 1 & 1 & 1 & 1 & 1 & 1 & 1 & 1 & 1 & 1 & 1 & 1 & 1 & 1 & 1
\end{bmatrix} \quad (36)$$

Formula (36) is shown by using an example in which the first row of the submatrix $S_{(n-1)\times(n-1)}$ is equal to $[1\ 1\ 1\ -1\ -1\ -1\ -1\ 1\ -1\ 1\ -1\ -1\ 1\ 1\ -1]$, and the $P_{16\times16}$ matrix shown by using Formula (14) as an example. For brevity, matrices obtained based on any one or more of the three operations of cyclic shift, overall negation, and reversing in Formula (36) are not enumerated herein.

It may be understood that the submatrix $S_{(n-1)\times(n-1)}$ in Formula (36) may also be understood as a Hankel matrix. For another example in which the submatrix $S_{(n-1)\times(n-1)}$ is a Hankel matrix, refer to Formula (51) and Formula (52) shown in the following.

In a possible implementation, the $P_{16\times16}$ matrix may be shown as follows:

$$
P_{16*16} = \begin{bmatrix}
1 & 1 & 1 & -1 & -1 & -1 & -1 & 1 & -1 & 1 & -1 & -1 & 1 & 1 & -1 & -1 \\
-1 & 1 & 1 & 1 & -1 & -1 & -1 & -1 & 1 & -1 & 1 & -1 & -1 & 1 & 1 & -1 \\
1 & -1 & 1 & 1 & 1 & -1 & -1 & -1 & -1 & 1 & -1 & 1 & -1 & -1 & 1 & -1 \\
1 & 1 & -1 & 1 & 1 & 1 & -1 & -1 & -1 & -1 & 1 & -1 & 1 & -1 & -1 & -1 \\
-1 & 1 & 1 & -1 & 1 & 1 & 1 & -1 & -1 & -1 & -1 & 1 & -1 & 1 & -1 & -1 \\
-1 & -1 & 1 & 1 & -1 & 1 & 1 & 1 & -1 & -1 & -1 & -1 & 1 & -1 & 1 & -1 \\
1 & -1 & -1 & 1 & 1 & -1 & 1 & 1 & 1 & -1 & -1 & -1 & -1 & 1 & -1 & -1 \\
-1 & 1 & -1 & -1 & 1 & 1 & -1 & 1 & 1 & 1 & -1 & -1 & -1 & -1 & 1 & -1 \\
1 & -1 & 1 & -1 & -1 & 1 & 1 & -1 & 1 & 1 & 1 & -1 & -1 & -1 & -1 & -1 \\
-1 & 1 & -1 & 1 & -1 & -1 & 1 & 1 & -1 & 1 & 1 & 1 & -1 & -1 & -1 & -1 \\
-1 & -1 & 1 & -1 & 1 & -1 & -1 & 1 & 1 & -1 & 1 & 1 & 1 & -1 & -1 & -1 \\
-1 & -1 & -1 & 1 & -1 & 1 & -1 & -1 & 1 & 1 & -1 & 1 & 1 & 1 & -1 & -1 \\
-1 & -1 & -1 & -1 & 1 & -1 & 1 & -1 & -1 & 1 & 1 & -1 & 1 & 1 & 1 & -1 \\
1 & -1 & -1 & -1 & -1 & 1 & -1 & 1 & -1 & -1 & 1 & 1 & -1 & 1 & 1 & -1 \\
1 & 1 & -1 & -1 & -1 & -1 & 1 & -1 & 1 & -1 & -1 & 1 & 1 & -1 & 1 & -1 \\
1 & 1 & 1 & 1 & 1 & 1 & 1 & 1 & 1 & 1 & 1 & 1 & 1 & 1 & 1 & 1
\end{bmatrix} \quad (37)
$$

Formula (37) is shown by using an example in which the first row of the submatrix $S_{(n-1)\times(n-1)}$ is equal to $[1\ 1\ 1\ -1\ -1\ -1\ -1\ 1\ -1\ 1\ -1\ -1\ 1\ 1\ -1]$, and the $P_{16\times16}$ matrix shown by using Formula (15) as an example. For brevity, matrices obtained based on any one or more of the three operations of cyclic shift, overall negation, and reversing in Formula (37) are not enumerated herein.

In a possible implementation, the $P_{16\times16}$ matrix may be shown as follows:

$$P_{16*16} = \begin{bmatrix} -1 & 1 & 1 & 1 & -1 & -1 & -1 & -1 & 1 & -1 & 1 & -1 & -1 & 1 & 1 & -1 \\ -1 & -1 & 1 & 1 & 1 & -1 & -1 & -1 & -1 & 1 & -1 & 1 & -1 & -1 & 1 & 1 \\ -1 & 1 & -1 & 1 & 1 & 1 & -1 & -1 & -1 & -1 & 1 & -1 & 1 & -1 & -1 & 1 \\ -1 & 1 & 1 & -1 & 1 & 1 & 1 & -1 & -1 & -1 & -1 & 1 & -1 & 1 & -1 & -1 \\ -1 & -1 & 1 & 1 & -1 & 1 & 1 & 1 & -1 & -1 & -1 & -1 & 1 & -1 & 1 & -1 \\ -1 & -1 & -1 & 1 & 1 & -1 & 1 & 1 & 1 & -1 & -1 & -1 & -1 & 1 & -1 & 1 \\ -1 & 1 & -1 & -1 & 1 & 1 & -1 & 1 & 1 & 1 & -1 & -1 & -1 & -1 & 1 & -1 \\ -1 & -1 & 1 & -1 & -1 & 1 & 1 & -1 & 1 & 1 & 1 & -1 & -1 & -1 & -1 & 1 \\ -1 & 1 & -1 & 1 & -1 & -1 & 1 & 1 & -1 & 1 & 1 & 1 & -1 & -1 & -1 & -1 \\ -1 & -1 & 1 & -1 & 1 & -1 & -1 & 1 & 1 & -1 & 1 & 1 & 1 & -1 & -1 & -1 \\ -1 & -1 & -1 & 1 & -1 & 1 & -1 & -1 & 1 & 1 & -1 & 1 & 1 & 1 & -1 & -1 \\ -1 & -1 & -1 & -1 & 1 & -1 & 1 & -1 & -1 & 1 & 1 & -1 & 1 & 1 & 1 & -1 \\ -1 & -1 & -1 & -1 & -1 & 1 & -1 & 1 & -1 & -1 & 1 & 1 & -1 & 1 & 1 & 1 \\ -1 & 1 & -1 & -1 & -1 & -1 & 1 & -1 & 1 & -1 & -1 & 1 & 1 & -1 & 1 & 1 \\ -1 & 1 & 1 & -1 & -1 & -1 & -1 & 1 & -1 & 1 & -1 & 1 & 1 & 1 & -1 & 1 \\ 1 & 1 & 1 & 1 & 1 & 1 & 1 & 1 & 1 & 1 & 1 & 1 & 1 & 1 & 1 & 1 \end{bmatrix} \tag{38}$$

Formula (38) is shown by using an example in which the first row of the submatrix $S_{(n-1)\times(n-1)}$ is equal to [1 1 1 −1 −1 −1 −1 1 −1 1 −1 −1 1 1 −1 −1 1 1 −1], and the $P_{16\times16}$ matrix shown by using Formula (16) as an example. For brevity, matrices obtained based on any one or more of the three operations of cyclic shift, overall negation, and reversing in Formula (38) are not enumerated herein.

In a possible implementation, the $P_{16\times16}$ matrix may be shown as follows:

$$P_{16*16} = \begin{bmatrix}
-1 & -1 & -1 & 1 & 1 & 1 & 1 & -1 & 1 & -1 & 1 & 1 & -1 & -1 & 1 & 1 \\
1 & -1 & -1 & -1 & 1 & 1 & 1 & 1 & -1 & 1 & -1 & 1 & 1 & -1 & -1 & 1 \\
-1 & 1 & -1 & -1 & -1 & 1 & 1 & 1 & 1 & -1 & 1 & -1 & 1 & 1 & -1 & 1 \\
-1 & -1 & 1 & -1 & -1 & -1 & 1 & 1 & 1 & 1 & -1 & 1 & -1 & 1 & 1 & 1 \\
1 & -1 & -1 & 1 & -1 & -1 & -1 & 1 & 1 & 1 & 1 & -1 & 1 & -1 & 1 & 1 \\
1 & 1 & -1 & -1 & 1 & -1 & -1 & -1 & 1 & 1 & 1 & 1 & -1 & 1 & -1 & 1 \\
-1 & 1 & 1 & -1 & -1 & 1 & -1 & -1 & -1 & 1 & 1 & 1 & 1 & -1 & 1 & 1 \\
1 & -1 & 1 & 1 & -1 & -1 & 1 & -1 & -1 & -1 & 1 & 1 & 1 & 1 & -1 & 1 \\
-1 & 1 & -1 & 1 & 1 & -1 & -1 & 1 & -1 & -1 & -1 & 1 & 1 & 1 & 1 & 1 \\
1 & -1 & 1 & -1 & 1 & 1 & -1 & -1 & 1 & -1 & -1 & -1 & 1 & 1 & 1 & 1 \\
1 & 1 & -1 & 1 & -1 & 1 & 1 & -1 & -1 & 1 & -1 & -1 & -1 & 1 & 1 & 1 \\
1 & 1 & 1 & -1 & 1 & -1 & 1 & 1 & -1 & -1 & 1 & -1 & -1 & -1 & 1 & 1 \\
1 & 1 & 1 & 1 & -1 & 1 & -1 & 1 & 1 & -1 & -1 & 1 & -1 & -1 & -1 & 1 \\
-1 & 1 & 1 & 1 & 1 & -1 & 1 & -1 & 1 & 1 & -1 & -1 & 1 & -1 & -1 & 1 \\
-1 & -1 & 1 & 1 & 1 & 1 & -1 & 1 & -1 & 1 & 1 & -1 & -1 & 1 & -1 & 1 \\
1 & 1 & 1 & 1 & 1 & 1 & 1 & 1 & 1 & 1 & 1 & 1 & 1 & 1 & 1 & 1
\end{bmatrix} \quad (39)$$

Formula (39) is shown by using an example in which the first row of the submatrix $S_{(n-1)\times(n-1)}$ is equal to [−1 −1 −1 1 1 1 1 −1 1 −1 1 1 −1 −1 1] (namely, an overall negation vector of the second vector), and the $P_{16\times16}$ matrix shown by using Formula (13) as an example. For brevity, matrices obtained based on any one or more of the three operations of cyclic shift, overall negation, and reversing in Formula (39) are not enumerated herein.

In a possible implementation, the $P_{16\times16}$ matrix may be shown as follows:

$$P_{16*16} = \begin{bmatrix}
1 & -1 & -1 & -1 & 1 & 1 & 1 & 1 & -1 & 1 & -1 & 1 & 1 & -1 & -1 & 1 \\
1 & 1 & -1 & -1 & -1 & 1 & 1 & 1 & 1 & -1 & 1 & -1 & 1 & 1 & -1 & -1 \\
1 & -1 & 1 & -1 & -1 & -1 & 1 & 1 & 1 & 1 & -1 & 1 & -1 & 1 & 1 & -1 \\
1 & -1 & -1 & 1 & -1 & -1 & -1 & 1 & 1 & 1 & 1 & -1 & 1 & -1 & 1 & 1 \\
1 & 1 & -1 & -1 & 1 & -1 & -1 & -1 & 1 & 1 & 1 & 1 & -1 & 1 & -1 & 1 \\
1 & 1 & 1 & -1 & -1 & 1 & -1 & -1 & -1 & 1 & 1 & 1 & 1 & -1 & 1 & -1 \\
1 & -1 & 1 & 1 & -1 & -1 & 1 & -1 & -1 & -1 & 1 & 1 & 1 & 1 & -1 & 1 \\
1 & 1 & -1 & 1 & 1 & -1 & -1 & 1 & -1 & -1 & -1 & 1 & 1 & 1 & 1 & -1 \\
1 & -1 & 1 & -1 & 1 & 1 & -1 & -1 & 1 & -1 & -1 & -1 & 1 & 1 & 1 & 1 \\
1 & 1 & -1 & 1 & -1 & 1 & 1 & -1 & -1 & 1 & -1 & -1 & -1 & 1 & 1 & 1 \\
1 & 1 & 1 & -1 & 1 & -1 & 1 & 1 & -1 & -1 & 1 & -1 & -1 & -1 & 1 & 1 \\
1 & 1 & 1 & 1 & -1 & 1 & -1 & 1 & 1 & -1 & -1 & 1 & -1 & -1 & -1 & 1 \\
1 & 1 & 1 & 1 & 1 & -1 & 1 & -1 & 1 & 1 & -1 & -1 & 1 & -1 & -1 & -1 \\
1 & -1 & 1 & 1 & 1 & 1 & -1 & 1 & -1 & 1 & 1 & -1 & -1 & 1 & -1 & -1 \\
1 & -1 & -1 & 1 & 1 & 1 & 1 & 1 & 1 & 1 & 1 & 1 & -1 & 1 & 1 & -1 \\
1 & 1 & 1 & 1 & 1 & 1 & 1 & 1 & 1 & 1 & 1 & 1 & 1 & 1 & 1 & 1
\end{bmatrix} \quad (40)$$

Formula (40) is shown by using an example in which the first row of the submatrix $S_{(n-1)\times(n-1)}$ is equal to [−1 −1 −1 1 1 1 1 −1 1 −1 1 1 −1 −1 1], and the $P_{16\times16}$ matrix shown by using Formula (14) as an example. For brevity, matrices obtained based on any one or more of the three operations of cyclic shift, overall negation, and reversing in Formula (40) are not enumerated herein.

In a possible implementation, the $P_{16\times16}$ matrix may be shown as follows:

$$P_{16*16} = \begin{bmatrix}
-1 & -1 & -1 & 1 & 1 & 1 & 1 & -1 & 1 & -1 & 1 & 1 & -1 & -1 & 1 & -1 \\
1 & -1 & -1 & -1 & 1 & 1 & 1 & 1 & -1 & 1 & -1 & 1 & 1 & -1 & -1 & -1 \\
-1 & 1 & -1 & -1 & -1 & 1 & 1 & 1 & 1 & -1 & 1 & -1 & 1 & 1 & -1 & -1 \\
-1 & -1 & 1 & -1 & -1 & -1 & 1 & 1 & 1 & 1 & -1 & 1 & -1 & 1 & 1 & -1 \\
1 & -1 & -1 & 1 & -1 & -1 & -1 & 1 & 1 & 1 & 1 & -1 & 1 & -1 & 1 & -1 \\
1 & 1 & -1 & -1 & 1 & -1 & -1 & -1 & 1 & 1 & 1 & 1 & -1 & 1 & -1 & -1 \\
-1 & 1 & 1 & -1 & -1 & 1 & -1 & -1 & -1 & 1 & 1 & 1 & 1 & -1 & 1 & -1 \\
1 & -1 & 1 & 1 & -1 & -1 & 1 & -1 & -1 & -1 & 1 & 1 & 1 & 1 & -1 & -1 \\
-1 & 1 & -1 & 1 & 1 & -1 & -1 & 1 & -1 & -1 & -1 & 1 & 1 & 1 & 1 & -1 \\
1 & -1 & 1 & -1 & 1 & 1 & -1 & -1 & 1 & -1 & -1 & -1 & 1 & 1 & 1 & -1 \\
1 & 1 & -1 & 1 & -1 & 1 & 1 & -1 & -1 & 1 & -1 & -1 & -1 & 1 & 1 & -1 \\
1 & 1 & 1 & -1 & 1 & -1 & 1 & 1 & -1 & -1 & 1 & -1 & -1 & -1 & 1 & -1 \\
1 & 1 & 1 & 1 & -1 & 1 & -1 & 1 & 1 & -1 & -1 & 1 & -1 & -1 & -1 & -1 \\
-1 & 1 & 1 & 1 & 1 & -1 & 1 & -1 & 1 & 1 & -1 & -1 & 1 & -1 & -1 & -1 \\
-1 & -1 & 1 & 1 & 1 & 1 & -1 & 1 & -1 & 1 & 1 & -1 & -1 & 1 & -1 & -1 \\
1 & 1 & 1 & 1 & 1 & 1 & 1 & 1 & 1 & 1 & 1 & 1 & 1 & 1 & 1 & 1
\end{bmatrix} \quad (41)$$

Formula (41) is shown by using an example in which the first row of the submatrix $S_{(n-1)\times(n-1)}$ is equal to $[-1\ -1\ -1\ 1\ 1\ 1\ 1\ -1\ 1\ -1\ 1\ 1\ -1\ -1\ 1]$, and the $P_{16\times16}$ matrix shown by using Formula (15) as an example. For brevity, matrices obtained based on any one or more of the three operations of cyclic shift, overall negation, and reversing in Formula (41) are not enumerated herein.

In a possible implementation, the $P_{16\times16}$ matrix may be shown as follows:

$$P_{16*16} = \begin{bmatrix}
-1 & -1 & -1 & -1 & 1 & 1 & 1 & 1 & -1 & 1 & -1 & 1 & 1 & -1 & -1 & 1 \\
-1 & 1 & -1 & -1 & -1 & 1 & 1 & 1 & 1 & -1 & 1 & -1 & 1 & 1 & -1 & -1 \\
-1 & -1 & 1 & -1 & -1 & -1 & 1 & 1 & 1 & 1 & -1 & 1 & -1 & 1 & 1 & -1 \\
-1 & -1 & -1 & 1 & -1 & -1 & -1 & 1 & 1 & 1 & 1 & -1 & 1 & -1 & 1 & 1 \\
-1 & 1 & -1 & -1 & 1 & -1 & -1 & -1 & 1 & 1 & 1 & 1 & -1 & 1 & -1 & 1 \\
-1 & 1 & 1 & -1 & -1 & 1 & -1 & -1 & -1 & 1 & 1 & 1 & 1 & -1 & 1 & -1 \\
-1 & -1 & 1 & 1 & -1 & -1 & 1 & -1 & -1 & -1 & 1 & 1 & 1 & 1 & -1 & 1 \\
-1 & 1 & -1 & 1 & 1 & -1 & -1 & 1 & -1 & -1 & -1 & 1 & 1 & 1 & 1 & -1 \\
-1 & -1 & 1 & -1 & 1 & 1 & -1 & -1 & 1 & -1 & -1 & -1 & 1 & 1 & 1 & 1 \\
-1 & 1 & -1 & 1 & -1 & 1 & 1 & -1 & -1 & 1 & -1 & -1 & -1 & 1 & 1 & 1 \\
-1 & 1 & 1 & -1 & 1 & -1 & 1 & 1 & -1 & -1 & 1 & -1 & -1 & -1 & 1 & 1 \\
-1 & 1 & 1 & 1 & -1 & 1 & -1 & 1 & 1 & -1 & -1 & 1 & -1 & -1 & -1 & 1 \\
-1 & 1 & 1 & 1 & 1 & -1 & 1 & -1 & 1 & 1 & -1 & -1 & 1 & -1 & -1 & -1 \\
-1 & -1 & 1 & 1 & 1 & 1 & -1 & 1 & -1 & 1 & 1 & -1 & -1 & 1 & -1 & -1 \\
-1 & -1 & -1 & 1 & 1 & 1 & 1 & 1 & 1 & 1 & 1 & 1 & -1 & 1 & 1 & -1 \\
1 & 1 & 1 & 1 & 1 & 1 & 1 & 1 & 1 & 1 & 1 & 1 & 1 & 1 & 1 & 1
\end{bmatrix} \quad (42)$$

Formula (42) is shown by using an example in which the first row of the submatrix $S_{(n-1)\times(n-1)}$ is equal to $[-1\ -1\ -1\ 1\ 1\ 1\ 1\ -1\ 1\ -1\ 1\ 1\ -1\ -1\ 1]$, and the $P_{16\times16}$ matrix shown by using Formula (16) as an example. For brevity, matrices obtained based on any one or more of the three operations of cyclic shift, overall negation, and reversing in Formula (42) are not enumerated herein.

In a possible implementation, the $P_{16\times16}$ matrix may be shown as follows:

$$P_{16*16} = \begin{bmatrix} -1 & 1 & 1 & -1 & -1 & 1 & -1 & 1 & -1 & -1 & -1 & -1 & 1 & 1 & 1 & 1 \\ 1 & -1 & 1 & 1 & -1 & -1 & 1 & -1 & 1 & -1 & -1 & -1 & -1 & 1 & 1 & 1 \\ 1 & 1 & -1 & 1 & 1 & -1 & -1 & 1 & -1 & 1 & -1 & -1 & -1 & -1 & 1 & 1 \\ -1 & 1 & 1 & -1 & 1 & 1 & -1 & -1 & 1 & -1 & 1 & -1 & -1 & -1 & -1 & 1 \\ -1 & -1 & 1 & 1 & -1 & 1 & 1 & -1 & -1 & 1 & -1 & 1 & -1 & -1 & -1 & 1 \\ -1 & -1 & -1 & 1 & 1 & -1 & 1 & 1 & -1 & -1 & 1 & -1 & 1 & -1 & -1 & 1 \\ -1 & -1 & -1 & -1 & 1 & 1 & -1 & 1 & 1 & -1 & -1 & 1 & -1 & 1 & -1 & 1 \\ -1 & -1 & -1 & -1 & -1 & 1 & 1 & -1 & 1 & 1 & -1 & -1 & 1 & -1 & 1 & 1 \\ 1 & -1 & -1 & -1 & -1 & -1 & 1 & 1 & -1 & 1 & 1 & -1 & -1 & 1 & -1 & 1 \\ -1 & 1 & -1 & -1 & -1 & -1 & -1 & 1 & 1 & -1 & 1 & 1 & -1 & -1 & 1 & 1 \\ 1 & -1 & 1 & -1 & -1 & -1 & -1 & -1 & 1 & 1 & -1 & 1 & 1 & -1 & -1 & 1 \\ -1 & 1 & -1 & 1 & -1 & -1 & -1 & -1 & -1 & 1 & 1 & -1 & 1 & 1 & -1 & 1 \\ -1 & -1 & 1 & -1 & 1 & -1 & -1 & -1 & -1 & -1 & 1 & 1 & -1 & 1 & 1 & 1 \\ 1 & -1 & -1 & 1 & -1 & 1 & -1 & -1 & -1 & -1 & -1 & 1 & 1 & -1 & 1 & 1 \\ 1 & 1 & -1 & -1 & 1 & -1 & 1 & -1 & -1 & -1 & -1 & -1 & 1 & 1 & -1 & 1 \\ 1 & 1 & 1 & 1 & 1 & 1 & 1 & 1 & 1 & 1 & 1 & 1 & 1 & 1 & 1 & 1 \end{bmatrix} \quad (43)$$

Formula (43) is shown by using an example in which the first row of the submatrix $S_{(n-1)\times(n-1)}$ is equal to $[-1\ 1\ 1\ -1\ 1\ -1\ -1\ -1\ -1\ 1\ 1\ 1]$ (namely, a reversing vector of the second vector), and the $P_{16\times16}$ matrix shown by using Formula (13) as an example. For brevity, matrices obtained based on any one or more of the three operations of cyclic shift, overall negation, and reversing in Formula (43) are not enumerated herein.

In a possible implementation, the $P_{16\times16}$ matrix may be shown as follows:

$$P_{16*16} = \begin{bmatrix} 1 & -1 & 1 & 1 & -1 & -1 & 1 & -1 & 1 & -1 & -1 & -1 & -1 & 1 & 1 & 1 \\ 1 & 1 & -1 & 1 & 1 & -1 & -1 & 1 & -1 & 1 & -1 & -1 & -1 & -1 & 1 & 1 \\ 1 & 1 & 1 & -1 & 1 & 1 & -1 & -1 & 1 & -1 & 1 & -1 & -1 & -1 & -1 & 1 \\ 1 & -1 & 1 & 1 & -1 & 1 & 1 & -1 & -1 & 1 & -1 & 1 & -1 & -1 & -1 & -1 \\ 1 & -1 & -1 & 1 & 1 & -1 & 1 & 1 & -1 & -1 & 1 & -1 & 1 & -1 & -1 & -1 \\ 1 & -1 & -1 & -1 & 1 & 1 & -1 & 1 & 1 & -1 & -1 & 1 & -1 & 1 & -1 & -1 \\ 1 & -1 & -1 & -1 & -1 & 1 & 1 & -1 & 1 & 1 & -1 & -1 & 1 & -1 & 1 & -1 \\ 1 & -1 & -1 & -1 & -1 & -1 & 1 & 1 & -1 & 1 & 1 & -1 & -1 & 1 & -1 & 1 \\ 1 & 1 & -1 & -1 & -1 & -1 & -1 & 1 & 1 & -1 & 1 & 1 & -1 & -1 & 1 & -1 \\ 1 & -1 & 1 & -1 & -1 & -1 & -1 & -1 & 1 & 1 & -1 & 1 & 1 & -1 & -1 & 1 \\ 1 & 1 & -1 & 1 & -1 & -1 & -1 & -1 & -1 & 1 & 1 & -1 & 1 & 1 & -1 & -1 \\ 1 & -1 & 1 & -1 & 1 & -1 & -1 & -1 & -1 & -1 & 1 & 1 & -1 & 1 & 1 & -1 \\ 1 & -1 & -1 & 1 & -1 & 1 & -1 & -1 & -1 & -1 & -1 & 1 & 1 & -1 & 1 & 1 \\ 1 & 1 & 1 & -1 & 1 & -1 & 1 & -1 & -1 & -1 & -1 & -1 & 1 & 1 & -1 & 1 \\ 1 & 1 & -1 & -1 & -1 & 1 & -1 & 1 & -1 & -1 & -1 & -1 & -1 & 1 & 1 & -1 \\ 1 & 1 & 1 & 1 & 1 & 1 & 1 & 1 & 1 & 1 & 1 & 1 & 1 & 1 & 1 & 1 \end{bmatrix} \quad (44)$$

Formula (44) is shown by using an example in which the first row of the submatrix $S_{(n-1)\times(n-1)}$ is equal to $[-1\ 1\ 1\ -1\ -1\ 1\ -1\ 1\ -1\ -1\ -1\ 1\ 1\ 1]$, and the $P_{16\times16}$ matrix shown by using Formula (14) as an example. For brevity, matrices obtained based on any one or more of the three operations of cyclic shift, overall negation, and reversing in Formula (44) are not enumerated herein.

In a possible implementation, the $P_{16\times16}$ matrix may be shown as follows:

$$P_{16*16} = \begin{bmatrix}
-1 & 1 & 1 & -1 & -1 & 1 & -1 & 1 & -1 & -1 & -1 & -1 & 1 & 1 & 1 & -1 \\
1 & -1 & 1 & 1 & -1 & -1 & 1 & -1 & 1 & -1 & -1 & -1 & -1 & 1 & 1 & -1 \\
1 & 1 & -1 & 1 & 1 & -1 & -1 & 1 & -1 & 1 & -1 & -1 & -1 & -1 & 1 & -1 \\
-1 & 1 & 1 & -1 & 1 & 1 & -1 & -1 & 1 & -1 & 1 & -1 & -1 & -1 & -1 & -1 \\
-1 & -1 & 1 & 1 & -1 & 1 & 1 & -1 & -1 & 1 & -1 & 1 & -1 & -1 & -1 & -1 \\
-1 & -1 & -1 & 1 & 1 & -1 & 1 & 1 & -1 & -1 & 1 & -1 & 1 & -1 & -1 & -1 \\
-1 & -1 & -1 & -1 & 1 & 1 & -1 & 1 & 1 & -1 & -1 & 1 & -1 & 1 & -1 & -1 \\
-1 & -1 & -1 & -1 & -1 & 1 & 1 & -1 & 1 & 1 & -1 & -1 & 1 & -1 & 1 & -1 \\
1 & -1 & -1 & -1 & -1 & -1 & 1 & 1 & -1 & 1 & 1 & -1 & -1 & 1 & -1 & -1 \\
-1 & 1 & -1 & -1 & -1 & -1 & -1 & 1 & 1 & -1 & 1 & 1 & -1 & -1 & 1 & -1 \\
1 & -1 & 1 & -1 & -1 & -1 & -1 & -1 & 1 & 1 & -1 & 1 & 1 & -1 & -1 & -1 \\
-1 & 1 & -1 & 1 & -1 & -1 & -1 & -1 & -1 & 1 & 1 & -1 & 1 & 1 & -1 & -1 \\
-1 & -1 & 1 & -1 & 1 & -1 & -1 & -1 & -1 & -1 & 1 & 1 & -1 & 1 & 1 & -1 \\
1 & -1 & -1 & 1 & -1 & 1 & -1 & -1 & -1 & -1 & -1 & 1 & 1 & -1 & 1 & -1 \\
1 & 1 & -1 & -1 & 1 & -1 & 1 & -1 & -1 & -1 & -1 & -1 & 1 & 1 & -1 & -1 \\
1 & 1 & 1 & 1 & 1 & 1 & 1 & 1 & 1 & 1 & 1 & 1 & 1 & 1 & 1 & 1
\end{bmatrix} \quad (45)$$

Formula (45) is shown by using an example in which the first row of the submatrix $S_{(n-1)\times(n-1)}$ is equal to $[-1\ 1\ 1\ -1$ $-1\ 1\ -1\ 1\ -1\ -1\ -1\ -1\ 1\ 1\ 1]$, and the $P_{16\times16}$ matrix shown by using Formula (15) as an example. For brevity, matrices obtained based on any one or more of the three operations of cyclic shift, overall negation, and reversing in Formula (45) are not enumerated herein.

In a possible implementation, the $P_{16\times16}$ matrix may be shown as follows:

$$P_{16*16} = \begin{bmatrix}
-1 & -1 & 1 & 1 & -1 & -1 & 1 & -1 & 1 & -1 & -1 & -1 & -1 & 1 & 1 & 1 \\
-1 & 1 & -1 & 1 & 1 & -1 & -1 & 1 & -1 & 1 & -1 & -1 & -1 & -1 & 1 & 1 \\
-1 & 1 & 1 & -1 & 1 & 1 & -1 & -1 & 1 & -1 & 1 & -1 & -1 & -1 & -1 & 1 \\
-1 & -1 & 1 & 1 & -1 & 1 & 1 & -1 & -1 & 1 & -1 & 1 & -1 & -1 & -1 & -1 \\
-1 & -1 & -1 & 1 & 1 & -1 & 1 & 1 & -1 & -1 & 1 & -1 & 1 & -1 & -1 & -1 \\
-1 & -1 & -1 & -1 & 1 & 1 & -1 & 1 & 1 & -1 & -1 & 1 & -1 & 1 & -1 & -1 \\
-1 & -1 & -1 & -1 & -1 & 1 & 1 & -1 & 1 & 1 & -1 & -1 & 1 & -1 & 1 & -1 \\
-1 & -1 & -1 & -1 & -1 & -1 & 1 & 1 & -1 & 1 & 1 & -1 & -1 & 1 & -1 & 1 \\
-1 & 1 & -1 & -1 & -1 & -1 & -1 & 1 & 1 & -1 & 1 & 1 & -1 & -1 & 1 & -1 \\
-1 & -1 & 1 & -1 & -1 & -1 & -1 & -1 & 1 & 1 & -1 & 1 & 1 & -1 & -1 & 1 \\
-1 & 1 & -1 & 1 & -1 & -1 & -1 & -1 & -1 & 1 & 1 & -1 & 1 & 1 & -1 & -1 \\
-1 & -1 & 1 & -1 & 1 & -1 & -1 & -1 & -1 & -1 & 1 & 1 & -1 & 1 & 1 & -1 \\
-1 & -1 & -1 & 1 & -1 & 1 & -1 & -1 & -1 & -1 & -1 & 1 & 1 & -1 & 1 & 1 \\
-1 & 1 & 1 & -1 & 1 & -1 & 1 & -1 & -1 & -1 & -1 & -1 & 1 & 1 & -1 & 1 \\
-1 & 1 & -1 & -1 & -1 & 1 & -1 & 1 & -1 & -1 & -1 & -1 & -1 & 1 & 1 & -1 \\
1 & 1 & 1 & 1 & 1 & 1 & 1 & 1 & 1 & 1 & 1 & 1 & 1 & 1 & 1 & 1
\end{bmatrix} \quad (46)$$

Formula (46) is shown by using an example in which the first row of the submatrix $S_{(n-1)\times(n-1)}$ is equal to $[-1\ 1\ 1\ -1$ $-1\ 1\ -1\ 1\ -1\ -1\ -1\ -1\ 1\ 1\ 1]$, and the $P_{16\times16}$ matrix shown by using Formula (16) as an example. For brevity, matrices obtained based on any one or more of the three operations of cyclic shift, overall negation, and reversing in Formula (46) are not enumerated herein.

In a possible implementation, the $P_{16\times16}$ matrix may be shown as follows:

$$P_{16*16} = \begin{bmatrix} 1 & -1 & 1 & 1 & 1 & -1 & 1 & 1 & 1 & -1 & 1 & 1 & 1 & -1 & 1 & 1 \\ 1 & 1 & -1 & 1 & 1 & 1 & -1 & 1 & 1 & 1 & -1 & 1 & 1 & 1 & -1 & 1 \\ 1 & 1 & 1 & -1 & 1 & 1 & 1 & -1 & 1 & 1 & 1 & -1 & 1 & 1 & 1 & -1 \\ -1 & 1 & 1 & 1 & -1 & 1 & 1 & 1 & -1 & 1 & 1 & 1 & -1 & 1 & 1 & 1 \\ 1 & -1 & 1 & 1 & -1 & 1 & -1 & -1 & 1 & -1 & 1 & 1 & -1 & 1 & -1 & -1 \\ 1 & 1 & -1 & 1 & -1 & -1 & 1 & -1 & 1 & 1 & -1 & 1 & -1 & -1 & 1 & -1 \\ 1 & 1 & 1 & -1 & -1 & -1 & -1 & 1 & 1 & 1 & 1 & -1 & -1 & -1 & -1 & 1 \\ -1 & 1 & 1 & 1 & 1 & -1 & -1 & -1 & -1 & 1 & 1 & 1 & 1 & -1 & -1 & -1 \\ 1 & -1 & 1 & 1 & 1 & -1 & 1 & 1 & -1 & 1 & -1 & -1 & -1 & 1 & -1 & -1 \\ 1 & 1 & -1 & 1 & 1 & 1 & -1 & 1 & -1 & -1 & 1 & -1 & -1 & -1 & 1 & -1 \\ 1 & 1 & 1 & -1 & 1 & 1 & 1 & -1 & -1 & -1 & -1 & 1 & -1 & -1 & -1 & 1 \\ -1 & 1 & 1 & 1 & -1 & 1 & 1 & 1 & 1 & -1 & -1 & -1 & 1 & -1 & -1 & -1 \\ 1 & -1 & 1 & 1 & -1 & 1 & -1 & -1 & -1 & 1 & -1 & -1 & 1 & -1 & 1 & 1 \\ 1 & 1 & -1 & 1 & -1 & -1 & 1 & -1 & -1 & -1 & 1 & -1 & 1 & 1 & -1 & 1 \\ 1 & 1 & 1 & -1 & -1 & -1 & -1 & 1 & -1 & -1 & -1 & 1 & 1 & 1 & 1 & -1 \\ -1 & 1 & 1 & 1 & 1 & -1 & -1 & -1 & 1 & -1 & -1 & -1 & -1 & 1 & 1 & 1 \end{bmatrix} \quad (47)$$

Formula (47) is the $P_{16\times16}$ matrix shown by using Formula (17) and Formula (21) as examples. For brevity, 20 matrices obtained based on any one or more of the three operations of cyclic shift, overall negation, and reversing in Formula (47) are not enumerated herein.

In a possible implementation, the $P_{16\times16}$ matrix may be shown as follows:

$$P_{16*16} = \begin{bmatrix} -1 & 1 & -1 & -1 & -1 & 1 & -1 & -1 & 1 & -1 & 1 & 1 & 1 & -1 & 1 & 1 \\ -1 & -1 & 1 & -1 & -1 & -1 & 1 & -1 & 1 & 1 & -1 & 1 & 1 & 1 & -1 & 1 \\ -1 & -1 & -1 & 1 & -1 & -1 & -1 & 1 & 1 & 1 & 1 & -1 & 1 & 1 & 1 & -1 \\ 1 & -1 & -1 & -1 & 1 & -1 & -1 & -1 & -1 & 1 & 1 & 1 & -1 & 1 & 1 & 1 \\ -1 & 1 & -1 & -1 & 1 & -1 & 1 & 1 & 1 & -1 & 1 & 1 & -1 & 1 & -1 & -1 \\ -1 & -1 & 1 & -1 & 1 & 1 & -1 & 1 & 1 & 1 & -1 & 1 & -1 & -1 & 1 & -1 \\ -1 & -1 & -1 & 1 & 1 & 1 & 1 & -1 & 1 & 1 & 1 & -1 & -1 & -1 & -1 & 1 \\ 1 & -1 & -1 & -1 & -1 & 1 & 1 & 1 & -1 & 1 & 1 & 1 & 1 & -1 & -1 & -1 \\ 1 & -1 & 1 & 1 & 1 & -1 & 1 & 1 & 1 & -1 & 1 & 1 & -1 & 1 & 1 & 1 \\ 1 & 1 & -1 & 1 & 1 & 1 & -1 & 1 & 1 & 1 & -1 & 1 & 1 & 1 & -1 & 1 \\ 1 & 1 & 1 & -1 & 1 & 1 & 1 & -1 & 1 & 1 & 1 & -1 & 1 & 1 & 1 & -1 \\ -1 & 1 & 1 & 1 & -1 & 1 & 1 & 1 & -1 & 1 & 1 & 1 & -1 & 1 & 1 & 1 \\ 1 & -1 & 1 & 1 & -1 & 1 & -1 & -1 & 1 & -1 & 1 & 1 & -1 & 1 & -1 & -1 \\ 1 & 1 & -1 & 1 & -1 & -1 & 1 & -1 & 1 & 1 & -1 & 1 & -1 & -1 & 1 & -1 \\ 1 & 1 & 1 & -1 & -1 & -1 & -1 & 1 & 1 & 1 & 1 & -1 & -1 & -1 & -1 & 1 \\ -1 & 1 & 1 & 1 & 1 & -1 & -1 & -1 & -1 & 1 & 1 & 1 & 1 & -1 & -1 & -1 \end{bmatrix} \quad (48)$$

Formula (47) is the $P_{16\times16}$ matrix shown by using Formula (18) and Formula (21) as examples. For brevity, 45 matrices obtained based on any one or more of the three operations of cyclic shift, overall negation, and reversing in Formula (37) are not enumerated herein.

In a possible implementation, the $P_{16\times16}$ matrix may be shown as follows:

$$P_{16*16} = \begin{bmatrix} 1 & -1 & 1 & 1 & 1 & -1 & 1 & 1 & -1 & 1 & -1 & -1 & -1 & 1 & -1 & -1 \\ 1 & 1 & -1 & 1 & 1 & 1 & -1 & 1 & -1 & -1 & 1 & -1 & -1 & -1 & 1 & -1 \\ 1 & 1 & 1 & -1 & 1 & 1 & 1 & -1 & -1 & -1 & -1 & 1 & -1 & -1 & -1 & 1 \\ -1 & 1 & 1 & 1 & -1 & 1 & 1 & 1 & 1 & -1 & -1 & -1 & 1 & -1 & -1 & -1 \\ 1 & -1 & 1 & 1 & -1 & 1 & -1 & -1 & -1 & 1 & -1 & -1 & 1 & -1 & 1 & 1 \\ 1 & 1 & -1 & 1 & -1 & -1 & 1 & -1 & -1 & -1 & 1 & -1 & 1 & 1 & -1 & 1 \\ 1 & 1 & 1 & -1 & -1 & -1 & -1 & 1 & -1 & -1 & -1 & 1 & 1 & 1 & 1 & -1 \\ -1 & 1 & 1 & 1 & 1 & -1 & -1 & -1 & 1 & -1 & -1 & -1 & -1 & 1 & 1 & 1 \\ 1 & -1 & 1 & 1 & 1 & -1 & 1 & 1 & 1 & -1 & 1 & 1 & 1 & -1 & 1 & 1 \\ 1 & 1 & -1 & 1 & 1 & 1 & -1 & 1 & 1 & 1 & -1 & 1 & 1 & 1 & -1 & 1 \\ 1 & 1 & 1 & -1 & 1 & 1 & 1 & -1 & 1 & 1 & 1 & -1 & 1 & 1 & 1 & -1 \\ -1 & 1 & 1 & 1 & -1 & 1 & 1 & 1 & -1 & 1 & 1 & 1 & -1 & 1 & 1 & 1 \\ 1 & -1 & 1 & 1 & -1 & 1 & -1 & -1 & 1 & -1 & 1 & 1 & -1 & 1 & -1 & -1 \\ 1 & 1 & -1 & 1 & -1 & -1 & 1 & -1 & 1 & 1 & -1 & 1 & -1 & -1 & 1 & -1 \\ 1 & 1 & 1 & -1 & -1 & -1 & -1 & 1 & 1 & 1 & 1 & -1 & -1 & -1 & -1 & 1 \\ -1 & 1 & 1 & 1 & 1 & -1 & -1 & -1 & -1 & 1 & 1 & 1 & 1 & -1 & -1 & -1 \end{bmatrix} \quad (49)$$

Formula (49) is the $P_{16\times16}$ matrix shown by using Formula (19) and Formula (21) as examples. For brevity, matrices obtained based on any one or more of the three operations of cyclic shift, overall negation, and reversing in Formula (37) are not enumerated herein.

In a possible implementation, the $P_{16\times16}$ matrix may be shown as follows:

$$P_{16*16} = \begin{bmatrix} 1 & -1 & 1 & 1 & 1 & -1 & 1 & 1 & 1 & -1 & 1 & 1 & 1 & -1 & 1 & 1 \\ 1 & 1 & -1 & 1 & 1 & 1 & -1 & 1 & 1 & 1 & -1 & 1 & 1 & 1 & -1 & 1 \\ 1 & 1 & 1 & -1 & 1 & 1 & 1 & -1 & 1 & 1 & 1 & -1 & 1 & 1 & 1 & -1 \\ -1 & 1 & 1 & 1 & -1 & 1 & 1 & 1 & -1 & 1 & 1 & 1 & -1 & 1 & 1 & 1 \\ 1 & -1 & 1 & 1 & -1 & 1 & -1 & -1 & 1 & -1 & 1 & 1 & -1 & 1 & -1 & -1 \\ 1 & 1 & -1 & 1 & -1 & -1 & 1 & -1 & 1 & 1 & -1 & 1 & -1 & -1 & 1 & -1 \\ 1 & 1 & 1 & -1 & -1 & -1 & -1 & 1 & 1 & 1 & 1 & -1 & -1 & -1 & -1 & 1 \\ -1 & 1 & 1 & 1 & 1 & -1 & -1 & -1 & 1 & 1 & 1 & 1 & 1 & -1 & -1 & -1 \\ -1 & 1 & -1 & -1 & -1 & 1 & -1 & -1 & 1 & -1 & 1 & 1 & 1 & -1 & 1 & 1 \\ -1 & -1 & 1 & -1 & -1 & -1 & 1 & -1 & 1 & 1 & -1 & 1 & 1 & 1 & -1 & 1 \\ -1 & -1 & -1 & 1 & -1 & -1 & -1 & 1 & 1 & 1 & 1 & -1 & 1 & 1 & 1 & -1 \\ 1 & -1 & -1 & -1 & 1 & -1 & -1 & -1 & -1 & 1 & 1 & 1 & -1 & 1 & 1 & 1 \\ -1 & 1 & -1 & -1 & 1 & -1 & 1 & 1 & 1 & -1 & 1 & 1 & -1 & 1 & -1 & -1 \\ -1 & -1 & 1 & -1 & 1 & 1 & -1 & 1 & 1 & 1 & -1 & 1 & -1 & -1 & 1 & -1 \\ -1 & -1 & -1 & 1 & 1 & 1 & 1 & -1 & 1 & 1 & 1 & -1 & -1 & -1 & -1 & 1 \\ 1 & -1 & -1 & -1 & -1 & 1 & 1 & 1 & -1 & 1 & 1 & 1 & 1 & -1 & -1 & -1 \end{bmatrix} \quad (50)$$

Formula (50) is the $P_{16\times16}$ matrix shown by using Formula (20) and Formula (21) as examples. For brevity, matrices obtained based on any one or more of the three operations of cyclic shift, overall negation, and reversing in Formula (37) are not enumerated herein.

In a possible implementation, the $P_{12\times12}$ matrix may be shown as follows:

$$P_{12\times12} = \begin{bmatrix} 1 & 1 & -1 & 1 & -1 & -1 & 1 & -1 & -1 & -1 & 1 & 1 \\ 1 & -1 & 1 & -1 & -1 & 1 & -1 & -1 & -1 & 1 & 1 & 1 \\ -1 & 1 & -1 & -1 & 1 & -1 & -1 & -1 & 1 & 1 & 1 & 1 \\ 1 & -1 & -1 & 1 & -1 & -1 & -1 & 1 & 1 & 1 & -1 & 1 \\ -1 & -1 & 1 & -1 & -1 & -1 & 1 & 1 & 1 & -1 & 1 & 1 \\ -1 & 1 & -1 & -1 & -1 & 1 & 1 & 1 & -1 & 1 & -1 & 1 \\ 1 & -1 & -1 & -1 & 1 & 1 & 1 & -1 & 1 & -1 & -1 & 1 \\ -1 & -1 & -1 & 1 & 1 & 1 & -1 & 1 & -1 & -1 & 1 & 1 \\ -1 & -1 & 1 & 1 & 1 & -1 & 1 & -1 & -1 & 1 & -1 & 1 \\ -1 & 1 & 1 & 1 & -1 & 1 & -1 & -1 & 1 & -1 & -1 & 1 \\ 1 & 1 & 1 & -1 & 1 & -1 & -1 & 1 & -1 & -1 & -1 & 1 \\ 1 & 1 & 1 & 1 & 1 & 1 & 1 & 1 & 1 & 1 & 1 & 1 \end{bmatrix} \quad (51)$$

The submatrix $S_{(n-1)\times(n-1)}$ in Formula (51) is a Hankel matrix.

In a possible implementation, the $P_{16\times16}$ matrix may be shown as follows:

$$P_{16*16} = \begin{bmatrix} -1 & -1 & 1 & -1 & 1 & -1 & -1 & 1 & 1 & -1 & 1 & 1 & 1 & -1 & -1 & 1 \\ -1 & 1 & -1 & 1 & -1 & -1 & 1 & 1 & -1 & 1 & 1 & 1 & -1 & -1 & -1 & 1 \\ 1 & -1 & 1 & -1 & -1 & 1 & 1 & -1 & 1 & 1 & 1 & -1 & -1 & -1 & -1 & 1 \\ -1 & 1 & -1 & -1 & 1 & 1 & -1 & 1 & 1 & 1 & -1 & -1 & -1 & -1 & 1 & 1 \\ 1 & -1 & -1 & 1 & 1 & -1 & 1 & 1 & 1 & -1 & -1 & -1 & -1 & 1 & -1 & 1 \\ -1 & -1 & 1 & 1 & -1 & 1 & 1 & 1 & -1 & -1 & -1 & -1 & 1 & -1 & 1 & 1 \\ -1 & 1 & 1 & -1 & 1 & 1 & 1 & -1 & -1 & -1 & -1 & 1 & -1 & 1 & -1 & 1 \\ 1 & 1 & -1 & 1 & 1 & 1 & -1 & -1 & -1 & -1 & 1 & -1 & 1 & -1 & -1 & 1 \\ 1 & -1 & 1 & 1 & 1 & -1 & -1 & -1 & -1 & 1 & -1 & 1 & -1 & -1 & 1 & 1 \\ -1 & 1 & 1 & 1 & -1 & -1 & -1 & -1 & 1 & -1 & 1 & -1 & -1 & 1 & 1 & 1 \\ 1 & 1 & 1 & -1 & -1 & -1 & -1 & 1 & -1 & 1 & -1 & -1 & 1 & 1 & -1 & 1 \\ 1 & 1 & -1 & -1 & -1 & -1 & 1 & -1 & 1 & -1 & -1 & 1 & 1 & -1 & 1 & 1 \\ 1 & -1 & -1 & -1 & -1 & 1 & -1 & 1 & -1 & -1 & 1 & 1 & -1 & 1 & 1 & 1 \\ -1 & -1 & -1 & -1 & 1 & -1 & 1 & -1 & -1 & 1 & 1 & -1 & 1 & 1 & 1 & 1 \\ -1 & -1 & -1 & 1 & -1 & 1 & -1 & -1 & 1 & 1 & -1 & 1 & 1 & 1 & -1 & 1 \\ 1 & 1 & 1 & 1 & 1 & 1 & 1 & 1 & 1 & 1 & 1 & 1 & 1 & 1 & 1 & 1 \end{bmatrix} \quad (52)$$

The submatrix $S_{(n-1)\times(n-1)}$ in Formula (52) is a Hankel matrix.

For example, the following describes the $R_{n\times n}$ matrix provided in this embodiment of this application.

In a possible implementation, the $R_{n\times n}$ matrix may be shown as follows:

$$R_{12\times12} = \begin{bmatrix} 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \\ 1 & 1 & 1 & -1 & 1 & -1 & -1 & 1 & -1 & -1 & -1 & 1 \end{bmatrix} \quad (53)$$

It may be understood that elements in each row of the $R_{n\times n}$ matrix are the same. Therefore, for brevity, Formula (54) to Formula (83) shown in the following show only a first row of the $R_{n\times n}$ matrix, but it should not be understood as a limitation on this embodiment of this application.

In a possible implementation, the $R_{n\times n}$ matrix may be shown as follows:

$$R_{12\times12}=[1\ 1\ 1\ -1\ 1\ -1\ -1\ 1\ -1\ -1\ -1\ 1] \quad (54)$$

It may be understood that, for an element in another row that is not shown in Formula (54), refer to an element in the first row. The descriptions are also applicable to Formula (55) to Formula (83) shown in the following. For brevity, details are not described again in the following.

In a possible implementation, the $R_{n\times n}$ matrix may be shown as follows:

$$R_{12\times12}=[1\ 1\ 1\ 1\ -1\ 1\ -1\ -1\ 1\ 1\ -1\ -1\ -1] \quad (55)$$

In a possible implementation, the $R_{n\times n}$ matrix may be shown as follows:

$$R_{12\times12}=[1\ 1\ 1\ -1\ 1\ -1\ -1\ 1\ -1\ -1\ -1\ -1] \quad (56)$$

In a possible implementation, the $R_{n\times n}$ matrix may be shown as follows:

$$R_{12\times12}=[-1\ 1\ 1\ 1\ -1\ 1\ -1\ -1\ 1\ 1\ -1\ -1\ -1] \quad (57)$$

In a possible implementation, the $R_{n\times n}$ matrix may be shown as follows:

$$R_{12\times12}=[-1\ -1\ -1\ 1\ 1\ -1\ 1\ 1\ -1\ 1\ 1\ 1\ 1] \quad (58)$$

In a possible implementation, the $R_{n\times n}$ matrix may be shown as follows:

$$R_{12\times12}=[1\ -1\ -1\ -1\ 1\ 1\ -1\ 1\ 1\ -1\ 1\ 1\ 1] \quad (59)$$

In a possible implementation, the $R_{n\times n}$ matrix may be shown as follows:

$$R_{12\times12}=[-1\ -1\ -1\ 1\ 1\ -1\ 1\ 1\ -1\ 1\ 1\ 1\ -1] \quad (60)$$

In a possible implementation, the $R_{n\times n}$ matrix may be shown as follows:

$$R_{12\times12}=[-1\ -1\ -1\ -1\ 1\ 1\ -1\ 1\ 1\ -1\ 1\ 1\ 1] \quad (61)$$

In a possible implementation, the $R_{n\times n}$ matrix may be shown as follows:

$$R_{12\times12}=[-1\ -1\ -1\ 1\ 1\ -1\ -1\ 1\ 1\ -1\ 1\ 1\ 1\ 1] \quad (62)$$

In a possible implementation, the $R_{n\times n}$ matrix may be shown as follows:

$$R_{12\times12}=[1\ -1\ -1\ -1\ 1\ 1\ -1\ -1\ 1\ 1\ -1\ 1\ 1\ 1] \quad (63)$$

In a possible implementation, the $R_{n\times n}$ matrix may be shown as follows:

$$R_{12\times12}=[-1\ -1\ -1\ 1\ 1\ -1\ -1\ 1\ 1\ -1\ 1\ 1\ 1\ -1] \quad (64)$$

In a possible implementation, the $R_{n\times n}$ matrix may be shown as follows:

$$R_{12\times12}=[-1\ -1\ -1\ -1\ 1\ 1\ -1\ -1\ 1\ 1\ -1\ 1\ 1\ 1] \quad (65)$$

In a possible implementation, the $R_{n\times n}$ matrix may be shown as follows:

$$R_{16*16}=[1\ 1\ 1\ -1\ -1\ -1\ -1\ 1\ 1\ -1\ 1\ -1\ -1\ 1\ 1\ -1\ 1] \quad (66)$$

In a possible implementation, the $R_{n\times n}$ matrix may be shown as follows:

$$R_{16*16}=[1\ 1\ 1\ 1\ -1\ -1\ -1\ -1\ 1\ 1\ -1\ 1\ -1\ -1\ 1\ 1\ 1\ -1] \quad (67)$$

In a possible implementation, the $R_{n\times n}$ matrix may be shown as follows:

$$R_{16*16}=[1\ 1\ 1\ -1\ -1\ -1\ -1\ 1\ 1\ -1\ 1\ -1\ -1\ 1\ 1\ -1\ -1] \quad (68)$$

In a possible implementation, the $R_{n\times n}$ matrix may be shown as follows:

$$R_{16*16}=[-1\ 1\ 1\ 1\ -1\ -1\ -1\ -1\ 1\ 1\ -1\ 1\ -1\ -1\ 1\ 1\ 1\ -1] \quad (69)$$

In a possible implementation, the $R_{n\times n}$ matrix may be shown as follows:

$$R_{16*16}=[-1\ -1\ -1\ 1\ 1\ 1\ 1\ 1\ -1\ 1\ 1\ -1\ 1\ 1\ 1\ -1\ -1\ 1\ 1] \quad (70)$$

In a possible implementation, the $R_{n\times n}$ matrix may be shown as follows:

$$R_{16*16}=[1\ -1\ -1\ -1\ 1\ 1\ 1\ 1\ 1\ -1\ 1\ 1\ -1\ 1\ 1\ 1\ -1\ -1\ 1] \quad (71)$$

In a possible implementation, the $R_{n\times n}$ matrix may be shown as follows:

$$R_{16*16}=[-1\ -1\ -1\ 1\ 1\ 1\ 1\ 1\ -1\ 1\ 1\ -1\ 1\ 1\ 1\ -1\ -1\ 1\ -1] \quad (72)$$

In a possible implementation, the $R_{n\times n}$ matrix may be shown as follows:

$$R_{16*16}=[-1\ -1\ -1\ -1\ 1\ 1\ 1\ 1\ 1\ -1\ 1\ 1\ -1\ 1\ 1\ 1\ -1\ -1\ 1] \quad (73)$$

In a possible implementation, the $R_{n\times n}$ matrix may be shown as follows:

$$R_{16*16}=[-1\ 1\ 1\ 1\ -1\ -1\ 1\ 1\ -1\ 1\ -1\ -1\ -1\ 1\ 1\ 1\ 1\ 1] \quad (74)$$

In a possible implementation, the $R_{n\times n}$ matrix may be shown as follows:

$$R_{16*16}=[1\ -1\ 1\ 1\ 1\ -1\ -1\ 1\ 1\ -1\ 1\ -1\ -1\ -1\ -1\ 1\ 1\ 1] \quad (75)$$

In a possible implementation, the $R_{n\times n}$ matrix may be shown as follows:

$$R_{16*16}=[-1\ 1\ 1\ 1\ -1\ -1\ 1\ 1\ -1\ 1\ -1\ -1\ -1\ -1\ 1\ 1\ 1\ 1\ -1] \quad (76)$$

In a possible implementation, the $R_{n\times n}$ matrix may be shown as follows:

$$R_{16*16}=[-1\ -1\ 1\ 1\ 1\ -1\ -1\ 1\ 1\ -1\ 1\ -1\ -1\ -1\ -1\ 1\ 1\ 1] \quad (77)$$

In a possible implementation, the $R_{n\times n}$ matrix may be shown as follows:

$$R_{16*16}=[1\ -1\ 1\ 1\ 1\ 1\ -1\ 1\ 1\ 1\ 1\ -1\ 1\ 1\ 1\ 1\ -1\ 1\ 1\ 1] \quad (78)$$

In a possible implementation, the $R_{n\times n}$ matrix may be shown as follows:

$$R_{16*16}=[-1\ 1\ 1\ -1\ -1\ 1\ -1\ 1\ 1\ -1\ 1\ -1\ 1\ 1\ 1\ 1\ -1\ 1\ 1\ 1] \quad (79)$$

In a possible implementation, the $R_{n\times n}$ matrix may be shown as follows:

$$R_{16*16}=[1\ -1\ 1\ 1\ 1\ 1\ -1\ 1\ 1\ -1\ 1\ -1\ -1\ -1\ 1\ 1\ -1\ -1\ -1] \quad (80)$$

In a possible implementation, the $R_{n \times n}$ matrix may be shown as follows:

$$R_{16*16}=[1\ 1\ 1\ 1\ 1\ -1\ 1\ 1\ 1\ -1\ 1\ 1\ 1\ -1\ 1\ 1] \tag{81}$$

In a possible implementation, the $R_{n \times n}$ matrix may be shown as follows:

$$R_{12 \times 12}=[1\ 1\ -1\ 1\ 1\ -1\ 1\ -1\ -1\ -1\ 1\ 1] \tag{82}$$

In a possible implementation, the $R_{n \times n}$ matrix may be shown as follows:

$$R_{16 \times 16}=[-1\ -1\ 1\ -1\ 1\ 1\ -1\ -1\ 1\ 1\ -1\ 1\ 1\ 1\ -1\ -1\ 1] \tag{83}$$

It may be understood that Formula (53) to Formula (83) are merely examples of the $R_{n \times n}$ matrix shown in this embodiment of this application.

For example, the following describes the first matrix provided in this embodiment of this application.

It may be understood that, for an example in which the first matrix is equal to the $P_{n \times n}$ matrix or the $R_{n \times n}$ matrix, details are not described again in the following. The following shows only an example in which the first matrix is equal to an overall negation matrix of the $P_{n \times n}$ matrix, the first matrix is equal to a transpose matrix of the $P_{n \times n}$ matrix, or the first matrix is equal to a transpose matrix (which may also be understood as an overall negation matrix of a transpose matrix of the $P_{n \times n}$ matrix) of an overall negation matrix of the $P_{n \times n}$ matrix.

For example, Formula (22) is used as an example, and the first matrix may be shown as follows:

$$A_{LTF}^{k} = \begin{bmatrix} -1 & -1 & -1 & 1 & -1 & 1 & 1 & -1 & 1 & 1 & 1 & -1 \\ 1 & -1 & -1 & -1 & 1 & -1 & 1 & 1 & -1 & 1 & 1 & -1 \\ 1 & 1 & -1 & -1 & -1 & 1 & -1 & 1 & 1 & -1 & 1 & -1 \\ 1 & 1 & 1 & -1 & -1 & -1 & 1 & -1 & 1 & 1 & -1 & -1 \\ -1 & 1 & 1 & 1 & -1 & -1 & -1 & 1 & -1 & 1 & 1 & -1 \\ 1 & -1 & 1 & 1 & 1 & -1 & -1 & -1 & 1 & -1 & 1 & -1 \\ 1 & 1 & -1 & 1 & 1 & 1 & -1 & -1 & -1 & 1 & -1 & -1 \\ -1 & 1 & 1 & -1 & 1 & 1 & 1 & -1 & -1 & -1 & 1 & -1 \\ 1 & -1 & 1 & 1 & -1 & 1 & 1 & 1 & -1 & -1 & -1 & -1 \\ -1 & 1 & -1 & 1 & 1 & -1 & 1 & 1 & 1 & -1 & -1 & -1 \\ -1 & -1 & 1 & -1 & 1 & 1 & -1 & 1 & 1 & 1 & -1 & -1 \\ -1 & -1 & -1 & -1 & -1 & -1 & -1 & -1 & -1 & -1 & -1 & -1 \end{bmatrix} \tag{84}$$

In a possible implementation, the first matrix may be shown as follows:

$$A_{LTF}^{k} = \begin{bmatrix} 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ -1 & 1 & 1 & 1 & -1 & -1 & -1 & 1 & -1 & -1 & 1 & 1 \\ 1 & -1 & 1 & 1 & 1 & -1 & -1 & -1 & 1 & -1 & -1 & 1 \\ -1 & 1 & -1 & 1 & 1 & 1 & -1 & -1 & -1 & 1 & -1 & 1 \\ -1 & -1 & 1 & -1 & 1 & 1 & 1 & -1 & -1 & -1 & 1 & 1 \\ 1 & -1 & -1 & 1 & -1 & 1 & 1 & 1 & -1 & -1 & -1 & 1 \\ -1 & 1 & -1 & -1 & 1 & -1 & 1 & 1 & 1 & -1 & -1 & 1 \\ -1 & -1 & 1 & -1 & -1 & 1 & -1 & 1 & 1 & 1 & -1 & 1 \\ -1 & -1 & -1 & 1 & -1 & -1 & 1 & -1 & 1 & 1 & 1 & 1 \\ 1 & 1 & 1 & 1 & 1 & 1 & 1 & 1 & 1 & 1 & 1 & 1 \end{bmatrix} \tag{85}$$

In a possible implementation, the first matrix may be shown as follows:

$$A_{LTF}^{k} = \begin{bmatrix} -1 & 1 & 1 & 1 & -1 & 1 & 1 & -1 & 1 & -1 & -1 & -1 \\ -1 & -1 & 1 & 1 & 1 & -1 & 1 & 1 & -1 & 1 & -1 & -1 \\ -1 & -1 & -1 & 1 & 1 & 1 & -1 & 1 & 1 & -1 & 1 & -1 \\ 1 & -1 & -1 & -1 & 1 & 1 & 1 & -1 & 1 & 1 & -1 & -1 \\ -1 & 1 & -1 & -1 & -1 & 1 & 1 & 1 & -1 & 1 & 1 & -1 \\ 1 & -1 & 1 & -1 & -1 & -1 & 1 & 1 & 1 & -1 & 1 & -1 \\ 1 & 1 & -1 & 1 & -1 & -1 & -1 & 1 & 1 & 1 & -1 & -1 \\ -1 & 1 & 1 & -1 & 1 & -1 & -1 & -1 & 1 & 1 & 1 & -1 \\ 1 & -1 & 1 & 1 & -1 & 1 & -1 & -1 & -1 & 1 & 1 & -1 \\ 1 & 1 & -1 & 1 & 1 & -1 & 1 & -1 & -1 & -1 & 1 & -1 \\ 1 & 1 & 1 & -1 & 1 & 1 & -1 & 1 & -1 & -1 & -1 & -1 \\ -1 & -1 & -1 & -1 & -1 & -1 & -1 & -1 & -1 & -1 & -1 & -1 \end{bmatrix} \tag{86}$$

Formula (84) is shown by using overall negation of Formula (22) as an example, Formula (85) is shown by using a transpose matrix of Formula (22) as an example, and Formula (86) is shown by using a transpose matrix (which may also be understood as overall negation of a transpose matrix of Formula (22)) of an overall negation matrix of Formula (22) as an example.

For example, Formula (35) is used as an example, and the first matrix may be shown as follows:

$$A_{LTF}^{k} = \begin{bmatrix} -1 & -1 & -1 & 1 & 1 & 1 & 1 & -1 & 1 & -1 & 1 & 1 & -1 & -1 & 1 & -1 \\ 1 & -1 & -1 & -1 & 1 & 1 & 1 & 1 & -1 & 1 & -1 & 1 & 1 & -1 & -1 & -1 \\ -1 & 1 & -1 & -1 & -1 & 1 & 1 & 1 & 1 & -1 & 1 & -1 & 1 & 1 & -1 & -1 \\ -1 & -1 & 1 & -1 & -1 & -1 & 1 & 1 & 1 & 1 & -1 & 1 & -1 & 1 & 1 & -1 \\ 1 & -1 & -1 & 1 & -1 & -1 & -1 & 1 & 1 & 1 & 1 & -1 & 1 & -1 & 1 & -1 \\ 1 & 1 & -1 & -1 & 1 & -1 & -1 & -1 & 1 & 1 & 1 & 1 & -1 & 1 & -1 & -1 \\ -1 & 1 & 1 & -1 & -1 & 1 & -1 & -1 & -1 & 1 & 1 & 1 & 1 & -1 & 1 & -1 \\ 1 & -1 & 1 & 1 & -1 & -1 & 1 & -1 & -1 & -1 & 1 & 1 & 1 & 1 & -1 & -1 \\ -1 & 1 & -1 & 1 & 1 & -1 & -1 & 1 & -1 & -1 & -1 & 1 & 1 & 1 & 1 & -1 \\ 1 & -1 & 1 & -1 & 1 & 1 & -1 & -1 & 1 & -1 & -1 & -1 & 1 & 1 & 1 & -1 \\ 1 & 1 & -1 & 1 & -1 & 1 & 1 & -1 & -1 & 1 & -1 & -1 & -1 & 1 & 1 & -1 \\ 1 & 1 & 1 & -1 & 1 & -1 & 1 & 1 & -1 & -1 & 1 & -1 & -1 & -1 & 1 & -1 \\ 1 & 1 & 1 & 1 & -1 & 1 & -1 & 1 & 1 & -1 & -1 & 1 & -1 & -1 & -1 & -1 \\ -1 & 1 & 1 & 1 & 1 & -1 & 1 & -1 & 1 & 1 & -1 & -1 & 1 & -1 & -1 & -1 \\ -1 & -1 & 1 & 1 & 1 & 1 & 1 & 1 & -1 & 1 & 1 & -1 & -1 & 1 & -1 & -1 \\ -1 & -1 & -1 & -1 & -1 & -1 & -1 & -1 & -1 & -1 & -1 & -1 & -1 & -1 & -1 & -1 \end{bmatrix} \tag{87}$$

In a possible implementation, the first matrix may be shown as follows:

$$
A_{LTF}^k = \begin{bmatrix}
1 & -1 & 1 & 1 & -1 & -1 & 1 & -1 & 1 & -1 & -1 & -1 & -1 & 1 & 1 & 1 \\
1 & 1 & -1 & 1 & 1 & -1 & -1 & 1 & -1 & 1 & -1 & -1 & -1 & -1 & 1 & 1 \\
1 & 1 & 1 & -1 & 1 & 1 & -1 & -1 & 1 & -1 & 1 & -1 & -1 & -1 & -1 & 1 \\
-1 & 1 & 1 & 1 & -1 & 1 & 1 & -1 & -1 & 1 & -1 & 1 & -1 & -1 & -1 & 1 \\
-1 & -1 & 1 & 1 & 1 & -1 & 1 & 1 & -1 & -1 & 1 & -1 & 1 & -1 & -1 & 1 \\
-1 & -1 & -1 & 1 & 1 & 1 & -1 & 1 & 1 & -1 & -1 & 1 & -1 & 1 & -1 & 1 \\
-1 & -1 & -1 & -1 & 1 & 1 & 1 & -1 & 1 & 1 & -1 & -1 & 1 & -1 & 1 & 1 \\
1 & -1 & -1 & -1 & -1 & 1 & 1 & 1 & -1 & 1 & 1 & -1 & -1 & 1 & -1 & 1 \\
-1 & 1 & -1 & -1 & -1 & -1 & 1 & 1 & 1 & -1 & 1 & 1 & -1 & -1 & 1 & 1 \\
1 & -1 & 1 & -1 & -1 & -1 & -1 & 1 & 1 & 1 & -1 & 1 & 1 & -1 & -1 & 1 \\
-1 & 1 & -1 & 1 & -1 & -1 & -1 & -1 & 1 & 1 & 1 & -1 & 1 & 1 & -1 & 1 \\
-1 & -1 & 1 & -1 & 1 & -1 & -1 & -1 & -1 & 1 & 1 & 1 & -1 & 1 & 1 & 1 \\
1 & -1 & -1 & 1 & -1 & 1 & -1 & -1 & -1 & -1 & 1 & 1 & 1 & -1 & 1 & 1 \\
1 & 1 & -1 & -1 & 1 & -1 & 1 & -1 & -1 & -1 & -1 & 1 & 1 & 1 & -1 & 1 \\
-1 & 1 & 1 & -1 & -1 & 1 & -1 & 1 & -1 & -1 & -1 & -1 & 1 & 1 & 1 & 1 \\
1 & 1 & 1 & 1 & 1 & 1 & 1 & 1 & 1 & 1 & 1 & 1 & 1 & 1 & 1 & 1
\end{bmatrix} \quad (88)
$$

20

In a possible implementation, the first matrix may be shown as follows:

$$
A_{LTF}^k = \begin{bmatrix}
-1 & 1 & -1 & -1 & 1 & 1 & -1 & 1 & -1 & 1 & 1 & 1 & 1 & -1 & -1 & -1 \\
-1 & -1 & 1 & -1 & -1 & 1 & 1 & -1 & 1 & -1 & 1 & 1 & 1 & 1 & -1 & -1 \\
-1 & -1 & -1 & 1 & -1 & -1 & 1 & 1 & -1 & 1 & -1 & 1 & 1 & 1 & 1 & -1 \\
1 & -1 & -1 & -1 & 1 & -1 & -1 & 1 & 1 & -1 & 1 & -1 & 1 & 1 & 1 & -1 \\
1 & 1 & -1 & -1 & -1 & 1 & -1 & -1 & 1 & 1 & -1 & 1 & -1 & 1 & 1 & -1 \\
1 & 1 & 1 & -1 & -1 & -1 & 1 & -1 & -1 & 1 & 1 & -1 & 1 & -1 & 1 & -1 \\
1 & 1 & 1 & 1 & -1 & -1 & -1 & 1 & -1 & -1 & 1 & 1 & -1 & 1 & -1 & -1 \\
-1 & 1 & 1 & 1 & 1 & -1 & -1 & -1 & 1 & -1 & -1 & 1 & 1 & -1 & 1 & -1 \\
1 & -1 & 1 & 1 & 1 & 1 & -1 & -1 & -1 & 1 & -1 & -1 & 1 & 1 & -1 & -1 \\
-1 & 1 & -1 & 1 & 1 & 1 & 1 & -1 & -1 & -1 & 1 & -1 & -1 & 1 & 1 & -1 \\
1 & -1 & 1 & -1 & 1 & 1 & 1 & 1 & -1 & -1 & -1 & 1 & -1 & -1 & 1 & -1 \\
1 & 1 & -1 & 1 & -1 & 1 & 1 & 1 & 1 & -1 & -1 & -1 & 1 & -1 & -1 & -1 \\
-1 & 1 & 1 & -1 & 1 & -1 & 1 & 1 & 1 & 1 & -1 & -1 & -1 & 1 & -1 & -1 \\
-1 & -1 & 1 & 1 & -1 & 1 & -1 & 1 & 1 & 1 & 1 & -1 & -1 & -1 & 1 & -1 \\
1 & -1 & -1 & 1 & 1 & -1 & 1 & -1 & 1 & 1 & 1 & 1 & -1 & -1 & -1 & -1 \\
-1 & -1 & -1 & -1 & -1 & -1 & -1 & -1 & -1 & -1 & -1 & -1 & -1 & -1 & -1 & -1
\end{bmatrix} \quad (89)
$$

Formula (88) is shown by using overall negation of Formula (35) as an example, Formula (87) is shown by using a transpose matrix of Formula (35) as an example, and Formula (89) is shown by using a transpose matrix (which may also be understood as overall negation of a transpose matrix of Formula (35)) of an overall negation matrix of Formula (35) as an example.

It may be understood that matrices shown above are merely examples, and should not be construed as a limitation on embodiments of this application.

The following describes communication apparatuses provided in embodiments of this application.

In this application, the communication apparatus is divided into function modules based on the foregoing method examples. For example, function modules corresponding to functions may be obtained through division, or two or more functions may be integrated into one processing module. The integrated module may be implemented in a form of hardware, or may be implemented in a form of a software functional module. It should be noted that, in this application, module division is an example, and is merely logical function division. During actual implementation, another division manner may be used. The following describes in detail communication apparatuses in embodiments of this application with reference to FIG. 5 to FIG. 7.

Figure 5:
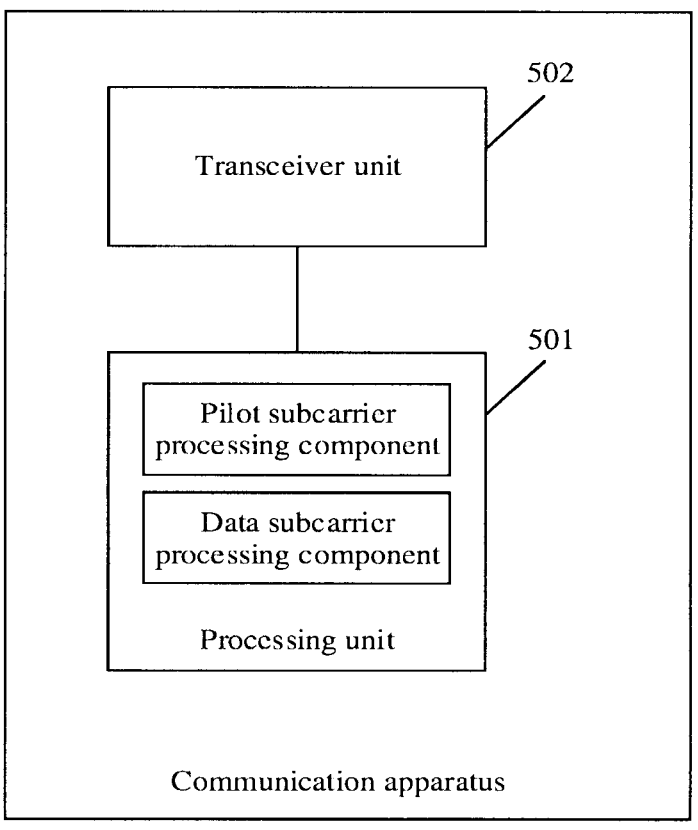
FIG. 5 to FIG. 7 are schematic diagrams of a structure of a communication apparatus according to an embodiment of this application.

FIG. 5 is a schematic diagram of a structure of a communication apparatus according to an embodiment of this application. As shown in FIG. 5, the communication apparatus includes a processing unit 501 and a transceiver unit 502.

In some embodiments of this application, the communication apparatus may be a receive device, a chip in a receive device, or the like shown above. In other words, the communication apparatus may be configured to perform a step or a function performed by the receive device in the method embodiments.

For example, the transceiver unit 502 is configured to input a PPDU, where the PPDU includes a preamble, the preamble includes a long training field LTF, and the LTF includes a plurality of LTF symbols.

The processing unit 501 is configured to process, according to a first matrix $$A_{LTF}^k,$$

signals received on the plurality of LTF symbols, where the first matrix $$A_{LTF}^k$$

is a $P_{n \times n}$ matrix, or the first matrix $$A_{LTF}^k$$

is obtained according to a $P_{n \times n}$ matrix, where $$P_{n \times n} \times P_{n \times n}^T = n \times I,$$

I is an identity matrix, the $P_{n \times n}$ matrix includes n rows and n columns, the $$P_{n \times n}^T$$

matrix is a transpose matrix of the $P_{n \times n}$ matrix, n is an integer greater than 8, and k indicates a $k^{th}$ subcarrier in each of the plurality of LTF symbols.

It may be understood that that the transceiver unit 502 is configured to input a PPDU includes: The transceiver unit 502 is configured to receive the PPDU sent by a transmit device.

In this embodiment of this application, for descriptions of the PPDU, the LTF symbol, a data subcarrier, a pilot subcarrier, the first matrix, the $P_{n \times n}$ matrix, or an $R_{n \times n}$ matrix, refer to descriptions in the method embodiments (including FIG. 4*b*). Details are not described herein again.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again. For example, the transceiver unit 502 may further be configured to perform the receiving step in step 402 shown in FIG. 4*a*, and the processing unit 501 may further be configured to perform step 403 shown in FIG. 4*a*.

FIG. 5 is reused. In some embodiments of this application, the communication apparatus may be a transmit device, a chip in a transmit device, or the like shown above. In other words, the communication apparatus may be configured to perform a step or a function performed by the transmit device in the method embodiments.

For example, the processing unit 501 is configured to determine to generate a PPDU. The transceiver unit 502 is configured to output the PPDU.

It may be understood that that the transceiver unit 502 is configured to output the PPDU includes: The transceiver unit 502 is configured to send the PPDU to a receive device.

In this embodiment of this application, for descriptions of the PPDU, the LTF symbol, a data subcarrier, a pilot subcarrier, the first matrix, the $P_{n \times n}$ matrix, or the $R_{n \times n}$ matrix, refer to descriptions in the method embodiments (including FIG. 4*b*). Details are not described herein again.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again. For example, the processing unit 501 may further be configured to perform step 401 shown in FIG. 4*a*, and the transceiver unit 502 may further be configured to perform the sending step in step 402 shown in FIG. 4*a*.

For example, the processing unit 501 provided in this embodiment of this application may further include a pilot subcarrier processing component and a data subcarrier processing component. For example, when the communication apparatus is a receive device, the receive device may perform phase tracking and/or frequency offset estimation and the like by using the pilot subcarrier processing component, or may perform channel estimation and the like by using the data subcarrier processing component.

The transmit device and the receive device in this embodiment of this application are described above. The following describes possible product forms of the transmit device and the receive device. It should be understood that a product in any form that has the functions of the transmit device in FIG. 5 and a product in any form that has the functions of the receive device in FIG. 5 fall within the protection scope of embodiments of this application. It should further be understood that the following descriptions are merely examples, and do not limit product forms of the transmit device and the receive device in this embodiment of this application.

In a possible implementation, in the communication apparatus shown in FIG. 5, the processing unit 501 may be one or more processors. The transceiver unit 502 may be a transceiver, or the transceiver unit 502 may be a sending unit and a receiving unit. The sending unit may be a transmitter, and the receiving unit may be a receiver. The sending unit and the receiving unit are integrated into one component, for example, a transceiver. In this embodiment of this application, the processor and the transceiver may be coupled, or the like.

A connection manner between the processor and the transceiver is not limited in this embodiment of this application.

Figures 6, 7:
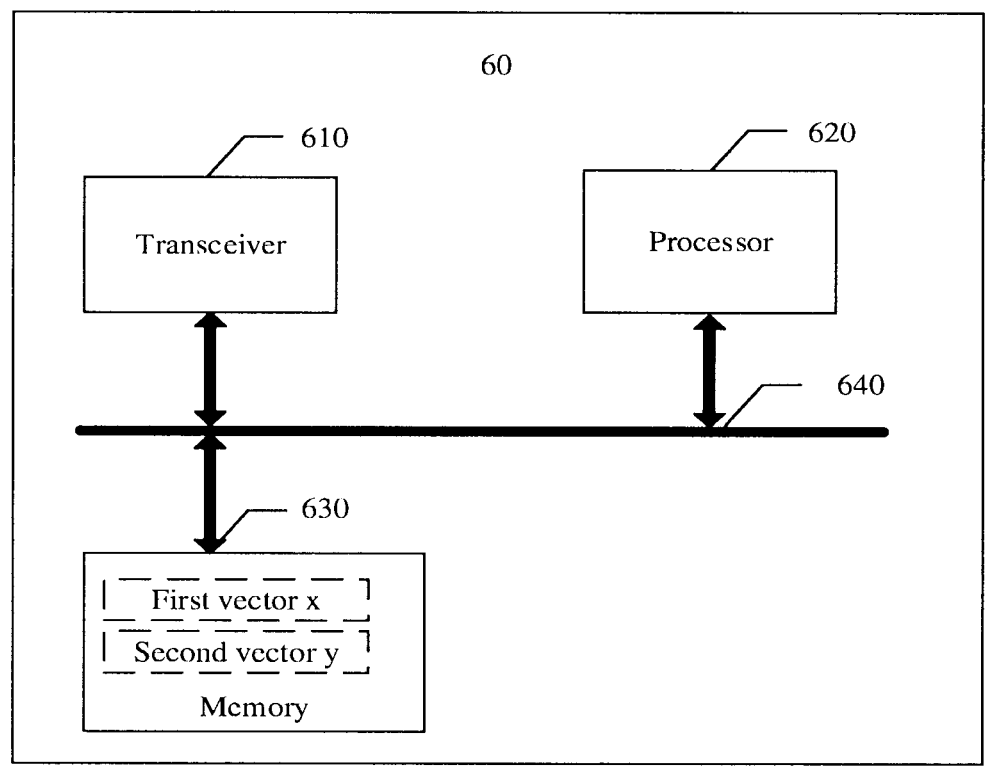

As shown in FIG. 6, a communication apparatus 60 includes one or more processors 620 and a transceiver 610.

For example, when the communication apparatus is configured to perform the step, method, or function performed by the receive device, the transceiver 610 is configured to receive a PPDU from a transmit device. The processor 620 is configured to process, according to the first matrix $$A_{LTF}^k,$$

signals received on a plurality of LTF symbols.

For example, when the communication apparatus is configured to perform the step, method, or function performed by the transmit device, the processor 620 is configured to generate a PPDU. The transceiver 610 is configured to send the PPDU to a receive device.

In this embodiment of this application, for descriptions of the PPDU, the LTF symbol, a data subcarrier, a pilot subcarrier, the first matrix, a $P_{n \times n}$ matrix, or an $R_{n \times n}$ matrix, refer to descriptions in the method embodiments (including FIG. 4*b*). Details are not described herein again.

It may be understood that for specific descriptions of the processor and the transceiver, refer to descriptions of the processing unit and the transceiver unit shown in FIG. 5. Details are not described herein again.

In each implementation of the communication apparatus shown in FIG. 6, the transceiver may include a receiver and a transmitter. The receiver is configured to perform a function (or an operation) of receiving, and the transmitter is configured to perform a function (or an operation) of transmitting. The transceiver is configured to communicate with another device/apparatus through a transmission medium.

Optionally, the communication apparatus 60 may further include one or more memories 630, configured to store program instructions and/or data. The memory 630 is coupled to the processor 620. Coupling in embodiments of this application is indirect coupling or a communication connection between apparatuses, units, or modules, and may be in an electrical, mechanical, or another form, and is used for information exchange between the apparatuses, units, or modules. The processor 620 may operate with the memory 630. The processor 620 may execute the program instructions stored in the memory 630. Optionally, at least one of the one or more memories may be included in the processor. In this embodiment of this application, the memory 630 may store one or more of a first vector x, a second vector y, a third vector x', a fourth vector y', or the like. For example, only the first vector x and the second vector y are shown in the memory shown in FIG. 6. It may be understood that, in FIG. 6, a dashed line indicates that the first vector x and the second vector y are stored in the memory. A reason of using the dashed line lies in that the memory may store only the first vector x, only the second vector y. or both the first vector x and the second vector y.

Therefore, the communication apparatus (for example, the transmit device or the receive device) can obtain the complete $P_{n \times n}$ matrix only by storing the first vector x or the second vector y. This can effectively save storage space of the communication apparatus, and reduce complexity of restoring the $P_{n \times n}$ matrix.

A specific connection medium between the transceiver 610, the processor 620, and the memory 630 is not limited in this embodiment of this application. In this embodiment of this application, the memory 630, the processor 620, and the transceiver 610 are connected through a bus 650 in FIG. 6, and the bus is represented by a thick line in FIG. 6. A connection manner between other components is schematically described, and is not limited thereto. The bus may be classified into an address bus, a data bus, a control bus, or the like. For ease of indication, the bus is indicated by using only one bold line in FIG. 6. However, it does not indicate that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly executed and accomplished by a hardware processor, or may be executed and accomplished by using a combination of hardware and software modules in the processor.

In this embodiment of this application, the memory may include but is not limited to a nonvolatile memory, for example, a hard disk drive (hard disk drive, HDD) or a solid-state drive (solid-state drive, SSD), a random access memory (random access memory, RAM), an erasable programmable read-only memory (erasable programmable ROM, EPROM), a read-only memory (read-only memory, ROM), or a compact disc read-only memory (compact disc read-only memory, CD-ROM). The memory is any storage medium that can be used to carry or store program code in a form of an instruction or a data structure and that can be read and/or written by a computer (for example, the communication apparatus shown in this application). However, this is not limited thereto. The memory in embodiments of this application may alternatively be a circuit or any other apparatus that can implement a storage function, and is configured to store the program instructions and/or the data.

The processor 620 is mainly configured to: process a communication protocol and communication data, control the entire communication apparatus, execute a software program, and process data of the software program. The memory 630 is mainly configured to store the software program and the data. The transceiver 610 may include a control circuit and an antenna. The control circuit is mainly configured to: perform conversion between a baseband signal and a radio frequency signal, and process the radio frequency signal. The antenna is mainly configured to transmit and receive a radio frequency signal in a form of an electromagnetic wave. An input/output apparatus, for example, a touchscreen, a display screen, or a keyboard, is mainly configured to: receive data entered by a user, and output data to the user.

After the communication apparatus is powered on, the processor 620 may read a software program in the memory 630, explain and execute instructions of the software program, and process data of the software program. When data needs to be sent in a wireless manner, after performing baseband processing on to-be-sent data, the processor 620 outputs a baseband signal to the radio frequency circuit. After performing radio frequency processing on the baseband signal, the radio frequency circuit sends a radio frequency signal through an antenna in a form of an electromagnetic wave. When data is sent to the communication apparatus, the radio frequency circuit receives the radio frequency signal through the antenna, converts the radio frequency signal into a baseband signal, and outputs the baseband signal to the processor 620. The processor 620 converts the baseband signal into data and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that the communication apparatus shown in this embodiment of this application may further have more components and the like than those in FIG. 6. This is not limited in this embodiment of this application. The methods performed by the processor and the transceiver are merely examples. For specific steps performed by the processor and the transceiver, refer to the methods described above.

In another possible implementation, in the communication apparatus shown in FIG. 5, the processing unit 501 may be one or more logic circuits, and the transceiver unit 502 may be an input/output interface, which is also referred to as a communication interface, an interface circuit, an interface, or the like. Alternatively, the transceiver unit 502 may be a sending unit and a receiving unit. The sending unit may be an output interface, and the receiving unit may be an input interface. Alternatively, the sending unit and the receiving unit are integrated into one unit, for example, an input/output interface. As shown in FIG. 7, the communication apparatus includes a logic circuit 701 and an interface 702. In other words, the processing unit 501 may be implemented by using the logic circuit 701, and the transceiver unit 902 may be implemented by using the interface 702. The logic circuit 701 may be a chip, a processing circuit, an integrated circuit, a system on chip (system on chip, SoC), or the like. The interface 702 may be a communication interface, an input/output interface, a pin, or the like. For example, FIG. 7 is an example in which the communication apparatus is a chip. The chip includes the logic circuit 701 and the interface 702.

In this embodiment of this application, the logic circuit may further be coupled to the interface. A specific connection manner of the logical circuit and the interface is not limited in this embodiment of this application.

For example, when the communication apparatus is configured to perform the method, function or step performed by the receive device, the interface 702 is configured to input a PPDU. The logic circuit 701 is configured to process, according to a first matrix $$A_{LTF}^k,$$

signals received on a plurality of LTF symbols.

For example, when the communication apparatus is configured to perform the method, function, or step performed by the transmit device, the logic circuit 701 is configured to generate a PPDU. The interface 702 is configured to output the PPDU.

Optionally, the communication apparatus further includes a memory 703. The memory 703 is configured to store one or more of a first vector x, a second vector y, a third vector x', a fourth vector y', or the like. For example, only the first vector x and the second vector y are shown in the memory shown in FIG. 7. It may be understood that, in FIG. 7, a dashed line indicates that the first vector x and the second vector y are stored in the memory. A reason of using the dashed line lies in that the memory may store only the first vector x, only the second vector y, or both the first vector x and the second vector y.

Therefore, the communication apparatus (for example, the transmit device or the receive device) can obtain the complete $P_{n\times n}$ matrix only by storing the first vector x or the second vector y. This can effectively save storage space of the communication apparatus, and reduce complexity of restoring the $P_{n\times n}$ matrix.

It may be understood that the communication apparatus shown in this embodiment of this application may implement the method provided in embodiments of this application in a form of hardware or in a form of software. This is not limited in embodiments of this application.

In this embodiment of this application, for descriptions of the PPDU, the LTF symbol, a data subcarrier, a pilot subcarrier, the first matrix, a $P_{n\times n}$ matrix, or an $R_{n\times n}$ matrix, refer to descriptions in the method embodiments (including FIG. 4b). Details are not described herein again.

For specific implementations of the embodiment shown in FIG. 7, refer to the foregoing embodiments. Details are not described herein again.

An embodiment of this application further provides a wireless communication system. The wireless communication system includes a transmit device and a receive device. The transmit device and the receive device may be configured to perform the method in any embodiment (for example, FIG. 4a).

In addition, this application further provides a computer program. The computer program is used to implement operations and/or processing performed by the transmit device in the method provided in this application.

This application further provides a computer program. The computer program is used to implement operations and/or processing performed by the receive device in the method provided in this application.

This application further provides a computer-readable storage medium. The computer-readable storage medium stores computer code When the computer code is run on a computer, the computer is enabled to perform operations and/or processing performed by the transmit device in the method provided in this application.

This application further provides a computer-readable storage medium. The computer-readable storage medium stores computer code When the computer code is run on a computer, the computer is enabled to perform operations and/or processing performed by the receive device in the method provided in this application.

This application further provides a computer program product. The computer program product includes computer code or a computer program. When the computer code or the computer program is run on a computer, operations and/or processing performed by the transmit device in the method provided in this application are/is performed.

This application further provides a computer program product. The computer program product includes computer code or a computer program. When the computer code or the computer program is run on a computer, operations and/or processing performed by the receive device in the method provided in this application are/is performed.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the technical effects of the solutions provided in embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a readable-storage medium, and includes several instructions for instructing a computer device (which may be a personal computer, a server, a network device, or the like) to perform all or some of the steps of the methods described in embodiments of this application. The readable-storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal processing method comprising:

receiving a physical layer protocol data unit (PPDU) that comprises a preamble, and the preamble comprises a long training field (LTF) comprising a plurality of LTF symbols; and processing, according to a first matrix $$A_{LTF}^k,$$

signals received on the plurality of LTF symbols, wherein the first matrix $$A_{LTF}^k,$$

is a $P_{n \times n}$ matrix, or the first matrix $$A_{LTF}^k$$

is obtained according to a $P_{n \times n}$ matrix, wherein $$P_{n \times n} \times P_{n \times n}^T = n \times I,$$

I is an identity matrix, the $P_{n \times n}$ matrix comprises n rows and n columns, the $$P_{n \times n}^T$$

62 matrix is a transpose matrix of the $P_{n \times n}$ matrix, n is an integer greater than 8, and k indicates a $k^{th}$ subcarrier in each of the plurality of LTF symbols, wherein the first matrix Ax-requires conditions comprising:

wherein the first matrix $$A_{LTF}^k$$

requires conditions comprising:

$$A_{LTF}^k = \begin{cases} R_{n \times n} & \text{if the } k^{th} \text{ subcarrier is a pilot subcarrier} \\ P_{n \times n} & \text{if the } k^{th} \text{ subcarrier is a} \\ & \text{non-pilot subcarrier or a data subcarrier} \end{cases}.$$

and wherein the $R_{n \times n}$ matrix is used for phase tracking and/or frequency offset estimation, and the $P_{n \times n}$ matrix is used for channel estimation.

2. The method according to claim 1, wherein:

$$P_{n \times n} = \begin{bmatrix} S_{(n-1) \times (n-1)} & a \\ a^T & 1 \end{bmatrix};$$

$$P_{n \times n} = \begin{bmatrix} a & S_{(n-1) \times (n-1)} \\ 1 & a^T \end{bmatrix};$$

$$P_{n \times n} = \begin{bmatrix} S_{(n-1) \times (n-1)} & -a \\ a^T & 1 \end{bmatrix}; \text{ or}$$

$$P_{n \times n} = \begin{bmatrix} -a & S_{(n-1) \times (n-1)} \\ 1 & a^T \end{bmatrix}; \text{ and}$$

wherein the $S_{(n-1) \times (n-1)}$ matrix is a submatrix of the $P_{n \times n}$ matrix, the $S_{(n-1) \times (n-1)}$ matrix comprises n−1 rows and n−1 columns, α is a column vector comprising n−1 elements, each element is 1, $α^T$ is a transpose vector of α, and −α indicates a vector obtained through negation of all elements in α.

3. The method according to claim 2, wherein the $S_{(n-1) \times (n-1)}$ matrix is a circulant matrix or a Hankel matrix.

4. The method according to claim 2, wherein:

a first row of the $S_{(n-1) \times (n-1)}$ matrix is equal to a first vector x, and x=[1 1 1 −1 1 −1 −1 1 −1 −1 −1];

a first row of the $S_{(n-1) \times (n-1)}$ matrix is obtained by performing one or more of three operations: cyclic shift, reversing, and overall negation on a first vector x, and x=[1 1 1 −1 1 −1 −1 1 −1 −1 −1];

a first row of the $S_{(n-1) \times (n-1)}$ matrix is equal to a second vector y, and y=[1 1 1 −1 −1 −1 −1 1 −1 1 −1 −1 1 1 −1]; or a first row of the $S_{(n-1) \times (n-1)}$ matrix is obtained by performing one or more of three operations: cyclic shift, reversing, and overall negation on a second vector y, and y=[1 1 1 −1 −1 −1 −1 1 −1 1 −1 −1 1 1 −1].

5. The method according to claim 1, wherein when n=12, $$P_{16*16} = \begin{bmatrix}
1 & 1 & 1 & -1 & -1 & -1 & -1 & 1 & -1 & 1 & -1 & -1 & 1 & 1 & -1 & 1 \\
-1 & 1 & 1 & 1 & -1 & -1 & -1 & -1 & 1 & -1 & 1 & -1 & -1 & 1 & 1 & 1 \\
1 & -1 & 1 & 1 & 1 & -1 & -1 & -1 & -1 & 1 & -1 & 1 & -1 & -1 & 1 & 1 \\
1 & 1 & -1 & 1 & 1 & 1 & -1 & -1 & -1 & -1 & 1 & -1 & 1 & -1 & -1 & 1 \\
-1 & 1 & 1 & -1 & 1 & 1 & 1 & -1 & -1 & -1 & -1 & 1 & -1 & 1 & -1 & 1 \\
-1 & -1 & 1 & 1 & -1 & 1 & 1 & 1 & -1 & -1 & -1 & -1 & 1 & -1 & 1 & 1 \\
1 & -1 & -1 & 1 & 1 & -1 & 1 & 1 & 1 & -1 & -1 & -1 & -1 & 1 & -1 & 1 \\
-1 & 1 & -1 & -1 & 1 & 1 & -1 & 1 & 1 & 1 & -1 & -1 & -1 & -1 & 1 & 1 \\
1 & -1 & 1 & -1 & -1 & 1 & 1 & -1 & 1 & 1 & 1 & -1 & -1 & -1 & -1 & 1 \\
-1 & 1 & -1 & 1 & -1 & -1 & 1 & 1 & -1 & 1 & 1 & 1 & -1 & -1 & -1 & 1 \\
-1 & -1 & 1 & -1 & 1 & -1 & -1 & 1 & 1 & -1 & 1 & 1 & 1 & -1 & -1 & 1 \\
-1 & -1 & -1 & 1 & -1 & 1 & -1 & -1 & 1 & 1 & -1 & 1 & 1 & 1 & -1 & 1 \\
-1 & -1 & -1 & -1 & 1 & -1 & 1 & -1 & -1 & 1 & 1 & -1 & 1 & 1 & 1 & 1 \\
1 & -1 & -1 & -1 & -1 & 1 & -1 & 1 & -1 & -1 & 1 & 1 & -1 & 1 & 1 & 1 \\
1 & 1 & -1 & -1 & -1 & -1 & 1 & -1 & 1 & -1 & -1 & 1 & 1 & -1 & 1 & 1 \\
1 & 1 & 1 & 1 & 1 & 1 & 1 & 1 & 1 & 1 & 1 & 1 & 1 & 1 & 1 & 1
\end{bmatrix};$$

6. The method according to claim 1, wherein when n=16, $$P_{16*16} = \begin{bmatrix}
1 & 1 & 1 & -1 & -1 & -1 & -1 & 1 & -1 & 1 & -1 & -1 & 1 & 1 & -1 & 1 \\
-1 & 1 & 1 & 1 & -1 & -1 & -1 & -1 & 1 & -1 & 1 & -1 & -1 & 1 & 1 & 1 \\
1 & -1 & 1 & 1 & 1 & -1 & -1 & -1 & -1 & 1 & -1 & 1 & -1 & -1 & 1 & 1 \\
1 & 1 & -1 & 1 & 1 & 1 & -1 & -1 & -1 & -1 & 1 & -1 & 1 & -1 & -1 & 1 \\
-1 & 1 & 1 & -1 & 1 & 1 & 1 & -1 & -1 & -1 & -1 & 1 & -1 & 1 & -1 & 1 \\
-1 & -1 & 1 & 1 & -1 & 1 & 1 & 1 & -1 & -1 & -1 & -1 & 1 & -1 & 1 & 1 \\
1 & -1 & -1 & 1 & 1 & -1 & 1 & 1 & 1 & -1 & -1 & -1 & -1 & 1 & -1 & 1 \\
-1 & 1 & -1 & -1 & 1 & 1 & -1 & 1 & 1 & 1 & -1 & -1 & -1 & -1 & 1 & 1 \\
1 & -1 & 1 & -1 & -1 & 1 & 1 & -1 & 1 & 1 & 1 & -1 & -1 & -1 & -1 & 1 \\
-1 & 1 & -1 & 1 & -1 & -1 & 1 & 1 & -1 & 1 & 1 & 1 & -1 & -1 & -1 & 1 \\
-1 & -1 & 1 & -1 & 1 & -1 & -1 & 1 & 1 & -1 & 1 & 1 & 1 & -1 & -1 & 1 \\
-1 & -1 & -1 & 1 & -1 & 1 & -1 & -1 & 1 & 1 & -1 & 1 & 1 & 1 & -1 & 1 \\
-1 & -1 & -1 & -1 & 1 & -1 & 1 & -1 & -1 & 1 & 1 & -1 & 1 & 1 & 1 & 1 \\
1 & 1 & 1 & 1 & 1 & 1 & 1 & 1 & 1 & 1 & 1 & 1 & 1 & 1 & 1 & 1 \\
1 & 1 & 1 & 1 & 1 & 1 & 1 & 1 & 1 & 1 & 1 & 1 & 1 & 1 & 1 & 1 \\
1 & 1 & 1 & 1 & 1 & 1 & 1 & 1 & 1 & 1 & 1 & 1 & 1 & 1 & 1 & 1
\end{bmatrix};$$

$$P_{16\times16} = \begin{bmatrix}
1 & 1 & 1 & 1 & -1 & -1 & -1 & -1 & 1 & -1 & 1 & -1 & -1 & 1 & 1 & -1 \\
1 & -1 & 1 & 1 & 1 & -1 & -1 & -1 & -1 & 1 & -1 & 1 & -1 & -1 & 1 & 1 \\
1 & 1 & -1 & 1 & 1 & 1 & -1 & -1 & -1 & -1 & 1 & -1 & 1 & -1 & -1 & 1 \\
1 & 1 & 1 & -1 & 1 & 1 & 1 & -1 & -1 & -1 & -1 & 1 & -1 & 1 & -1 & -1 \\
1 & -1 & 1 & 1 & -1 & 1 & 1 & 1 & -1 & -1 & -1 & -1 & 1 & -1 & 1 & -1 \\
1 & -1 & -1 & 1 & 1 & -1 & 1 & 1 & 1 & -1 & -1 & -1 & -1 & 1 & -1 & 1 \\
1 & 1 & -1 & -1 & 1 & 1 & -1 & 1 & 1 & 1 & -1 & -1 & -1 & -1 & 1 & -1 \\
1 & -1 & 1 & -1 & -1 & 1 & 1 & -1 & 1 & 1 & 1 & -1 & -1 & -1 & -1 & 1 \\
1 & 1 & -1 & 1 & -1 & -1 & 1 & 1 & -1 & 1 & 1 & 1 & -1 & -1 & -1 & -1 \\
1 & -1 & 1 & -1 & 1 & -1 & -1 & 1 & 1 & -1 & 1 & 1 & 1 & -1 & -1 & -1 \\
1 & -1 & -1 & 1 & -1 & 1 & -1 & -1 & 1 & 1 & -1 & 1 & 1 & 1 & -1 & -1 \\
1 & -1 & -1 & -1 & 1 & -1 & 1 & -1 & -1 & 1 & 1 & -1 & 1 & 1 & 1 & -1 \\
1 & -1 & -1 & -1 & -1 & 1 & -1 & 1 & -1 & -1 & 1 & 1 & -1 & 1 & 1 & 1 \\
1 & 1 & -1 & -1 & -1 & -1 & 1 & -1 & 1 & -1 & -1 & 1 & 1 & -1 & 1 & 1 \\
1 & 1 & 1 & -1 & -1 & -1 & -1 & 1 & -1 & 1 & -1 & -1 & 1 & 1 & -1 & 1 \\
1 & 1 & 1 & 1 & 1 & 1 & 1 & 1 & 1 & 1 & 1 & 1 & 1 & 1 & 1 & 1
\end{bmatrix}; \text{ or}$$

-continued $$P_{16 \times 16} = \begin{bmatrix} -1 & -1 & 1 & -1 & 1 & -1 & -1 & 1 & 1 & -1 & 1 & 1 & 1 & -1 & -1 & 1 \\ -1 & 1 & -1 & 1 & -1 & -1 & 1 & 1 & -1 & 1 & 1 & 1 & -1 & -1 & -1 & 1 \\ 1 & -1 & 1 & -1 & -1 & 1 & 1 & -1 & 1 & 1 & 1 & -1 & -1 & -1 & -1 & 1 \\ -1 & 1 & -1 & -1 & 1 & 1 & -1 & 1 & 1 & 1 & -1 & -1 & -1 & -1 & 1 & 1 \\ 1 & -1 & -1 & 1 & 1 & -1 & 1 & 1 & 1 & -1 & -1 & -1 & -1 & 1 & -1 & 1 \\ -1 & -1 & 1 & 1 & -1 & 1 & 1 & 1 & -1 & -1 & -1 & -1 & 1 & -1 & 1 & 1 \\ -1 & 1 & 1 & -1 & 1 & 1 & 1 & -1 & -1 & -1 & -1 & 1 & -1 & 1 & -1 & 1 \\ 1 & 1 & -1 & 1 & 1 & 1 & -1 & -1 & -1 & -1 & 1 & -1 & 1 & -1 & -1 & 1 \\ 1 & -1 & 1 & 1 & 1 & -1 & -1 & -1 & -1 & 1 & -1 & 1 & -1 & -1 & 1 & 1 \\ -1 & 1 & 1 & 1 & -1 & -1 & -1 & -1 & 1 & -1 & 1 & -1 & -1 & 1 & 1 & 1 \\ 1 & 1 & 1 & -1 & -1 & -1 & -1 & 1 & -1 & 1 & -1 & -1 & 1 & 1 & -1 & 1 \\ 1 & 1 & -1 & -1 & -1 & -1 & 1 & -1 & 1 & -1 & -1 & 1 & 1 & -1 & 1 & 1 \\ 1 & -1 & -1 & -1 & -1 & 1 & -1 & 1 & -1 & -1 & 1 & 1 & -1 & 1 & 1 & 1 \\ -1 & -1 & -1 & -1 & 1 & -1 & 1 & -1 & -1 & 1 & 1 & -1 & 1 & 1 & 1 & 1 \\ -1 & -1 & -1 & 1 & -1 & 1 & -1 & -1 & 1 & 1 & -1 & 1 & 1 & 1 & -1 & 1 \\ 1 & 1 & 1 & 1 & 1 & 1 & 1 & 1 & 1 & 1 & 1 & 1 & 1 & 1 & 1 & 1 \end{bmatrix}.$$

7. The method according to claim 1, wherein when n=16, $$P_{16 \times 16} = \begin{bmatrix} P_{8 \times 8} & P_{8 \times 8} \\ P_{8 \times 8} & -P_{8 \times 8} \end{bmatrix};$$

$$P_{16 \times 16} = \begin{bmatrix} -P_{8 \times 8} & P_{8 \times 8} \\ P_{8 \times 8} & P_{8 \times 8} \end{bmatrix};$$

$$P_{16 \times 16} = \begin{bmatrix} P_{8 \times 8} & -P_{8 \times 8} \\ P_{8 \times 8} & P_{8 \times 8} \end{bmatrix}; \text{ or}$$

$$P_{16 \times 16} = \begin{bmatrix} P_{8 \times 8} & P_{8 \times 8} \\ -P_{8 \times 8} & P_{8 \times 8} \end{bmatrix}, \text{ and wherein}$$

$$P_{8 \times 8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix}$$

8. The method according to claim 1, wherein the $R_{n \times n}$ matrix comprises n rows and n columns, and each row of the $R_{n \times n}$ matrix is equal to a first row of the $P_{n \times n}$ matrix.

9. The method according to claim 1, wherein:

when the $k^{th}$ subcarrier is a non-pilot subcarrier, the first matrix is equal to an overall negation matrix of the $P_{n \times n}$ matrix;

the first matrix is equal to a transpose matrix of the $P_{n \times n}$ matrix;

the first matrix is equal to a transpose matrix of an overall negation matrix of the $P_{n \times n}$ matrix; or the first matrix is equal to an overall negation matrix of a transpose matrix of the $P_{n \times n}$ matrix.

10. A communication apparatus, comprising:

a transceiver, configured to receive a physical layer protocol data unit (PPDU), wherein the PPDU comprises a preamble, the preamble comprises a long training field (LTF), and the LTF comprises a plurality of LTF symbols; and a processor, configured to process, according to a first matrix $$A_{LTF}^k,$$

signals received on the plurality of LTF symbols, wherein the first matrix $$A_{LTF}^k$$

is a $P_{n \times n}$ matrix, or the first matrix $$A_{LTF}^k$$

is obtained according to a Poxy matrix, wherein $$P_{n \times n} \times P_{n \times n}^T = n \times I,$$

I is an identity matrix, the $P_{n \times n}$ matrix comprises n rows and n columns, the $$P_{n \times n}^T$$

matrix is a transpose matrix of the $P_{n \times n}$ matrix, n is an integer greater than 8, and k indicates a $k^{th}$ subcarrier in each of the plurality of LTF symbols, wherein the first matrix $$A_{LTF}^k$$

requires conditions comprising:

$$A_{LTF}^k = \begin{cases} R_{n \times n} & \text{if the } k^{th} \text{ subcarrier is a pilot subcarrier} \\ P_{n \times n} & \text{if the } k^{th} \text{ subcarrier is a non-pilot subcarrier or a data subcarrier} \end{cases},$$

and wherein the $R_{n \times n}$ matrix is used for phase tracking and/or frequency offset estimation, and the $P_{n \times n}$ matrix is used for channel estimation.

11. The communication apparatus according to claim 10, wherein:

$$P_{n \times n} = \begin{bmatrix} S_{(n-1) \times (n-1)} & a \\ a^T & 1 \end{bmatrix};$$

$$P_{n \times n} = \begin{bmatrix} a & S_{(n-1) \times (n-1)} \\ 1 & a^T \end{bmatrix};$$

$$P_{n \times n} = \begin{bmatrix} S_{(n-1) \times (n-1)} & -a \\ a^T & 1 \end{bmatrix}; \text{ or}$$

$$P_{n \times n} = \begin{bmatrix} -a & S_{(n-1) \times (n-1)} \\ 1 & a^T \end{bmatrix},$$

and wherein
the $S_{(n-1) \times (n-1)}$ matrix is a submatrix of the $P_{n \times n}$ matrix, the $S_{(n-1) \times (n-1)}$ matrix comprises n−1 rows and n−1 columns, a is a column vector comprising n−1 elements, each element is 1, $\alpha^T$ is a transpose vector of $\alpha$, and $-\alpha$ indicates a vector obtained through negation of all elements in $\alpha$.

12. The communication apparatus according to claim 11, wherein the $S_{(n-1) \times (n-1)}$ matrix is a circulant matrix or a Hankel matrix.

13. The communication apparatus according to claim 11, wherein:
a first row of the $S_{(n-1) \times (n-1)}$ matrix is equal to a first vector x, and x=[1 1 1 −1 1 −1 −1 1 −1 −1 −1];
a first row of the $S_{(n-1) \times (n-1)}$ matrix is obtained by performing one or more of three operations: cyclic shift, reversing, and overall negation on a first vector x, and x=[1 1 1 −1 1 −1 −1 1 −1 −1 −1];
a first row of the $S_{(n-1) \times (n-1)}$ matrix is equal to a second vector y, and y=[1 1 1 −1 −1 −1 −1 1 −1 1 −1 −1 1 1 −1]; or
a first row of the $S_{(n-1) \times (n-1)}$ matrix is obtained by performing one or more of three operations: cyclic shift, reversing, and overall negation on a second vector y, and y=[1 1 1 −1 −1 −1 −1 1 −1 1 −1 −1 1 1 −1].

14. The communication apparatus according to claim 10, wherein when n=12, $$P_{12 \times 12} = \begin{bmatrix}
1 & 1 & 1 & -1 & 1 & -1 & -1 & 1 & -1 & -1 & -1 & 1 \\
-1 & 1 & 1 & 1 & -1 & 1 & -1 & -1 & 1 & -1 & -1 & 1 \\
-1 & -1 & 1 & 1 & 1 & -1 & 1 & -1 & -1 & 1 & -1 & 1 \\
-1 & -1 & -1 & 1 & 1 & 1 & -1 & 1 & -1 & -1 & 1 & 1 \\
1 & -1 & -1 & -1 & 1 & 1 & 1 & -1 & 1 & -1 & -1 & 1 \\
-1 & 1 & -1 & -1 & -1 & 1 & 1 & 1 & -1 & 1 & -1 & 1 \\
-1 & -1 & 1 & -1 & -1 & -1 & 1 & 1 & 1 & -1 & 1 & 1 \\
1 & -1 & -1 & 1 & -1 & -1 & -1 & 1 & 1 & 1 & -1 & 1 \\
-1 & 1 & -1 & -1 & 1 & -1 & -1 & -1 & 1 & 1 & 1 & 1 \\
1 & -1 & 1 & -1 & -1 & 1 & -1 & -1 & -1 & 1 & 1 & 1 \\
1 & 1 & 1 & 1 & 1 & 1 & 1 & 1 & 1 & 1 & 1 & 1 \\
1 & 1 & 1 & 1 & 1 & 1 & 1 & 1 & 1 & 1 & 1 & 1
\end{bmatrix};$$

-continued $$P_{12 \times 12} = \begin{bmatrix}
1 & 1 & 1 & 1 & -1 & 1 & -1 & -1 & 1 & -1 & -1 & -1 \\
1 & -1 & 1 & 1 & 1 & -1 & 1 & -1 & -1 & 1 & -1 & -1 \\
1 & -1 & -1 & 1 & 1 & 1 & -1 & 1 & -1 & -1 & 1 & -1 \\
1 & -1 & -1 & -1 & 1 & 1 & 1 & -1 & 1 & -1 & -1 & 1 \\
1 & 1 & -1 & -1 & -1 & 1 & 1 & 1 & -1 & 1 & -1 & -1 \\
1 & -1 & 1 & -1 & -1 & -1 & 1 & 1 & 1 & -1 & 1 & -1 \\
1 & -1 & -1 & 1 & -1 & -1 & -1 & 1 & 1 & 1 & -1 & 1 \\
1 & 1 & -1 & -1 & 1 & -1 & -1 & -1 & 1 & 1 & 1 & -1 \\
1 & -1 & 1 & -1 & -1 & 1 & -1 & -1 & -1 & 1 & 1 & 1 \\
1 & 1 & -1 & 1 & -1 & -1 & 1 & -1 & -1 & -1 & 1 & 1 \\
1 & 1 & 1 & 1 & 1 & 1 & 1 & 1 & 1 & 1 & 1 & 1 \\
1 & 1 & 1 & 1 & 1 & 1 & 1 & 1 & 1 & 1 & 1 & 1
\end{bmatrix};$$

$$P_{12 \times 12} = \begin{bmatrix}
-1 & -1 & -1 & 1 & -1 & 1 & 1 & -1 & 1 & 1 & 1 & -1 \\
1 & -1 & -1 & -1 & 1 & -1 & 1 & 1 & -1 & 1 & 1 & -1 \\
1 & 1 & -1 & -1 & -1 & 1 & -1 & 1 & 1 & -1 & 1 & -1 \\
1 & 1 & 1 & -1 & -1 & -1 & 1 & -1 & 1 & 1 & -1 & -1 \\
-1 & 1 & 1 & 1 & -1 & -1 & -1 & 1 & -1 & 1 & 1 & -1 \\
1 & -1 & 1 & 1 & 1 & -1 & -1 & -1 & 1 & -1 & 1 & -1 \\
1 & 1 & -1 & 1 & 1 & 1 & -1 & -1 & -1 & 1 & -1 & -1 \\
-1 & 1 & 1 & -1 & 1 & 1 & 1 & -1 & -1 & -1 & 1 & -1 \\
1 & -1 & 1 & 1 & -1 & 1 & 1 & 1 & -1 & -1 & -1 & -1 \\
-1 & 1 & -1 & 1 & 1 & -1 & 1 & 1 & 1 & -1 & -1 & -1 \\
-1 & -1 & 1 & -1 & 1 & 1 & -1 & 1 & 1 & 1 & -1 & -1 \\
1 & 1 & 1 & 1 & 1 & 1 & 1 & 1 & 1 & 1 & 1 & 1
\end{bmatrix};$$

$$P_{12 \times 12} = \begin{bmatrix}
-1 & -1 & -1 & -1 & 1 & -1 & 1 & 1 & -1 & 1 & 1 & 1 \\
-1 & 1 & -1 & -1 & -1 & 1 & -1 & 1 & 1 & -1 & 1 & 1 \\
-1 & 1 & 1 & -1 & -1 & -1 & 1 & -1 & 1 & 1 & -1 & 1 \\
-1 & 1 & 1 & 1 & -1 & -1 & -1 & 1 & -1 & 1 & 1 & -1 \\
-1 & -1 & 1 & 1 & 1 & -1 & -1 & -1 & 1 & -1 & 1 & 1 \\
-1 & 1 & -1 & 1 & 1 & 1 & -1 & -1 & -1 & 1 & -1 & 1 \\
-1 & 1 & 1 & -1 & 1 & 1 & 1 & -1 & -1 & -1 & 1 & -1 \\
-1 & -1 & 1 & 1 & -1 & 1 & 1 & 1 & -1 & -1 & -1 & 1 \\
-1 & 1 & -1 & 1 & 1 & -1 & 1 & 1 & 1 & -1 & -1 & -1 \\
-1 & -1 & 1 & -1 & 1 & 1 & -1 & 1 & 1 & 1 & -1 & -1 \\
-1 & -1 & -1 & 1 & -1 & 1 & 1 & -1 & 1 & 1 & 1 & -1 \\
1 & 1 & 1 & 1 & 1 & 1 & 1 & 1 & 1 & 1 & 1 & 1
\end{bmatrix}; \text{ or}$$

$$P_{12 \times 12} = \begin{bmatrix}
1 & 1 & -1 & 1 & -1 & -1 & 1 & -1 & -1 & -1 & 1 & 1 \\
1 & -1 & 1 & -1 & -1 & 1 & -1 & -1 & -1 & 1 & 1 & 1 \\
-1 & 1 & -1 & -1 & 1 & -1 & -1 & -1 & 1 & 1 & 1 & 1 \\
1 & -1 & -1 & 1 & -1 & -1 & -1 & 1 & 1 & 1 & -1 & 1 \\
-1 & -1 & 1 & -1 & -1 & -1 & 1 & 1 & 1 & -1 & 1 & 1 \\
-1 & 1 & -1 & -1 & -1 & 1 & 1 & 1 & -1 & 1 & -1 & 1 \\
1 & -1 & -1 & -1 & 1 & 1 & 1 & -1 & 1 & -1 & -1 & 1 \\
-1 & -1 & -1 & 1 & 1 & 1 & -1 & 1 & -1 & -1 & 1 & 1 \\
-1 & -1 & 1 & 1 & 1 & -1 & 1 & -1 & -1 & 1 & -1 & 1 \\
-1 & 1 & 1 & 1 & -1 & 1 & -1 & -1 & 1 & -1 & -1 & 1 \\
1 & 1 & 1 & 1 & 1 & 1 & 1 & 1 & 1 & 1 & 1 & 1 \\
1 & 1 & 1 & 1 & 1 & 1 & 1 & 1 & 1 & 1 & 1 & 1
\end{bmatrix}.$$

15. The communication apparatus according to claim 10, wherein when n=16, $$P_{16*16} = \begin{bmatrix} 1 & 1 & 1 & -1 & -1 & -1 & -1 & 1 & -1 & 1 & -1 & -1 & 1 & 1 & -1 & 1 \\ -1 & 1 & 1 & 1 & -1 & -1 & -1 & -1 & 1 & -1 & 1 & -1 & -1 & 1 & 1 & 1 \\ 1 & -1 & 1 & 1 & 1 & -1 & -1 & -1 & -1 & 1 & -1 & 1 & -1 & -1 & 1 & 1 \\ 1 & 1 & -1 & 1 & 1 & 1 & -1 & -1 & -1 & -1 & 1 & -1 & 1 & -1 & -1 & 1 \\ -1 & 1 & 1 & -1 & 1 & 1 & 1 & -1 & -1 & -1 & -1 & 1 & -1 & 1 & -1 & 1 \\ -1 & -1 & 1 & 1 & -1 & 1 & 1 & 1 & -1 & -1 & -1 & -1 & 1 & -1 & 1 & 1 \\ 1 & -1 & -1 & 1 & 1 & -1 & 1 & 1 & 1 & -1 & -1 & -1 & -1 & 1 & -1 & 1 \\ -1 & 1 & -1 & -1 & 1 & 1 & -1 & 1 & 1 & 1 & -1 & -1 & -1 & -1 & 1 & 1 \\ 1 & -1 & 1 & -1 & -1 & 1 & 1 & -1 & 1 & 1 & 1 & -1 & -1 & -1 & -1 & 1 \\ -1 & 1 & -1 & 1 & -1 & -1 & 1 & 1 & -1 & 1 & 1 & 1 & -1 & -1 & -1 & 1 \\ -1 & -1 & 1 & -1 & 1 & -1 & -1 & 1 & 1 & -1 & 1 & 1 & 1 & -1 & -1 & 1 \\ -1 & -1 & -1 & 1 & -1 & 1 & -1 & -1 & 1 & 1 & -1 & 1 & 1 & 1 & -1 & 1 \\ -1 & -1 & -1 & -1 & 1 & -1 & 1 & -1 & -1 & 1 & 1 & -1 & 1 & 1 & 1 & 1 \\ 1 & -1 & -1 & -1 & -1 & 1 & -1 & 1 & -1 & -1 & 1 & 1 & -1 & 1 & 1 & 1 \\ 1 & 1 & -1 & -1 & -1 & -1 & 1 & -1 & 1 & -1 & -1 & 1 & 1 & -1 & 1 & 1 \\ 1 & 1 & 1 & 1 & 1 & 1 & 1 & 1 & 1 & 1 & 1 & 1 & 1 & 1 & 1 & 1 \end{bmatrix};$$

16. The communication apparatus according to claim 10, wherein when n=16, $$P_{16\times16} = \begin{bmatrix} P_{8\times8} & P_{8\times8} \\ P_{8\times8} & -P_{8\times8} \end{bmatrix};$$

$$P_{16\times16} = \begin{bmatrix} -P_{8\times8} & P_{8\times8} \\ P_{8\times8} & P_{8\times8} \end{bmatrix};$$

$$P_{16\times16} = \begin{bmatrix} P_{8\times8} & -P_{8\times8} \\ P_{8\times8} & P_{8\times8} \end{bmatrix}; \text{ or}$$

$$P_{16\times16} = \begin{bmatrix} P_{8\times8} & P_{8\times8} \\ -P_{8\times8} & P_{8\times8} \end{bmatrix}, \text{ and wherein}$$

$$P_{8\times8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix}$$

17. The communication apparatus according to claim 10, wherein the first matrix $$A_{LTF}^k$$

requires conditions comprising:

$$A_{LTF}^k = \begin{cases} R_{n\times n} & \text{if the } k^{th} \text{ subcarrier is a pilot subcarrier} \\ P_{n\times n} & \text{if the } k^{th} \text{ subcarrier is a non-pilot subcarrier or a data subcarrier} \end{cases},$$

and wherein the $R_{n \times n}$ matrix comprises n rows and n columns, and each row of the $R_{n \times n}$ matrix is equal to a first row of the Pax matrix.

18. The communication apparatus according to claim 10, wherein:

when the $k^{th}$ subcarrier is a non-pilot subcarrier, the first matrix is equal to an overall negation matrix of the $P_{n \times n}$ matrix;

the first matrix is equal to a transpose matrix of the $P_{n \times n}$ matrix;

the first matrix is equal to a transpose matrix of an overall negation matrix of the $P_{n \times n}$ matrix; or the first matrix is equal to an overall negation matrix of a transpose matrix of the $P_{n \times n}$ matrix.

\* \* \* \* \*